United States Patent
Lane et al.

(10) Patent No.: US 12,136,126 B2
(45) Date of Patent: *Nov. 5, 2024

(54) USER-DEFINED ALGORITHM ELECTRONIC TRADING

(71) Applicant: TRADING TECHNOLOGIES INTERNATIONAL, INC., Chicago, IL (US)

(72) Inventors: Richard Lane, Stamford, CT (US); Michael Unetich, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,986

(22) Filed: Oct. 25, 2023

(65) Prior Publication Data

US 2024/0054561 A1    Feb. 15, 2024

Related U.S. Application Data

(63) Continuation of application No. 17/890,027, filed on Aug. 17, 2022, now Pat. No. 11,842,401, which is a
(Continued)

(51) Int. Cl.
*G06Q 40/04*     (2012.01)
*G06Q 40/00*     (2023.01)
*G06F 3/04847*   (2022.01)

(52) U.S. Cl.
CPC ......... *G06Q 40/04* (2013.01); *G06F 3/04847* (2013.01); *G06Q 40/00* (2013.01)

(58) Field of Classification Search
None
See application file for complete search history.

(56) References Cited

U.S. PATENT DOCUMENTS

| 4,674,044 A | 6/1987 | Kalmus et al. |
| 4,914,568 A | 4/1990 | Kodosky et al. |

(Continued)

FOREIGN PATENT DOCUMENTS

| AU | 200240605 | 6/2002 |
| CN | 1392978 A | 1/2003 |

(Continued)

OTHER PUBLICATIONS

U.S. Appl. No. 11/409,346, Advisory Action mailed Mar. 10, 2009.
(Continued)

*Primary Examiner* — Narayanswamy Subramanian
(74) *Attorney, Agent, or Firm* — McDonnell Boehnen Hulbert & Berghoff LLP

(57) ABSTRACT

Certain embodiments reduce the risks of traditionally programmed algorithms such as syntax errors, unclear logic, and the need for a non-trader programmer to develop the algorithm as specified by a trader by reducing or eliminating the writing of programming code by a user. Certain embodiments provide building block buttons and an algorithm area to define an algorithm. Certain embodiments provide live evaluation of an expression as the algorithm is being defined. Certain embodiments provide a design canvas area and blocks for designing an algorithm. Certain embodiments provide live feedback for blocks as the algorithm is being designed. Certain embodiments provide for initiating placement of an order to be managed by a selected user-defined trading algorithm from a value axis and for displaying working orders being managed by different user-defined trading algorithms on the value axis. Certain embodiments provide a ranking tool.

11 Claims, 43 Drawing Sheets

Related U.S. Application Data continuation of application No. 17/328,445, filed on May 24, 2021, now Pat. No. 11,449,939, which is a continuation of application No. 16/656,027, filed on Oct. 17, 2019, now Pat. No. 11,055,782, which is a continuation of application No. 16/123,824, filed on Sep. 6, 2018, now Pat. No. 10,504,182, which is a continuation of application No. 12/905,709, filed on Oct. 15, 2010, now Pat. No. 10,096,066.

(60) Provisional application No. 61/393,313, filed on Oct. 14, 2010, provisional application No. 61/320,061, filed on Apr. 1, 2010, provisional application No. 61/318,685, filed on Mar. 29, 2010, provisional application No. 61/312,003, filed on Mar. 9, 2010, provisional application No. 61/263,300, filed on Nov. 20, 2009, provisional application No. 61/253,324, filed on Oct. 20, 2009, provisional application No. 61/253,315, filed on Oct. 20, 2009.

(56) References Cited

U.S. PATENT DOCUMENTS

| | | |
|---|---|---|
| 5,101,353 A | 3/1992 | Lupien et al. |
| 5,136,501 A | 8/1992 | Silverman et al. |
| 5,168,446 A | 12/1992 | Wiseman |
| 5,245,535 A | 9/1993 | Weiss et al. |
| 5,270,922 A | 12/1993 | Higgins |
| 5,297,031 A | 3/1994 | Gutterman et al. |
| 5,689,652 A | 11/1997 | Lupien et al. |
| 5,692,233 A | 11/1997 | Garman |
| 5,787,402 A | 7/1998 | Potter et al. |
| 5,799,287 A | 8/1998 | Dembo |
| 5,809,483 A | 9/1998 | Broka et al. |
| 5,819,238 A | 10/1998 | Fernholz |
| 5,873,071 A | 2/1999 | Ferstenberg et al. |
| 5,918,217 A | 6/1999 | Maggioncalda et al. |
| 5,963,923 A | 10/1999 | Garber |
| 6,014,643 A | 1/2000 | Minton |
| 6,061,662 A | 5/2000 | Makivic |
| 6,064,985 A | 5/2000 | Anderson |
| 6,098,051 A | 8/2000 | Lupien et al. |
| 6,112,189 A | 8/2000 | Rickard et al. |
| 6,134,535 A | 10/2000 | Belzberg |
| 6,161,098 A | 12/2000 | Wallman |
| 6,167,386 A | 12/2000 | Brown |
| 6,195,647 B1 | 2/2001 | Martyn et al. |
| 6,233,566 B1 | 5/2001 | Levine et al. |
| 6,272,474 B1 | 8/2001 | Garcia |
| 6,278,982 B1 | 8/2001 | Korhammer et al. |
| 6,282,521 B1 | 8/2001 | Howorka |
| 6,317,728 B1 | 11/2001 | Kane |
| 6,408,282 B1 | 6/2002 | Buist |
| 6,418,419 B1 | 7/2002 | Nieboer et al. |
| 6,421,694 B1 | 7/2002 | Nawaz et al. |
| 6,553,346 B1 | 4/2003 | Walker et al. |
| 6,630,942 B2 | 10/2003 | Gerra et al. |
| 6,691,094 B1 | 2/2004 | Herschkorn |
| 6,766,304 B2 | 7/2004 | Kemp, II et al. |
| 6,772,132 B1 | 8/2004 | Kemp, II et al. |
| 6,938,011 B1 | 8/2005 | Kemp, II et al. |
| 6,966,050 B2 | 11/2005 | Watase et al. |
| 6,983,260 B2 | 1/2006 | Hummelgren |
| 6,996,540 B1 | 2/2006 | May |
| 7,089,205 B1 | 8/2006 | Abernethy |
| 7,127,424 B2 | 10/2006 | Kemp, II et al. |
| 7,146,336 B2 | 12/2006 | Olsen et al. |
| 7,155,410 B1 | 12/2006 | Woodmansey et al. |
| 7,168,045 B2 | 1/2007 | Fliess et al. |
| 7,181,425 B1 | 2/2007 | Cha |
| D539,297 S | 3/2007 | Noviello et al. |
| 7,228,289 B2 | 6/2007 | Brumfield et al. |
| 7,243,083 B2 | 7/2007 | Burns et al. |
| 7,246,092 B1 | 7/2007 | Peterson |
| 7,286,063 B2 | 10/2007 | Gauthey et al. |
| 7,305,361 B2 | 12/2007 | Otero et al. |
| 7,356,499 B1 | 4/2008 | Amburn |
| 7,389,264 B2 | 6/2008 | Kemp, II et al. |
| 7,389,268 B1 | 6/2008 | Kemp, II et al. |
| 7,395,506 B2 | 7/2008 | Tan et al. |
| 7,418,422 B2 | 8/2008 | Burns |
| 7,424,450 B2 | 9/2008 | Kemp, II et al. |
| 7,437,325 B2 | 10/2008 | Kemp, II et al. |
| 7,453,443 B2 | 11/2008 | Rytivaara et al. |
| 7,542,938 B1 | 1/2009 | Tam |
| 7,496,535 B2 | 2/2009 | Otero et al. |
| 7,505,932 B2 | 3/2009 | Kemp, II et al. |
| 7,509,276 B2 | 3/2009 | Brumfield et al. |
| 7,512,561 B2 | 3/2009 | Burns |
| 7,523,064 B2 | 4/2009 | Burns et al. |
| 7,542,940 B2 | 6/2009 | Burns et al. |
| 7,565,319 B1 | 7/2009 | Strauss et al. |
| 7,571,134 B1 | 8/2009 | Burns et al. |
| 7,587,356 B2 | 9/2009 | West et al. |
| 7,587,357 B1 | 9/2009 | Buck |
| 7,590,576 B1 | 9/2009 | Zagara et al. |
| 7,590,578 B2 | 9/2009 | Burns et al. |
| 7,590,587 B2 | 9/2009 | Duquette |
| 7,593,887 B2 | 9/2009 | Duquette |
| 7,596,528 B1 | 9/2009 | Herz |
| 7,599,867 B1 | 10/2009 | Monroe et al. |
| 7,599,868 B1 | 10/2009 | Tanpoco |
| 7,599,880 B1 | 10/2009 | Tam |
| 7,610,237 B1 | 10/2009 | Strauss et al. |
| 7,610,240 B2 | 10/2009 | Mintz et al. |
| 7,620,587 B2 | 11/2009 | Duquette |
| 7,627,517 B2 | 12/2009 | Badenhorst et al. |
| 7,627,519 B2 | 12/2009 | Burns |
| 7,627,904 B2 | 12/2009 | Tokkonen |
| 7,640,207 B1 | 12/2009 | Tanpoco |
| 7,672,895 B2 | 3/2010 | Mintz et al. |
| 7,676,411 B2 | 3/2010 | Kemp, II et al. |
| 7,693,768 B2 | 4/2010 | Kemp, II et al. |
| 7,694,272 B2 | 4/2010 | Bronicki et al. |
| 7,702,568 B1 | 4/2010 | Tanpoco |
| 7,702,569 B1 | 4/2010 | Tanpoco |
| 7,707,086 B2 | 4/2010 | Burns et al. |
| 7,725,382 B2 | 5/2010 | Kemp, II et al. |
| 7,739,164 B1 | 6/2010 | West et al. |
| 7,774,267 B2 | 8/2010 | Burns et al. |
| 7,805,356 B2 | 9/2010 | O'Connor et al. |
| 7,813,995 B2 | 10/2010 | Burns et al. |
| 7,813,996 B2 | 10/2010 | Kemp, II et al. |
| 7,831,505 B2 | 11/2010 | Herz |
| 7,848,991 B1 | 12/2010 | Buck |
| 7,848,993 B1 | 12/2010 | Buck |
| 7,848,994 B1 | 12/2010 | Andrews et al. |
| 7,853,504 B1 | 12/2010 | Zagara et al. |
| 7,853,692 B2 | 12/2010 | Kouda |
| 7,856,392 B1 | 12/2010 | Fishbain et al. |
| 7,856,393 B1 | 12/2010 | Fishbain et al. |
| 7,861,185 B1 | 12/2010 | Tanpoco |
| 7,870,059 B2 | 1/2011 | Shapiro et al. |
| 7,882,013 B2 | 2/2011 | Shapiro et al. |
| 7,882,014 B2 | 2/2011 | Shapiro et al. |
| 7,882,015 B2 | 2/2011 | Waelbroeck et al. |
| 7,890,414 B2 | 2/2011 | Brumfield et al. |
| 7,904,374 B2 | 3/2011 | Kemp, II et al. |
| 7,921,072 B2 | 4/2011 | Bohannon et al. |
| 7,945,505 B2 | 5/2011 | Van Slyke |
| 8,051,001 B1 | 11/2011 | Mintz et al. |
| 8,095,456 B2 | 1/2012 | Waelbroeck et al. |
| 8,127,274 B2 | 2/2012 | Astheimer |
| 8,145,557 B2 | 3/2012 | Gilbert et al. |
| 8,271,903 B2 | 9/2012 | Tanpoco |
| 8,442,885 B1 | 5/2013 | Carrie et al. |
| 8,510,206 B2 | 8/2013 | Faier |
| 8,566,220 B2 | 10/2013 | Lidor et al. |
| 8,688,568 B2 | 4/2014 | Faier |
| 8,738,512 B2 | 5/2014 | Lidor et al. |
| 8,744,953 B2 | 6/2014 | Tanpoco |
| 9,159,103 B2 | 10/2015 | Tanpoco |
| 9,652,803 B2 | 5/2017 | Lane et al. |

(56) References Cited

U.S. PATENT DOCUMENTS

| | | |
|---|---|---|
| 9,773,279 B2 | 9/2017 | Faier |
| 10,007,949 B2 | 6/2018 | Lane et al. |
| 10,096,066 B2 | 10/2018 | Lane et al. |
| 10,121,197 B2 | 11/2018 | Lidor et al. |
| 10,269,072 B2 | 4/2019 | Faier |
| 10,296,975 B2 | 5/2019 | Lane et al. |
| 10,319,034 B2 | 6/2019 | Singer et al. |
| 10,354,326 B2 | 7/2019 | Tanpoco |
| 10,438,285 B1 | 10/2019 | Konstantinides et al. |
| 10,504,182 B2 | 12/2019 | Lane et al. |
| 10,572,942 B2 | 2/2020 | Lane et al. |
| 10,748,211 B2 | 8/2020 | Lidor et al. |
| 11,055,782 B2 | 7/2021 | Lane et al. |
| 11,100,582 B2 * | 8/2021 | Tanpoco ............ G06Q 20/40 |
| 11,257,156 B2 | 2/2022 | Lane et al. |
| 11,449,939 B2 | 9/2022 | Lane et al. |
| 2002/0038279 A1 | 3/2002 | Samuelson et al. |
| 2002/0046146 A1 | 4/2002 | Otero et al. |
| 2002/0046156 A1 | 4/2002 | Horn et al. |
| 2002/0049661 A1 | 4/2002 | Otero et al. |
| 2002/0055899 A1 | 5/2002 | Williams |
| 2002/0069156 A1 | 6/2002 | Adam et al. |
| 2002/0105550 A1 | 8/2002 | Biebesheimer et al. |
| 2002/0120551 A1 | 8/2002 | Jones |
| 2002/0128950 A1 | 9/2002 | Wu et al. |
| 2002/0138401 A1 | 9/2002 | Allen et al. |
| 2002/0156718 A1 | 10/2002 | Olsen et al. |
| 2002/0198816 A1 | 12/2002 | Gilbert et al. |
| 2003/0004853 A1 | 1/2003 | Ram et al. |
| 2003/0050800 A1 | 3/2003 | Brandt et al. |
| 2003/0069826 A1 | 4/2003 | Guidi et al. |
| 2003/0093348 A1 | 5/2003 | Finn |
| 2003/0093352 A1 | 5/2003 | Muralidhar et al. |
| 2003/0191765 A1 | 10/2003 | Bargh et al. |
| 2003/0236737 A1 | 12/2003 | Kemp, II et al. |
| 2004/0006528 A1 | 1/2004 | Fung |
| 2004/0117292 A1 | 6/2004 | Brumfield et al. |
| 2004/0210511 A1 | 10/2004 | Waelbroeck |
| 2005/0004852 A1 | 1/2005 | Whitney |
| 2005/0080701 A1 | 4/2005 | Tunney et al. |
| 2005/0165670 A1 | 7/2005 | Woodmansey et al. |
| 2005/0171893 A1 | 8/2005 | Gaer et al. |
| 2005/0203826 A1 | 9/2005 | Farrell et al. |
| 2005/0253817 A1 | 11/2005 | Rytivaara et al. |
| 2005/0256799 A1 | 11/2005 | Warsaw et al. |
| 2006/0010066 A1 | 1/2006 | Rosenthal et al. |
| 2006/0129475 A1 | 6/2006 | Badenhorst et al. |
| 2006/0195389 A1 | 8/2006 | Kemp, II et al. |
| 2006/0195817 A1 | 8/2006 | Moon |
| 2006/0224534 A1 | 10/2006 | Hartman et al. |
| 2006/0229971 A1 | 10/2006 | Kelly et al. |
| 2006/0253582 A1 | 11/2006 | Dixon et al. |
| 2006/0259382 A1 | 11/2006 | Brumfield et al. |
| 2006/0259384 A1 | 11/2006 | Schluetter et al. |
| 2006/0259404 A1 | 11/2006 | Brumfield et al. |
| 2006/0265453 A1 | 11/2006 | Kaminsky et al. |
| 2006/0271475 A1 | 11/2006 | Brumfield et al. |
| 2007/0011081 A1 | 1/2007 | Bok et al. |
| 2007/0038554 A1 | 2/2007 | Kemp, II et al. |
| 2007/0083456 A1 | 4/2007 | Akers |
| 2007/0168275 A1 | 7/2007 | Busby et al. |
| 2007/0174173 A1 | 7/2007 | Brucato |
| 2007/0250769 A1 | 10/2007 | Bass et al. |
| 2007/0250783 A1 | 10/2007 | Wu et al. |
| 2007/0265953 A1 | 11/2007 | Cunningham et al. |
| 2008/0021809 A1 | 1/2008 | Waelbroeck et al. |
| 2008/0040254 A1 | 2/2008 | Waelbroeck et al. |
| 2008/0040255 A1 | 2/2008 | Shapiro et al. |
| 2008/0109785 A1 | 5/2008 | Bailey |
| 2008/0133891 A1 | 6/2008 | Salz et al. |
| 2008/0134158 A1 | 6/2008 | Salz et al. |
| 2008/0134170 A1 | 6/2008 | Astheimer |
| 2008/0208732 A1 | 8/2008 | Guttman et al. |
| 2008/0313565 A1 | 12/2008 | Albertson |
| 2009/0006244 A1 | 1/2009 | Kemp, II et al. |
| 2009/0089202 A1 | 4/2009 | Rowley |
| 2009/0144186 A1 | 6/2009 | DeBarre |
| 2009/0157501 A1 | 6/2009 | Martel et al. |
| 2009/0228400 A1 | 9/2009 | Burns et al. |
| 2009/0240617 A1 | 9/2009 | Burns et al. |
| 2009/0276353 A1 | 11/2009 | West et al. |
| 2009/0292650 A1 | 11/2009 | Duquette |
| 2009/0292651 A1 | 11/2009 | Duquette |
| 2009/0292652 A1 | 11/2009 | Duquette |
| 2009/0319441 A1 | 12/2009 | Duquette |
| 2010/0036766 A1 | 2/2010 | Burns |
| 2010/0057600 A1 | 3/2010 | Johansen et al. |
| 2010/0057602 A1 | 3/2010 | Armutcu |
| 2010/0070399 A1 | 3/2010 | O'Connor et al. |
| 2010/0138335 A1 | 6/2010 | Brumfield et al. |
| 2010/0161512 A1 | 6/2010 | Tanpoco |
| 2010/0161821 A1 | 6/2010 | Slamkovic |
| 2010/0235301 A1 | 9/2010 | Tanpoco |
| 2010/0268637 A1 | 10/2010 | Burns |
| 2011/0040668 A1 | 2/2011 | Lee et al. |
| 2011/0040669 A1 | 2/2011 | Lee et al. |
| 2011/0078068 A1 | 3/2011 | Fishbain et al. |
| 2011/0093378 A1 | 4/2011 | Lane et al. |
| 2011/0093379 A1 | 4/2011 | Lane et al. |
| 2011/0208670 A1 | 8/2011 | Joseph et al. |
| 2012/0191588 A1 | 7/2012 | Lidor et al. |
| 2012/0290983 A1 | 11/2012 | Tanpoco |
| 2013/0304621 A1 | 11/2013 | Carrie et al. |
| 2014/0081825 A1 | 3/2014 | Lidor et al. |
| 2014/0114830 A1 | 4/2014 | Lane et al. |
| 2014/0297506 A1 | 10/2014 | Tanpoco |
| 2014/0351110 A1 | 11/2014 | Lidor et al. |
| 2015/0356681 A1 | 12/2015 | Tanpoco |
| 2017/0186087 A1 | 6/2017 | Lane et al. |
| 2017/0270598 A1 | 9/2017 | Ram et al. |
| 2018/0276752 A1 | 9/2018 | Lane et al. |
| 2019/0012738 A1 | 1/2019 | Lane et al. |
| 2019/0019252 A1 | 1/2019 | Lidor et al. |
| 2019/0236703 A1 | 8/2019 | Lane et al. |
| 2019/0279303 A1 | 9/2019 | Tanpoco |
| 2020/0051169 A1 | 2/2020 | Lane et al. |
| 2020/0160448 A1 | 5/2020 | Lane et al. |
| 2020/0334756 A1 | 10/2020 | Lidor et al. |
| 2021/0279801 A1 | 9/2021 | Lane et al. |
| 2021/0390619 A1 | 12/2021 | Tanpoco |
| 2022/0138854 A1 | 5/2022 | Lane et al. |

FOREIGN PATENT DOCUMENTS

| | | |
|---|---|---|
| EP | 1067471 A1 | 1/2001 |
| EP | 1104904 A1 | 6/2001 |
| EP | 1217564 A2 | 6/2002 |
| EP | 1217564 A3 | 7/2002 |
| EP | 1246111 A2 | 10/2002 |
| EP | 1246111 A3 | 3/2004 |
| JP | H11-149369 A | 6/1999 |
| JP | 2003-532940 A | 11/2003 |
| JP | 2004-046657 A | 2/2004 |
| JP | 2009-535713 A | 10/2009 |
| WO | 1991/14231 A1 | 9/1991 |
| WO | 1995/26005 A1 | 9/1995 |
| WO | 1998/49639 A1 | 11/1998 |
| WO | 1999/19821 A1 | 4/1999 |
| WO | 1999/30259 A1 | 6/1999 |
| WO | 2000/48113 A1 | 8/2000 |
| WO | 2000/52619 A1 | 9/2000 |
| WO | 2000/62187 A2 | 10/2000 |
| WO | 2000/65510 A1 | 11/2000 |
| WO | 2001/09757 A2 | 2/2001 |
| WO | 2001/16830 A1 | 3/2001 |
| WO | 2001/16852 A2 | 3/2001 |
| WO | 2001/22266 A2 | 3/2001 |
| WO | 2001/22315 A2 | 3/2001 |
| WO | 2001/41280 A1 | 6/2001 |
| WO | 2000/62187 A3 | 12/2001 |
| WO | 2001/22315 A3 | 1/2002 |
| WO | 2002/17074 A1 | 2/2002 |
| WO | 2002/33621 A1 | 4/2002 |
| WO | 2002/33623 A1 | 4/2002 |

(56) References Cited

FOREIGN PATENT DOCUMENTS

| | | |
|---|---|---|
| WO | 2002/33635 A1 | 4/2002 |
| WO | 2002/33636 A1 | 4/2002 |
| WO | 2002/33637 A1 | 4/2002 |
| WO | 2001/16852 A8 | 6/2002 |
| WO | 2002/47006 A1 | 6/2002 |
| WO | 2002/80433 A2 | 10/2002 |
| WO | 2003/77061 A2 | 9/2003 |
| WO | 2003/77061 A3 | 4/2004 |
| WO | 2007/037310 A1 | 4/2007 |
| WO | 2007/057008 A1 | 5/2007 |
| WO | 2011/049936 A2 | 4/2011 |
| WO | 2011/049936 A3 | 11/2012 |

OTHER PUBLICATIONS

U.S. Appl. No. 11/409,346, Non-Final Office Action mailed Jun. 25, 2008.
U.S. Appl. No. 11/409,346, Final Office Action mailed Dec. 9, 2008.
"About TickIt Trading Systems LLC" Webpage [online], TickIt Trading Systems LLC, 2010 [Retrieved on Dec. 22, 2010] from the Internet: http://www.tickit.com/about-TickIt.html.
"Algo Design Lab (ADL) Basics" Recorded Webinar [online], TickIt Trading Systems LLC, Feb. 3, 2010. [Retrieved on Dec. 29, 2010] from the Internet: www.tickit.com//files/ADL_Basics_webinar3459.wmv.
"AlgoTrade, LLC Launches to Provide Customized Algorithmic Solutions to the Trading Industry" PRWeb Press Release [online], *PRWeb*, AlgoTrade, LLC, Apr. 24, 2009. [Retrieved on Jan. 3, 2011] from the Internet: http://www.prweb.com/releases/2009/04/prweb2352714.htm.
"Change in Home Prices" Data Chart [online], *New York Times Economix Blog*, n.d. [Retrieved on Dec. 16, 2010] from the Internet: http://www.visualizingeconomics.com/wp-content/uploads/chg-home-prices.jpg.
"How to Build an Algorithm" using Apama software Web Video [online], Progress Software and Thomas Reuters, Nov. 23, 2009. [Retrieved on Dec. 2, 2010] from the Internet: http://hft.thomsonreuters.com/2009/11/23/how-to-build-an-algorithm/.
"One-Cancels-Other (OCO) Orders with Algo Design Lab (ADL)" Recorded Webinar [online], TickIt Trading Systems LLC, Feb. 10, 2010. [Retrieved on Dec. 29, 2010] from the Internet: www.tickit.com/files/2-10-OCO_with_ADL.wmv.
"Orc Spreader 5-Minute Demonstration" Recorded Web Demo [online], Orc Software, n.d. [Retrieved on Dec. 29, 2010] from the Internet: http://www.orcsoftware.com/Resources/Webinars/Orc-Spreader-5-Minute Demonstration/.
"Patsystems Launches Algo Trading Tool" Press Release [online], Patsystems PLC, Nov. 10, 2008. [Retrieved on Dec. 30, 2010] from the Internet: http://www.finextra.com/news/announcement.aspx?pressreleaseid=24461.
"Simulink®—A 'New' Approach to Model Design" Webinar Screenshot [online], Recorded Webinar: *Algorithmic Trading with MATLAB for Financial Applications*—2007, The MathWorks, MATLAB® &SIMULINK®, Slide 13, Sep. 25, 2007. [Retrieved on Nov. 8, 2010] from the Internet: http://www.mathworks.com/company/events/webinars/wbnr30376.html?id=30376&p1=50647&p2=50649.
"Summary of Key Points" Webinar Screenshot [online], Recorded Webinar: *Algorithmic Trading with MATLAB for Financial Applications*—2007, The MathWorks, MATLAB®&SIMULINK®, Slide 15, Sep. 25, 2007. [Retrieved on Nov. 8, 2010] from the Internet: http://www.mathworks.com/company/events/webinars/wbnr30376.html?id=30376&p1=50647&p2=50649.
"TickIt FAQs" Webpage [online], TickIt Trading Systems LLC, 2010. [Retrieved on Dec. 22, 2010] from the Internet: http://www.tickit.com/faq.html.
"TickIt New Algo Design Lab (ADL) Features Enhancements" Recorded Webinar [online], TickIt Trading Systems LLC, Apr. 14, 2010. [Retrieved on Dec. 29, 2010] from the Internet: http://www.tickit.com/files/2010-04-1415.24TickIt_NewADLFeatures_Enhancements.wmv.
"TickIt Trading Systems | Entrepreneurs in Action" Recorded Web Video [online], *Chicago Innovation*, YouTube, 2010. [Retrieved on Dec. 29, 2010] from the Internet: http://www.youtube.com/watch?v=vCcbRL4RMng.
"TickIt Trading Systems LLC—The Next Generation of Futures Trading" Advertisement, TickIt Trading Systems LLC, *CME Magazine*, Winter 2010 Issue. Submission Date: Feb. 16, 2010.
"TickIt Trading Systems LLC—The Next Generation of Futures Trading" Advertisement, TickIt Trading Systems LLC, *CME Magazine*, Spring 2010 Issue. Submission Date: May 4, 2010.
"TickIt Trading Systems" Recorded Web Video [online], *Chicago Business*, YouTube, 2010. [Retrieved on Dec. 29, 2010] from the Internet: http://www.youtube.com/watch?v=OCzD5BwFKtc&feature=related.
"TradeHelm: Advanced Correlation and Algorithmic Trading Solutions" Brochure, TradeHelm, Inc., 2008, 9 pages.
Acant Website [online], Acant, Inc., n.d. [Retrieved on Dec. 2, 2010] from the Internet: http://www.actant.com/.
Algo Design Lab Demo PowerPoint, TickIt Trading Systems LLC, Mar. 24, 2010, 14 pages.
Amp Trading NinjaTrader Webpage [online], Amp Trading, Inc., n.d. [Retrieved on Dec. 2, 2010] from the Internet: http://www.ampfutures.com/ninja_trader.php.
Atwood, J., Video Card Power Consumption Chart Image, *Coding Horror: Programming and Human Factors*, n.d. [Retrieved on Dec. 16, 2010] from the Internet: http://www.codinghorror.com/blog/2006/08/video-card-power-consumption.html.
Bates, J., "Algorithmic Trading Accelerator for Buy-Side and Sell-Side Trading from Apama" Web Video [online], Progress Software Corporation, n.d. [Retrieved on Dec. 2, 2010] from the Internet: http://web.progress.com/en/apama/algorithmic-trading.html.
Bates, J., "Algorithmic Trading" [online], High Performance Computing Channel on *Dr. Dobb's: The World of Software Development*, Mar. 9, 2007, pp. 1-6. [Retrieved on Dec. 1, 2010] from the Internet: http:/www.drdobbs.com/high-performance- computing/197801615.
BGC Partners Website [online], BGC Partners, Inc., n.d. [Retrieved on Dec. 2, 2010] from the Internet: http://www.bgcpartners.com/.
Biotek Gen5™ Microplate Data Analysis Software Image [online], Biotek Instruments, Inc., n.d. [Retrieved on Dec. 17, 2010] from the Internet: http://www.biotek.com/assets/products/149/gen5_screenshot.jpg.
Blue, E.T., "Dataesthetics: The Power and Beauty of Data Visualization" [online], *Eric Blue's Blog*, Oct. 4, 2006 [Retrieved on Jan. 5, 2011] from the Internet: http://eric-blue.com/2006/10/04/dataesthetics-the-power-and-beauty-of-data- visualization/.
Broadway Technology Website [online], Broadway Technology, LLC, n.d. [Retrieved on Dec. 2, 2010] from the Internet: http://www.broadwaytechnology.com/.
C.I.A. World Factbook Data Dashboard Image [online], Central Intelligence Agency, n.d. [Retrieved on Dec. 17, 2010] from the Internet: http://www.geois.de/wp-content/uploads/2009/03/picture-199.png.
CME Group "Choosing a Trading Application" Webpage [online], CME Group, n.d. [Retrieved on Dec. 2, 2010] from the Internet: http://www.cmegroup.com/globex/trading-cme-group-products/trading-applications/index.html.
CME Independent Software Vendor Globex Access Directory, CME Group, Dec. 2008, 78 pages.
CQG Spreader Quick Reference Guide [online], CQG, Inc., n.d., 2 pages. [Retrieved on Dec. 3, 2010] from the Internet: http://www.cqg.com/Docs/CQGSpreaderQuickRef.pdf.
CQG Website [online], CQG, Inc., n.d. [Retrieved on Dec. 2, 2010] from the Internet: http://www.cqg.com/.
Crook, S., "Scratch Programming Lessons—Using variables to control behavior", published Sep. 15, 2009, at https://www.youtube.com/watch?v=ADPcdk6kK_O.
Crosman, P., "Wall Street Firms Form Enterprise Clouds" [online], *Wall Street & Technology*, Jun. 16, 2009 [Retrieved on Dec. 30, 2010] from the Internet http://www.wallstreetandtech.com/articles/217801269.

(56) References Cited

OTHER PUBLICATIONS

Crovitz, G., "Why Technologists Want Fewer Patents: We Shouldn't Grant Monopolies on Concepts" [online], *The Wall Street Journal—Opinion Journal*, Jun. 15, 2009 [Retrieved on Dec. 30, 2010] from the Internet: http://online.wsj.com/article/SB124502173891013805.html.
Crunchbase—Aleri Company Webpage [online], Crunchbase, [Retrieved on Dec. 2, 2010] from the Internet: http://www.crunchbase.com/company/aleri.
CTS—Cunningham Trading Systems Webpage [online], Cunningham Trading Systems, n.d. [Retrieved on Dec. 2, 2010] from the Internet: http://www.ctsfutures.com/.
Danforth, N. "Digg Labs—Stack & Swarm Visualization" [online], *Simple Complexity—Making Simple Sense of Complex Data*, InnovaTech, Inc., Oct. 12, 2007 [Retrieved on Dec. 21, 2010] from the Internet: http://simplecomplexity.net/digg-labs- stack-swarm-visualizations/.
DeCovny, S., "Future Innovations" [online], *Banking Technology*, Jun. 18, 2009 [Retrieved on Dec. 30, 2010] from the Internet: https://bankingtech.com/bankingtech/future-innovations/20000151145.htm;jsessionid=CFDE244C703F02D45AD98D0D8B5B988D.5fa4e8cc80be35e2653c9f87d8b8be45bf6ba69a.
Dickie, S., "Fun with Scratch", published Jul. 25, 2007 "Fun with Scratch" at https://www.youtube.com/watch?v=yPfkdzEOV34.
EDN.com: Graphical Programming for DSP, Jun. 25, 2007, Ee Times, pp. 1-11 (Year: 2007).
Edwards, N., "TickIt Intermediate & Advanced Algo Design Lab (ADL) Techniques" Recorded Webinar [online], TickIt Trading Systems LLC, Mar. 3, 2010. [Retrieved on Dec. 29, 2010] from the Internet: http://www.tickit.com/files/2010-03-03_TickIt_Int_and_Adv_ADL_Techniques2.wmv.
Edwards, N., "TickIt Intermediate & Advanced Algo Design Lab (ADL) Techniques" Recorded Webinar [online], TickIt Trading Systems LLC, Mar. 10, 2010. [Retrieved on Dec. 29, 2010] from the Internet: http://www.tickit.com/files/2010-03-10_15115_TickIt_Int_and%20Adv_ ADL_Techniques.wmv.
Eigenfactor Data Treemap Visualization [online], well-formed. eigenfactor.org, n.d. [Retrieved on Dec. 20, 2010] from the Internet: http://well-formed.eigenfactor.org/treemap.html.
Embedded.com, "Accelerating algorithms in hardware", Jan. 20, 2004 (Year: 2004).
Extended European Search Report in European Patent Application No. 10775975.5 dated Aug. 5, 2013, mailed Aug. 12, 2013.
Ffast Fill Website [online], FfastFill PLC, n.d. [Retrieved on Dec. 2, 2010] from the Internet: http://www.ffastfill.com/.
First Derivatives Website [online], First Derivatives PLC n.d. [Retrieved on Dec. 2, 2010] from the Internet: http://www.firstderivatives.com/pages/home.asp.
FlexTrade Website [online], FlexTrade Systems Inc., n.d. [Retrieved on Dec. 2, 2010] from the Internet: http://www.flextrade.com/.
Focus Trader Pro Demo Screenshot [online], Avadhi Finance and Technology, n.d. [Retrieved on Dec. 2, 2010] from the Internet: http://focus-trader.com/images/client_ws1.png.
Friedman, V., "Data Visualization: Modern Approaches" [online], *Smashing Magazine*, Smashing Media GmbH, Aug. 2, 2007. [Retrieved on Dec. 20, 2010] from the Internet: http://www.smashingmagazine.com/2007/08/02/data-visualization-modern-approaches/.
Gallagher, J., "How StreamBase will be used by CME Group to Analyze Real-Time Market Data" Web Video [online], StreamBase Systems, Inc., Feb. 17, 2010. [Retrieved Dec. 2, 2010 from the Internet: http://www.streambase.com/customers-cme.htm.
Gapminder World Data Chart 2006 Image [online], Gapminder, 2006. [Retrieved on Jan. 5, 2011 ] from the Internet: http://blogoscoped.com/files/gapminder-world-chart-large.png.
Google Images Search for "Visual Programming" [online], Google, Inc., n.d. [Retrieved on Dec. 3, 2010] from the Internet: http://www.google.com/images?q=visual+programming&um=1&ie=UTF-8&source=univ&ei=iCPYTLerLcL7lweyk8Mdcq&sa=X&oi=image_result_group&ct=title&resnum=2&ved=0CD4QsAQwAQ&biw=1240&bih=890.

Grant, J., "Algo Technologies Unveils Fastest Share Trading System" [online], *Financial Times*, Apr. 19, 2010. [Retrieved on Dec. 30, 2010] from the Internet: http://www.ft.com/cms/s/0/bd643216-4bc3-11df-9db6-00144feab49a.html#axzz19cHfG5SJ.
Heires, K., "CQG Adds Price Capturing and Risk Tools to Futures Trading Platform" [online], *Securities Technology Monitor*, Sep. 29, 2009. [Retrieved on Dec. 30, 2010] from the Internet: http://www.securitiestechnologymonitor.com/news/-24009-1.html.
Infinity Futures Website [online], Infinity Futures, Inc., n.d. [Retrieved on Dec. 2, 2010] from the Internet: http://www.infinitybrokerage.com/.
Inforalgo Website [online], Inforalgo Information Technology, Ltd., n.d. [Retrieved on Dec. 2, 2010] from the Internet: http://www.inforalgo.com/.
International Search Report of International Application No. PCT/US2003/019328, dated Aug. 8, 2003 (mailed Sep. 9, 2003).
International Search Report of International Application No. PCT/US2010/053172, dated Jul. 20, 2011 (mailed Aug. 8, 2011).
Kharouf, J. and Cavaletti, C. "A Trading Room with a View," *Futures*, vol. 27, Nov. 1998, pp. 66-71.
Kiln Shell Temperature Monitoring System Data Display Image [online], Toshniwal Sensors Pvt. Ltd., n.d. [Retrieved on Dec. 17, 2010] from the Internet: http://www.tsdpl.com/kiln_shell_temperature_monitorin_files/image007.png.
Kuramori, Shinichi (Ed.), "Super easy book for calculating formula of Excel 2003", published by Ohmsha, Ltd., Oct. 24, 2003, 1st copy of 1st edition, pp. 21-23.
Lane, R., "Algo Design Lab Webinar: Introduction to State Blocks" Recorded Webinar [online], TickIt Trading Systems LLC, Feb. 24, 2010. [Retrieved on Dec. 29, 2010] from the Internet: http://www.tickit.com/files/2010-02-24_TickIt_Int_Adv_ADL_Techniques.wmv.
Last.fm Information Graphics Image [online], LeeByron.com, n.d. [Retrieved on Dec. 17, 2010] from the Internet: http://www.leebyron.com/what/lastfm/.
Lehmann, B. and Modest, M., "Trading and Liquidity on the Tokyo Stock Exchange: A Bird's Eye View" [online], *The Journal of Finance*, The American Finance Association, 1994, vol. 49, No. 3, pp. 951-984. [Retrieved on Jan. 3, 2011] from the Internet: http://www.afajof.org/journal/jstabstract.asp?ref=11451.
Lengler, R. and Eppler, M., Periodic Table of Visualization Methods [online], visual-literacy.org, n.d. [Retrieved on Dec. 20, 2010] from the Internet: http://www.visual-literacy.org/periodic_table/periodic_table.html.
Lidor, D., "TickIt—Join the Bid with Hedge in Algo Design Lab (ADL)" Recorded Web Video [online], TickIt Trading Systems LLC, *YouTube*, 2010. [Retrieved on Dec. 29, 2010] from the Internet: http://www.youtube.com/watch?v=vCcbRL4RMng.
Lidor, D., "TickIt—Legger Creation in Algo Design Lab (ADL)" Recorded Web Video [online], TickIt Trading Systems LLC, *YouTube*, 2010. [Retrieved on Dec. 29, 2010] from the Internet: http://www.youtube.com/watch?v=mAJErRNT_ik.
Lima, M., Visual Complexity Data Project—A Visual Exploration on Mapping Complex Networks [online], VisualComplexity.com, n.d. [Retrieved on Dec. 20, 2010] from the Internet: http://www.visualcomplexity.com/vc/.
ManyEyes Software Data Bubble Chart Image [online], International Business Machines, n.d. [Retrieved on Dec. 17, 2010] from the Internet: http://www-958.ibm.com/software/data/cognos/manyeyes/images/bubble-chart.gif.
MarketWiki—RTD Tango Information [online], MarketsWiki, n.d. [Retrieved on Dec. 3, 2010] from the Internet: http://www.marketswiki.com/mwiki/RTD_Tango.
Mirus Futures Website [online], Mirus Futures, n.d. [Retrieved on Dec. 2, 2010] from the Internet: http://www.mirusfutures.com/.
Moriwaki, Daigo; Data Process Server "Sybase CEP/Sybase RAP—The Trading Edition", DB Magazine, vol. 19, No. 4, p. 186-189, published Aug. 1, 2009.
MTCBC Stock Data Display Image [online], Merthyr Tydfill County Borough Council—Listed Building Condition Database, n.d. [Retrieved on Dec. 17, 2010] from the Internet: http://www.buildingsatrisk.com/screen9.jpg.
ORC Software Website [online], Orc Software, n.d. [Retrieved on Dec. 2, 2010] from the Internet: http://www.orcsoftware.com/.

(56) References Cited

OTHER PUBLICATIONS

Orc Trading Webinars Webpage [online], Orc Software, n.d. [Retrieved on Dec. 29, 2010] from the Internet: http://www.orcsoftware.com/Resources/Webinars/.
Ostrow, A., "16 Awesome Data Visualization Tool" [online], *Mashable*, May 15, 2007. [Retrieved on Dec. 20, 2010] from the Internet: http://mashable.com/2007/05/15/16-awesome-data-visualization-tools/.
Patsystems "Pro-Mark Front End Trading Solution" Webpage [online], Patsystems PLC, n.d. [Retrieved on Dec. 3, 2010] from the Internet: http://www.patsystems.com/tradingSolutions/Front-Ends/proMark.aspx.
Patsystems Website [online], Patsystems PLC, n.d. [Retrieved on Dec. 2, 2010] from the Internet: http://www.patsystems.com/.
Pauer, Eric, et al., "An Architectural Trade Capability Using the Ptolemy Kernel," Proc. of the 1996 IEEE Int. Conference on Acoustics, Speech, and Signal Processing (ICASSP), Copyright IEEE 1996 (4 pages).
Pearson: Working with the Action Pane in Visual Studio Tools for Office, Jul. 14, 2006, Information IT, pp. 1-4 (year: 2006).
Periodic Table of Visualization Methods [online], visual-literacy.org, n.d. [Retrieved on Dec. 20, 2010] from the Internet: http://www.visual-literacy.org/periodic_table/periodic_table.html.
Progress Software—Apama Product Webpage [online], Progress Software Corporation, n.d. [Retrieved on Dec. 2, 2010] from the Internet: http://web.progress.com/en/apama/index.html.
ProOpticus Website [online], Prime Analytics, LLC, n.d. [Retrieved on Dec. 2, 2010] from the Internet: http://www.primeanalytics.com/index-2.html.
QCTool 11 Window Data Image [online], Science Software, n.d. [Retrieved on Dec. 17, 2010] from the Internet: http://www.sciencesoftware.com/Gallery/qctool11.png.
Ren et al., "DaisyViz: A model-based user interface toolkit for interactive information visualization systems", Journal of Visual Language and Computing, 21, Elsevier, pp. 209-229 (Year: 2010).
Rodier, M., "ALGO Technologies Unveils Fastest-Ever Exchange/MTF Matching Engine" [online], *Wall Street & Technology*, Apr. 19, 2010. [Retrieved on Dec. 30, 2010] from the Internet: http://wallstreetandtech.com/articles/224400686.
RTS "RTD Tango Trader" Product Flyer [online], RTS Realtime Systems AG, n.d., 3 pages. [Retrieved on Dec. 3, 2010] from the Internet: http://www.rtsgroup.net/fileadmin/mediapool/PDF/Download_Center/RTD_Tango_Trader.pdf.
RTS Realtime Systems Website [online], RTS Realtime Systems AG, n.d. [Retrieved on Dec. 2, 2010] from the Internet: http://www.rtsgroup.net/.
RTVS—Range Test Validation System Data Product Image [online], Physical Sciences, Inc., n.d. [Retrieved on Dec. 17, 2010] from the Internet: http://www.psicorp.com/RTVS%20data.GIF.
Sander, H., (user name mydancebot) "Hanna's Projects for the Parallax Propeller—12Blocks and Friends", published Aug. 22, 2009 at https://www.youtube.com/watch?v=duqeRKOOzdQ.
Schirr, G., "The Front End of Electronic Futures Activity" [online], *Futures*, Oct. 1, 2005. [Retrieved on Dec. 30, 2010] from the Internet: http://www.allbusiness.com/banking-finance/financial-markets-investing-securities/10576135-1.html.
Sharad, S .: Graphical Programming for DSP, Jun. 25, 2007, EE Times, pp. 1-11 (Year: 2007).
Shin, Seiichi, "New Field" "For future manufacturing—Instrumentation in the field of non-manufacturing process-, Learning from non-manufacturing process instrumentation application", vol. 52, No. 4, p. 63-67, published Apr. 1, 2009.
Simulink Software Web Video [online], The MathWorks, Inc., n.d. [Retrieved on Dec. 2, 2010] from the Internet: http://www.mathworks.com/videos/simulink/getting-started-withsimulink.html;jsessionid=LxfxM4yDK06v2IXT4xcH667DM1GDJMQhFywnrJqPHqDhJG1dnRTF!-2019130019?s_cid=SL_bdyvideo.
Stefaner, M., Elastic Lists Demo: Nobel Prize Winners [online], well-formed-data.net, n.d. [Retrieved on Dec. 17, 2010] from the Internet: http://well-formed-data.net/experiments/elastic_lists/.
Stefaner, M., X by Y Project Data Visualizations [online], Moritz Stefaner Information Aesthetics and Ludwig Boltzmann Institute for media.art.research, n.d. [Retrieved on Dec. 17, 2010] from the Internet: http://moritz.stefaner.eu/projects/x-by-y/.
Steinert-Threlkeld, T., "Algo Certification by Regulators a Nonstarter, NYSE Exec Asserts" [online], *Security Technology Monitor*, Securities Technology Monitor and Source Media, Inc., Nov. 8, 2010. [Retrieved on Dec. 30, 2010] from the Internet: http://www.securitiestechnologymonitor.com/news/algo-certification-sec-nonstarter-nyse-26365-1.html.
StreamBase FX Aggregation Framework > Sample User Interface Webpage [online], StreamBase System, Inc., n.d. [Retrieved on Dec. 3, 2010] from the Internet: http://www.streambase.com/developers/docs/latest/framework_fx/a_FXAF_Intro_Sample_GUI.html.
StreamBase Website [online], StreamBase Systems, Inc., n.d. [Retrieved on Dec. 3, 2010] from the Internet: http://www.streambase.com/.
SunGard Global Trading English-language Website [online], SunGard Global Trading, n.d. [Retrieved on Dec. 2, 2010] from the Internet: http://www.gltrade.com/en/.
TickIt "A Whole New Paradigm in Futures Trading" Brochure, TickIt Trading Systems LLC, FIA Futures & Options Expo, Chicago, IL, Oct. 21-22, 2009.
TickIt "Algo Design Lab (ADL) Overview and Demo" PowerPoint Presentation, TickIt Trading Systems LLC, Mar. 31, 2010, 12 pages.
TickIt "Contact" Webpage [online], TickIt Trading Systems LLC, 2010. [Retrieved on Dec. 22, 2010] from the Internet: http://www.tickit.com/contact.html.
TickIt "News" Webpage [online], TickIt Trading Systems LLC, 2010. [Retrieved on Dec. 22, 2011] from the Internet: http://tickit.com/news.html.
TickIt Algo Design Lab Guide, TickIt Trading Systems LLC, Dec. 29, 2010, Version 1.1, 17 pages.
TickIt Automated Trade Strategy Creation—Algorithm Builder Guide, TickIt Trading Systems LLC, Nov. 17, 2009, Version 1.1, 58 pages.
TickIt Quick Guide, TickIt Trading Systems LLC, Nov. 17, 2009, Version 1.1, 46 pages.
TickIt Quick Guide, TickIt Trading Systems LLC, Nov. 3, 2009, Version 1.1, 39 pages.
TickIt Trading Systems Website [online], TickIt Trading Systems LLC, 2010 [Retrieved on Dec. 22, 2010] from the Internet: http://www.tickit.com/.
TradeVec Website [online], TradeVec Limited, n.d. [Retrieved on Dec. 3, 2010] from the Internet: http://www.tradevec.com/.
Trading Screen Website [online], TradingScreen, Inc., n.d. [Retrieved on Dec. 2, 2010] from the Internet: http://www.tradingscreen.com/.
Trading Technologies: ADL (Algo Design Lab), 2011-2012, pp. 1-2.
Trading Technologies Website [online], Trading Technologies International, Inc., n.d. [Retrieved on Dec. 2, 2010] from the Internet: http://www.tradingtechnologies.com/.
ULLINK Website [online], ULLINK, n.d. [Retrieved on Dec. 2, 2010] from the Internet: http://www.ullink.com/.
Unpublished U.S. Appl. No. 10/749,000, filed Dec. 30, 2003.
USPTO Presentation, NASDAQ, Nov. 8, 2001, 15 pages.
Verena, "Infosthetics: The Beauty of Data Visualization" [online], *pingmag, Yes!Communications*, Mar. 23, 2007 [Retrieved on Dec. 20, 2010] from the Internet: http://pingmag.jp/2007/03/23/infosthetics-form-follows-data/.
Vesta 2D Data Display Window Image [online], Koichi Momma, Geocities JP, n.d. [Retrieved on Dec. 17, 2010] from the Internet: http://www.geocities.jp/kmo_mma/crystal/screenshot/vesta/win-2d-display.png.
Virtual Data Display (Dyno Mode) Image [online], ETB Instruments Limited, n.d. [Retrieved on Dec. 16, 2010] from the Internet: http://www.etbinstruments.com/Images/DD_ss_clip_image026.jpg.
Voyage RSS Feed Reader Website [online], rssvoyage.com, n.d. [Retrieved on Dec. 20, 2010] from the Internet: http://rssvoyage.com/.
Wagner, B., "Prodigio: the What, Why and How (Part one)" Wizard Lab Web Video [online], TOS Prodigio Trading Platform and

(56) References Cited

OTHER PUBLICATIONS

Camatsuo Studio5, Mar. 12, 2010. [Retrieved on Dec. 2, 2010] from the Internet: http://training.prodigiorts.net/wlvideo/wizard_lab100512_final.html.

Wall Street Journal's Technology Innovation Award Application Supporting Documents, TickIt Trading Systems LLC, Submission Date: May 3, 2010, 7 pages.

Wall Street Journal's Technology Innovation Award Application, TickIt Trading Systems LLC, Submission Date: May 3, 2010, 8 pages.

Wang, J., Asymmetric Information and the Bid-Ask Spread: An Empirical Comparison between Automated Order Execution and Open Outcry Auction, *Journal of International Financial Markets, Institutions and Money*, Apr. 1999, vol. 9, Iss. 2, pp. 115-128.

Westland, et al. "Electronic Financial Markets," in *Global Electronic Commerce: Theory and Case Studies*, MIT Press, 1999, pp. 385-444.

Wikipedia—LabVIEW Information [online], Wikipedia Foundation, Inc., n.d. [Retrieved on Dec. 3, 2010] from the Internet: http://en.wikipedia.org/wiki/LabVIEW.

William Blair Employee, "Concentrated Stock Positions: Managing Risk and Reward," William Blair and Company, Jun. 2008, pp. 1-16.

World GHG Emissions Data Flow Chart Image [online], World Resources Institute, n.d. [Retrieved on Dec. 17, 2010] from the Internet: http://cait.wri.org/figures/World-FlowChart.jpg.

Written Opinion and Search Report of Singapore Patent Application No. 201202620-9 by Hungarian Patent Office, dated May 13, 2013 (mailed May 16, 2013).

X-Media Corp., "Excel 2000 for Windows Super Master", Aug. 2, 2000, 1st edition, pp. 195-197.

X_Trader Product HTML Page [online], Trading Technologies International, Inc., Jun. 9, 2000. [Retrieved on Mar. 22, 2001] from the Internet: www.tradingtechnologies.com/products/xtrade_full.html.

Younglai, R. and Spicer, J., "Update 3—US SEC Focused on 'Crazy' Algos After Flash Crash" [online], *Reuters*, Nov. 8, 2010 [Retrieved on Dec. 30, 2010] from the Internet: http://www.reuters.com/article/idUSN0822188620101108?pageNumber=2.

* cited by examiner

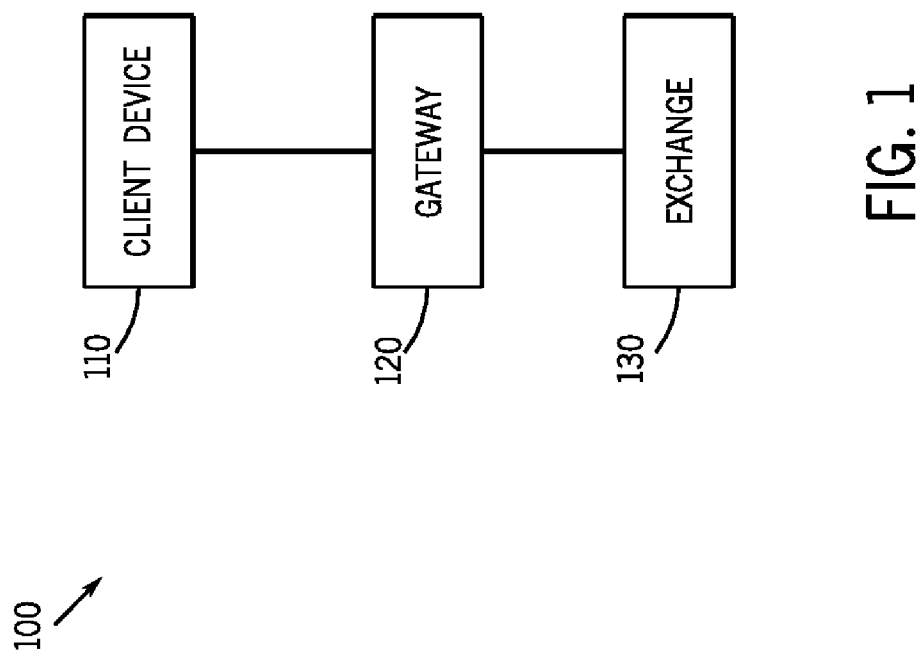

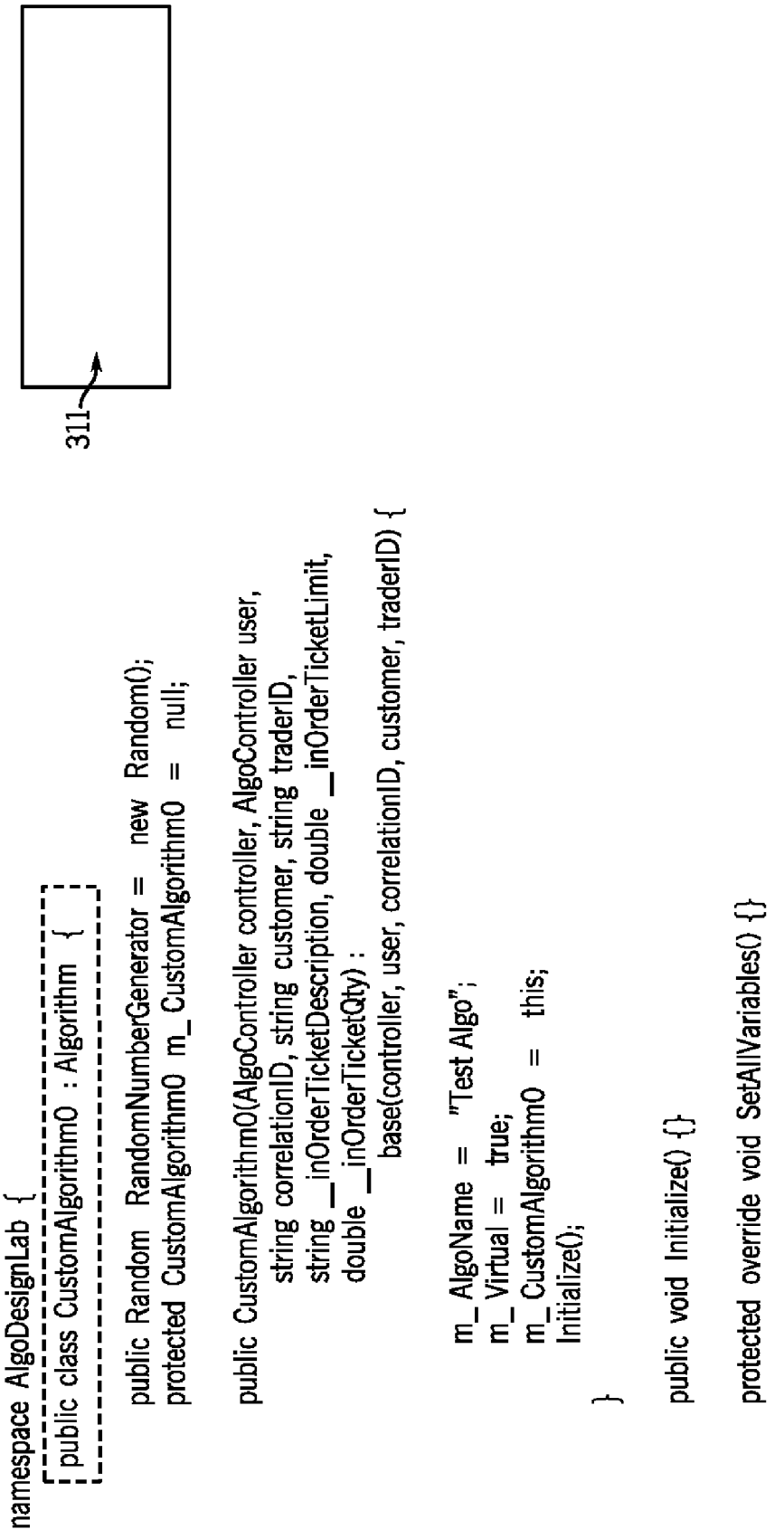

FIG. 3D-1

```
namespace AlgoDesignLab {
    public class CustomAlgorithm0 : Algorithm {
        public Random RandomNumberGenerator = new Random();
        protected CustomAlgorithm0 m_CustomAlgorithm0 = null;

public CustomAlgorithm0(AlgoController controller, AlgoController user,
                string correlationID, string customer, string traderID,
                string __inOrderTicketDescription, double __inOrderTicketLimit,
                double __inOrderTicketQty) :
                    base(controller, user, correlationID, customer, traderID) {
            m_AlgoName = "Test Algo";
            m_Virtual = true;
            m_CustomAlgorithm0 = this;
            Initialize();
        } public void Initialize() {} protected override void SetAllVariables() {} public override void HandleUpdate(object update) {}
    }
}
```

```
namespace AlgoDesignLab {
  public class CustomAlgorithm0 : Algorithm {
    public double ConstantNumberBlock0 = 3;
    public double ConstantNumberBlock1 = 1;
    public double AdderBlock0 = 0;

protected override void SetAllVariables() {
      m_CustomAlgorithm0.AdderBlock0 = 0;
      m_CustomAlgorithm0.SendUpdate("523e4061-71a0-4eca-b450-1df542cbb20f", 2, m_CusomAlgorithm0.AdderBlock0);
    }
  }
}
```

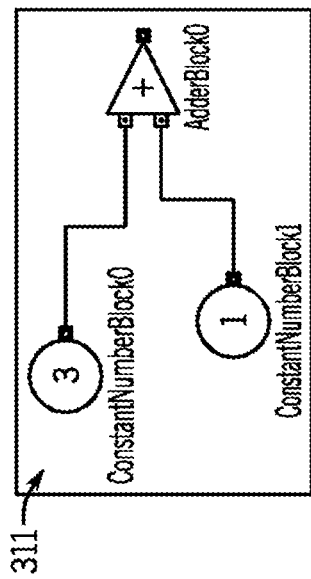

```
namespace AlgoDesignLab {
  public class CustomAlgorithm0 : Algorithm {
    public double ConstantNumberBlock0 = 3;
    public double ConstantNumberBlock1 = 1;
    public double AdderBlock0 = 0;

protected override void SetAllVariables() {
      m_CustomAlgorithm0.AdderBlock0 = (m_CustomAlgorithm0.ConstantNumberBlock0 +
        m_CustomAlgorithm0.ConstantNumberBlock1);
      m_CustomAlgorithm0.SendUpdate("523e4061-71a0-4eca-b450-1df542cbb20f", 2,
        m_CustomAlgorithm0.AdderBlock0);
    }
  }
}
```

FIG. 3D-3

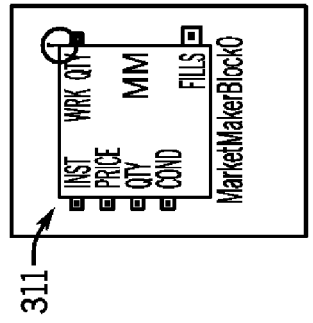

```
namespace AlgoDesignLab {
  public class CustomAlgorithm0 : Algorithm {
    public CustomMarketMaker0 MarketMakerBlock0 = null;

public CustomAlgorithm0(...) : base(...) {
      MarketMakerBlock0 = new CustomMarketMaker0(m_CusomAlgorithm0, this, true);
      AddRunnableBlock(MarketMakerBlock0, "daf9f34c-d996-4e5f-9bb2-61f30d949b77");
    } public class CustomMarketMaker0 : MarketMaker {
      protected CustomAlgorithm0 m_CustomAlgorithm0 = null;
      public CustomMarketMaker0(CustomAlgorithm0 inCustomAlgorithm0,
                                Algorithm localAlgo, bool buy) :
                                base(inCustomAlgorithm0, localAlgo, buy) {
        m_CustomAlgorithm0 = inCustomAlgorithm0;
        m_UniqueID = "daf9f34c-d996-4e5f-9bb2-61f30d949b77";
        m_ConnecterIndex = 0;
        m_Flag = "";
      }
      public override InstrumentSnapshot GetInstrument() { return null; }
      public override double GetLimit() { return 0; }
      public override double GetQty() { return 0; }
      public override bool GetConditional() { return true; }
    }
  }
}
```

FIG. 3D-4

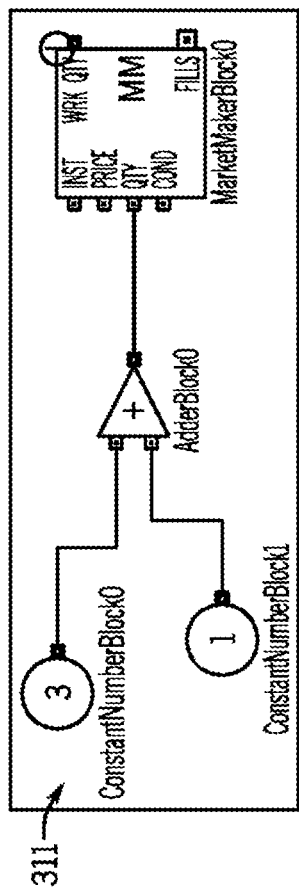

```
namespace AlgoDesignLab {
  public class CustomAlgorithm0 : Algorithm {
    public double ConstantNumberBlock0 = 3;
    public double ConstantNumberBlock1 = 1;
    public double AdderBlock0 = 0;
    public CustomMarketMaker0 MarketMakerBlock0 = null;

protected override void SetAllVariables() {
      m_CustomAlgorithm0.AdderBlock0 = (m_CustomAlgorithm0.ConstantNumberBlock0 +
                                        m_CustomAlgorithm0.ConstantNumberBlock1);
      m_CustomAlgorithm0.SendUpdate("523e4061-71a0-4eca-b450-1df542cbb20f", 2,
                                    m_CustomAlgorithm0.AdderBlock0);
    }
  } public class CustomMarketMaker0 : MarketMaker {
    public override double GetQty() {
      return (int)m_CustomAlgorithm0.AdderBlock0;
    }
  }
}
```

450 — ORDERS—*SIM MODE*SIM MODE*SIM MODE*SIM MODE**

| CHANGE | QTY 500 | LIMIT 6.5 | ORD TYPE | DELETE | DELETE ALL | EDIT VARS | ■ | PRESET FILTERS |
|---|---|---|---|---|---|---|---|---|
| | DISP QTY 0 | TICKIT: 0 | DAY ▸ | | | | | |

| TIME | ... | QTY | ... | SECURITY | ... | LIMIT | EXE QTY | WORK QTY | STOP | TICK QTY |
|---|---|---|---|---|---|---|---|---|---|---|
| ▸ 14:56:23 9/28 | | 500 | B | GE GEH1-GEM1 | | 6.5 | 0 | 500 | 0.0 | 0 |

☒ [Status]='Running'or[Status]='Paused'or[Flag]=''and[Status]='Open'or[Flag2]='HUNG'and[Status]='...Edit Filter  451

455 — EDIT ALGORITHM VARIABLES

| VARIABLE | VALUE |
|---|---|
| M_TH_1 | 5000 |
| ORDER_TH_1 | 500 |
| m_th_2 | 2000 |
| o_th_2 | 200 |

UPDATE

FIG. 4E

| EDIT VIEW | | LADDER-GEZO-GEH1-**SIM... | | □ − X |
|---|---|---|---|---|
| GTC | Join_Size_s ▶ | | QTY | ACCT: 00190 |
| GTD | VARIABLES(5) | | LIMIT 6.0 | LAUNCH |
| UNCH | | 12187 | 13:37:00 | +508 |
| DELETE BIDS | QTY | DELETE ALL | QTY | DELETE OFFERS | Trd |
| | | 9.0 | | | |
| | | 8.5 | 1233 | | |
| | | 8.0 | 788 | 500 | |
| | | 7.5 | 1108 | 500 | |
| | | 7.0 | 10907 | 500 | |
| | | 6.5 | 25254 | 1000 | |
| | | 6.0 | | | 3609 |
| 4498 | 6350 | 5.5 | | | |
| 500 | 30204 | 5.0 | | | |
| | 8966 | 4.5 | | | |
| | 1113 | 4.0 | | | |
| | 814 | 3.5 | | | |
| | | 3.0 | | | |
| | | 2.5 | | | |

461, 462 — indicators
460 — window

FIG. 4F

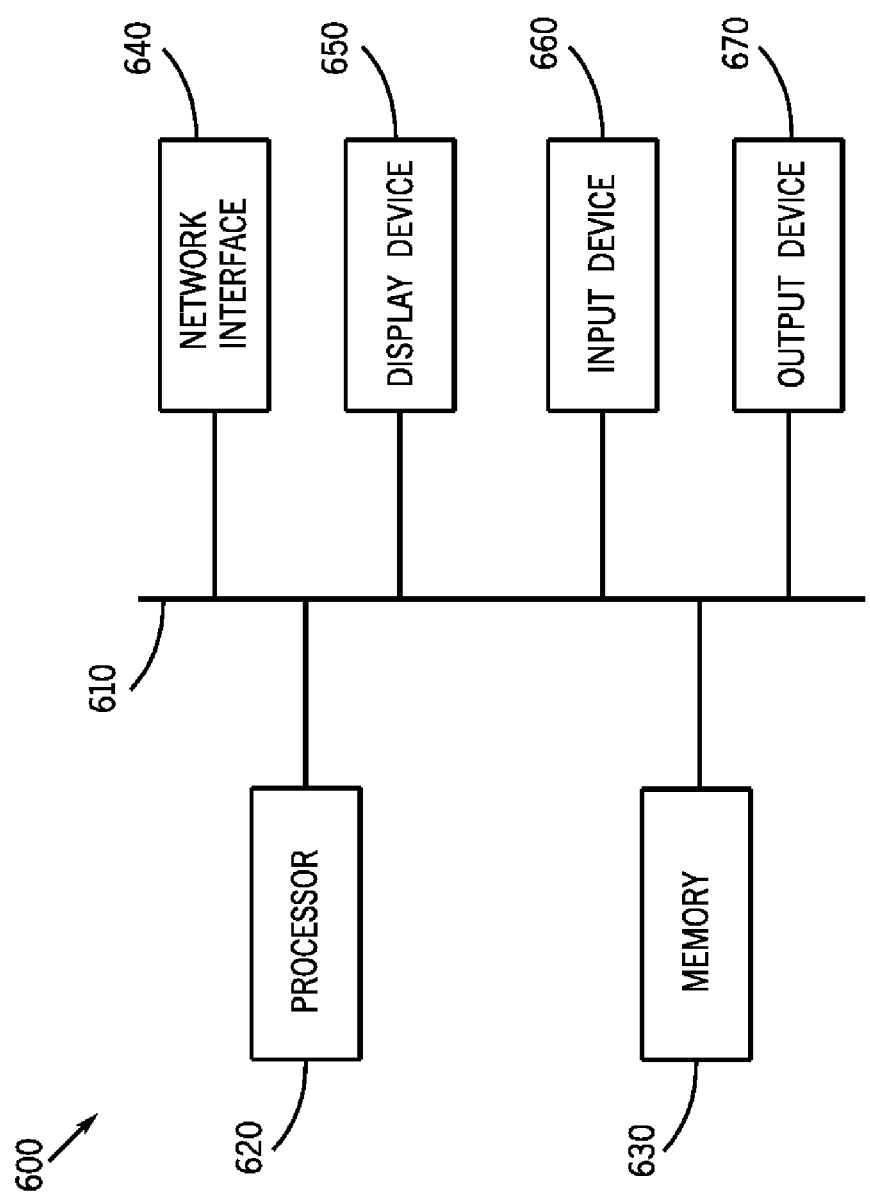

USER-DEFINED ALGORITHM ELECTRONIC TRADING

CROSS REFERENCE TO RELATED APPLICATIONS

This application is a continuation of U.S. patent application Ser. No. 17/890,027, filed Aug. 17, 2022, now U.S. Pat. No. 11,842,401, which is a continuation of U.S. patent application Ser. No. 17/328,445, filed May 24, 2021, now U.S. Pat. No. 11,449,939, which is a continuation of U.S. patent application Ser. No. 16/656,027, filed Oct. 17, 2019, now U.S. Pat. No. 11,055,782, which is a continuation of U.S. patent application Ser. No. 16/123,894, filed Sep. 6, 2018, now U.S. Pat. No. 10,504,182, which is a continuation of U.S. patent application Ser. No. 12/905,709, filed Oct. 15, 2010, now U.S. Pat. No. 10,096,066, which claims the benefit of U.S. Provisional Application No. 61/393,313, entitled "User-Defined Algorithm Electronic Trading", filed Oct. 14, 2010; U.S. Provisional Application No. 61/253,315, entitled "Trading Application with Futures Ranking and Order Tool, Price Level Indicator Tool, and Market Change Audio Indicator Tool", filed Oct. 20, 2009; U.S. Provisional Application No. 61/253,324, entitled "System and Method for Building User-Defined Algorithms for Electronic Trading Exchange", filed Oct. 20, 2009; U.S. Provisional Application No. 61/263,300, entitled "System and Method for Building User-Defined Algorithms for Electronic Trading Exchange", filed Nov. 20, 2009; U.S. Provisional Application No. 61/312,003, entitled "System and Method for Launching Automated Trading Applications", filed Mar. 9, 2010; U.S. Provisional Application No. 61/318,685, entitled "System and Method for Virtualizing User-Defined Algorithms for Electronic Trading Exchange", filed Mar. 29, 2010; and U.S. Provisional Application No. 61/320,061, entitled "System and Method for Automating Feedback-Based User-Defined Algorithms for Electronic Trading Exchange", filed Apr. 1, 2010. Each of these applications is herein incorporated by reference in its entirety for all purposes.

BACKGROUND

The presently described technology is directed towards electronic trading systems. More particularly, certain embodiments are directed towards user-defined algorithm electronic trading.

An electronic trading system generally includes a client device in communication with an electronic exchange that may serve as a host for the client device. Typically, the electronic trading system provides for electronically matching orders to buy and sell tradeable objects to be traded. A tradeable object is an item that may be traded. Stocks, options, futures contracts, securities, and commodities are a few examples of tradeable objects.

The electronic exchange transmits market data to the client device. The market data may include, for example, price data, market depth data, last traded quantity data, data related to a market for the tradeable object, and/or combinations thereof. The client device receives market data from the electronic exchange.

In some electronic trading systems, a client device receives and processes market data without displaying the market data on a display device. For example, a "black-box" algorithmic trading system may run automatically and without displaying market data. However, in other electronic trading systems, the client device displays processed market data on a display device. The client device may include software that creates a trading screen. In general, a trading screen enables a user to participate in an electronic trading session. For example, a trading screen may enable a user to view market data, submit a trade order to the electronic exchange, obtain a market quote, monitor a position, and/or combinations thereof.

In some electronic trading systems, the client device sends trade orders to the electronic exchange. However, in other electronic trading systems, other devices, such as server side devices, are responsible for sending the one or more trade orders to the electronic exchange. Upon receiving a trade order, the electronic exchange enters the trade order into an exchange order book and attempts to match quantity of the trade order with quantity of one or more contra-side trade orders. By way of example, a sell order is contra-side to a buy order with the same price. Similarly, a buy order is contra-side to a sell order with the same price. Unmatched quantity of a trade order is held in the exchange order book until quantity of a trade order is matched by the electronic exchange. Unmatched quantity of a trade order may also be removed from the order book when a trade order is cancelled, either by the client device or electronic exchange. Upon matching quantity of the trade order, the electronic exchange may send a confirmation to the client device that the quantity of the trade order was matched.

Electronic exchanges have made it possible for an increasing number of participants to be active in a market at any given time. The increase in the number of potential market participants has advantageously led to, among other things, a more competitive market and greater liquidity. In a competitive environment, like electronic trading, where every second or a fraction of second counts in intercepting trading opportunities, it is desirable to offer tools that help a participant effectively compete in the marketplace or even give an edge over others.

Some current systems include algorithmic trading systems which may allow for quicker evaluation and reaction to changes in market information. However, such systems typically require skilled programmers to develop the trading algorithms, take days (or even months) to test and debug, and the development and debugging process must be repeated when a trader decides on a different approach or desires a modification to the algorithm's logic.

SUMMARY

The embodiments described herein include, but are not limited to, various devices, systems, methods, and computer program products.

Certain embodiments provide building block buttons and an algorithm area to define an algorithm. Certain embodiments allow for adjusting both the parameters and the logic of an algorithm rapidly, even during a single trading session. Certain embodiments provide live evaluation of an expression as the algorithm is being defined. Certain embodiments reduce the risks of traditionally programmed algorithms such as syntax errors, unclear logic, and the need for a non-trader programmer to develop the algorithm as specified by a trader by reducing or eliminating the writing of programming code by a user. Certain embodiments provide a single application for building, debugging, and simulating (with real market data) an algorithm all at the same time. In addition, the single application may also provide for initiating the placement of orders using the algorithm.

Certain embodiments provide a design canvas area and blocks for designing an algorithm. Certain embodiments provide blocks with complex functionality for use in an algorithm. Certain embodiments provide for grouping blocks placed in the design canvas area. Certain embodiments provide for virtualized group blocks enabling dynamic instantiation of portions of an algorithm to handle particular discrete events. Certain embodiments allow for adjusting both the parameters and the logic of an algorithm rapidly, even during a single trading session. Certain embodiments provide live feedback for blocks as the algorithm is being designed. Certain embodiments provide safety features to reduce potential errors when an algorithm is designed. Certain embodiments provide for operation of some or all portions of an algorithm when a connection between a client device and an algorithm server is broken. Certain embodiments reduce the risks of traditionally programmed algorithms such as syntax errors, unclear logic, and the need for a non-trader programmer to develop the algorithm as specified by a trader by reducing or eliminating the writing of programming code by a user. Certain embodiments provide a single application for building, debugging, and simulating (with real market data) an algorithm all at the same time. In addition, the single application may also provide for initiating the placement of orders using the algorithm.

Certain embodiments provide for initiating placement of an order to be managed by an algorithm selected as an order type. Certain embodiments provide for initiating placement of an order to be managed by a selected user-defined trading algorithm from a value axis. Certain embodiments provide for changing a variable for an algorithm while the algorithm is managing an order. Certain embodiments provide for manually modifying an order being managed by an algorithm. Certain embodiments provide for assigning to an unmanaged order an algorithm to manage the order. Certain embodiments provide for displaying working orders being managed by different user-defined trading algorithms on a value axis.

Certain embodiments provide a ranking tool. Certain embodiments provide for display of a ranking of selected tradeable objects to be used for order placement. Certain embodiments provide for selecting an execution strategy for initiating order(s) based on the ranking.

Other embodiments are described below. In addition, modifications may be made to the described embodiments without departing from the spirit or scope of the inventions.

BRIEF DESCRIPTION OF THE DRAWINGS

Example embodiments are described herein with reference to the following drawings.

FIG. 1 illustrates a block diagram of an electronic trading system in which certain embodiments may be employed.

FIGS. 3D-1, 3D-2, 3D-3, 3D-4, 3D-5, 3-D6, and 3D-7 illustrate example programming code generated according to certain embodiments.

FIGS. 3E, 3F, 3G, 3H, 3I, 3J, 3K, 3L, 3M, 3N, 3O, 3P, 3Q, and 3R illustrate trading interfaces according to certain embodiments.

FIGS. 4A, 4B, 4C, 4D, 4E, and 4F illustrate trading interfaces according to certain embodiments.

FIG. 5 illustrates a ranking tool according to certain embodiments.

FIG. 6 illustrates a block diagram of a computing device according to certain embodiments.

Figure 2A:
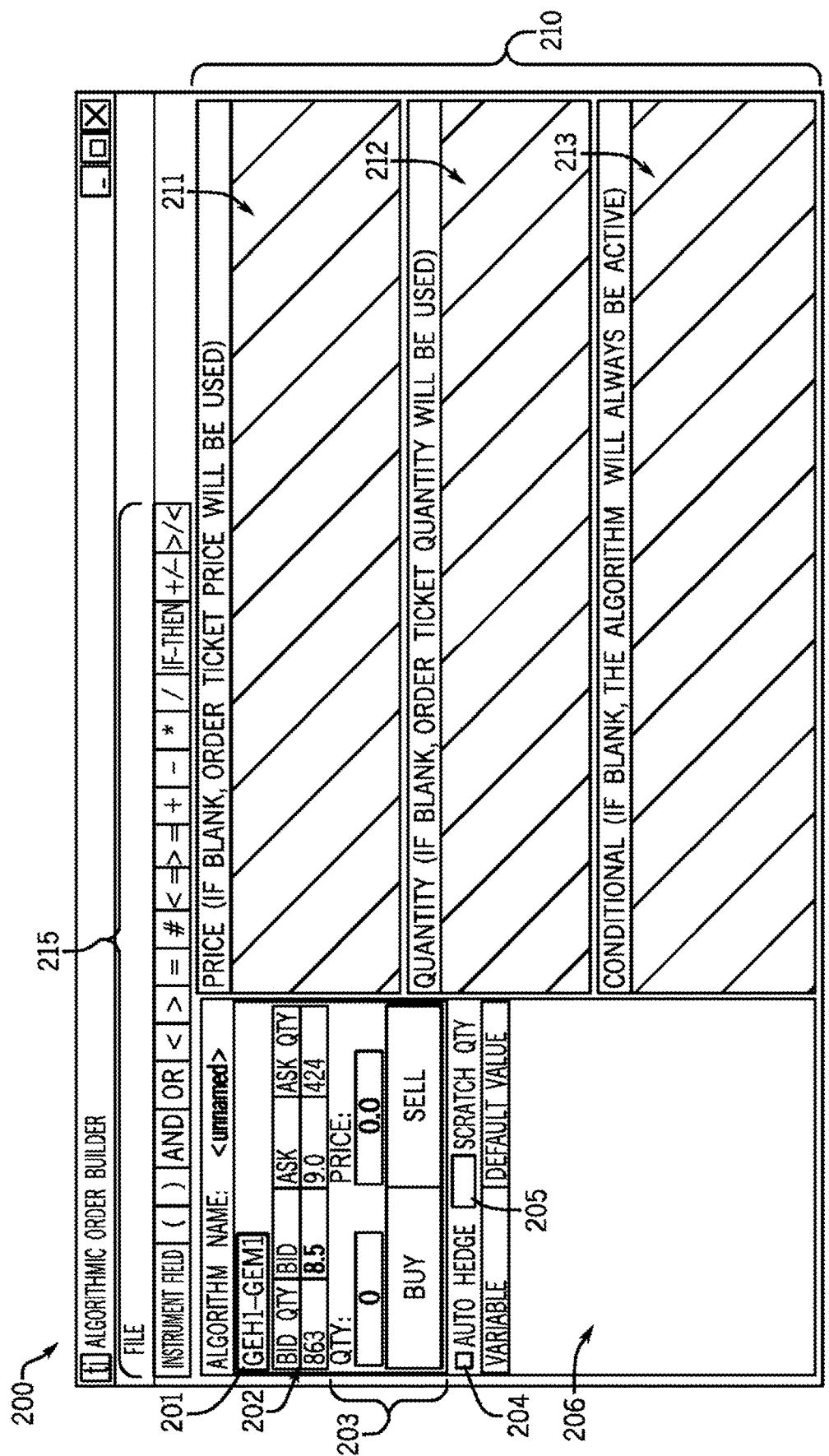
FIG. 2A illustrates a trading interface according to certain embodiments.

The foregoing summary, as well as the following detailed description, will be better understood when read in conjunction with the drawings which show certain embodiments. The drawings are for the purpose of illustrating certain embodiments, but it should be understood that the present inventions are not limited to the arrangements and instrumentality shown in the drawings.

DETAILED DESCRIPTION

I. Example Electronic Trading System

FIG. 1 illustrates a block diagram of an electronic trading system 100 in which certain embodiments may be employed. The system 100 includes a client device 110, a gateway 120, and an electronic exchange 130. The client device 110 is in communication with the gateway 120. The gateway 120 is in communication with the exchange 130.

As used herein, the phrase "in communication with" may include in direct communication and indirect communication through one or more intermediary components.

In operation, the client device 110 may send orders to buy or sell tradeable objects at the exchange 130. For example, a user may utilize the client device 110 to send the orders. The orders are sent through the gateway 120 to the exchange 130. In addition, market data is sent from the exchange 130 through the gateway 120 to the client device 110. The user may also utilize the client device 110 to monitor this market data and base a decision to send an order for a tradeable object on the market data.

A tradeable object is anything which can be traded with a quantity and/or a price. For example, financial products such as stocks, options, bonds, futures, currency, warrants, funds derivatives, securities, commodities, traded events, goods, and collections and/or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread created by a trader utilizing a client device 110.

The client device 110 may include one or more electronic computing platforms such as a hand-held device, laptop, desktop computer, workstation with a single or multi-core processor, server with multiple processors, and/or cluster of computers, for example. For example, while logically represented as a single device, client device 110 may include a trading terminal in communication with a server, where collectively the trading terminal and the server are the client device 110. The trading terminal may provide a trading screen to a user and may communicate commands to the server for further processing of the user's inputs through the trading screen, such as placing orders.

The client device 110 is generally owned, operated, controlled, programmed by, configured by, or otherwise used by a user. As used herein, the phrase "user" may include, but is not limited to, a human (for example, a trader) or an electronic trading device (for example, including a processor and memory or an algorithmic trading system). One or more users may be involved in the ownership, operation, control, programming, configuration, or other use, for example.

The client device 110 may include one or more trading applications. The trading application(s) may, for example, process market data by arranging and displaying the market data in trading and charting windows. The market data may be received from exchange 130, for example. As another example, the market data may be received from a simulation environment that provides historical data and/or simulates an exchange but does not effectuate real-world trades. This processing may be based on user preferences, for example. The trading application(s) may include an automated trading tool such as an automated spread trading tool, for example. The one or more trading applications may be distributed across one or more of the computing devices of the client device 110. For example, certain components of a trading application may be executed on a trading workstation and other components of the trading application may be executed on a server in communication with the workstation.

The client device 110 may include an electronic trading workstation, a portable trading device, an algorithmic trading system such as a "black box" or "grey box" system, an embedded trading system, and/or an automated trading tool, for example. For example, the client device 110 may be a computing system running a copy of X_TRADER®, an electronic trading platform provided by Trading Technologies International, Inc. of Chicago, Illinois. As another example, the client device 110 may be a computing device running an automated trading tool such as Autospreader® and/or Autotrader™, also provided by Trading Technologies International, Inc.

Trading applications may be stored in a computer readable medium of the client device 110. In certain embodiments, certain components of a trading application may be stored on a trading workstation and other components of the trading application may be stored on a server in communication with the workstation. In certain embodiments, one or more components of a trading application may be loaded into the computer readable medium of the client device 110 from another computer readable medium. For example, the trading application (or updates to the trading application) may be stored by a manufacturer, developer, or publisher on one or more CDs or DVDs, which are then provided to someone responsible for loading the application onto the client device 110 or to a server from which the client device 110 retrieves the trading application. As another example, the client device 110 may receive the trading application (or updates to the trading application) from a server, for example, via the Internet or an internal network. The client device 110 may receive the trading application or updates when requested by the client device 110 ("pull distribution") and/or un-requested by the client device 110 ("push distribution").

The client device 110 is adapted to send orders to buy or sell a tradeable object. The client device 110 may also be adapted to cancel orders, change orders, and/or query an exchange, for example. As another example, the client device 110 may be adapted to send orders to a simulated exchange in a simulation environment that does not effectuate real-world trades.

The orders sent by the client device 110 may be sent at the request of a user or automatically, for example. For example, a trader may utilize an electronic trading workstation to place an order for a particular tradeable object, manually providing various parameters for the order such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the client device 110 includes a user interface. The user interface may include one or more display devices for presenting a text-based or graphical interface of a trading application to a user, for example. For example, the display devices may include computer monitors, hand-held device displays, projectors, and/or televisions. The user interface may be used by the user to specify or review parameters for an order using a trading application. The user interface may include one or more input devices for receiving input from a user, for example. For example, the input devices may include a keyboard, trackball, two or three-button mouse, and/or touch screen. The user interface may include other devices for interacting with a user. For example, information may be aurally provided to a user through a speaker and/or received through a microphone.

In certain embodiments, a trading application may include one or more trading screens to enable a trader to interact with one or more markets. Trading screens may enable traders to obtain and view market information, set order entry parameters, enter and cancel orders, and/or monitor positions while implementing various trading strategies, for example. For example, a trading application may receive information (such as bid prices, bid quantities, ask prices, ask quantities, prices and quantities for past sales, and/or other market related information) from exchange 130 which, in turn, may be displayed with a user interface of client device 110. Based on the received information, the trading screen may display a range of price levels and corresponding bid and ask quantities for the price levels in regard to tradeable objects. In order to provide the trader with pertinent trading information, the trading screen may display a range of prices (and the corresponding bid and ask quantities) around the inside market. The information may be continuously or regularly provided to the trading application, which allows the trading application to update the trading screen with current market information. A trader may use the trading screen to place buy and sell orders for tradeable objects or to otherwise trade the tradeable objects based on the displayed information, for example.

Trading screens may display one or more trading tools. Trading tools are electronic tools that allow, assist with, and/or facilitate electronic trading. Exemplary trading tools include, but are not be limited to, charts, trading ladders, order entry tools, automated trading tools, automated spreading tools, risk management tools, order parameter tools, order entry systems, market grids, fill windows, and market order windows, combinations thereof, other electronic tools used for trading, preparing to trade, or managing trades.

In certain embodiments, the client device 110 includes an algorithmic trading application. For example, the client device 110 may include a black box or grey box trading application. As another example, the client device 110 may include a trading application which algorithmically processes market data but provides a user interface to allow a user to manually place orders based on the algorithmic processing or to manipulate orders that were placed automatically. An algorithmic trading application is a trading application which includes an automatically processed algorithm to perform certain actions. That is, the trading application includes an automated series of instructions to perform defined action(s). The actions may include processing market data in a particular way, placing an order, modifying an existing order, deleting an order, refraining from placing an order, selecting which tradeable object(s) to act on, determining a price to place or modify an order at, determining a quantity to place an order at or modify an order to be, determining whether an order should be to buy or sell, and delaying action for a period of time, for example.

As used herein, an algorithm (also referred to as a trading algorithm) is specified by a definition which includes logic expressions and parameters that describe the algorithm to be used in trading. Logic expressions specify the relationship between parameters and may generate more parameters. Parameters may include, for example, inputs into the logic expressions of the algorithm. The definition of an algorithm may be, at least in part, specified by the algorithmic trading application. For example, an algorithmic trading application may allow a user to only specify parameters to be used by pre-defined logic expressions. As another example, an algorithmic trading application may allow a user to specify some or all of the logic expressions and some or all of the parameters. A trading algorithm where the logic expressions are specified by a user is a user-defined trading algorithm.

In certain embodiments, the orders from the client device 110 are sent to the exchange 130 through the gateway 120. The client device 110 may communicate with the gateway 120 using a local area network, a wide area network, a virtual private network, a T1 line, a T3 line, an ISDN line, a point-of-presence, and/or the Internet, for example.

The gateway 120 is adapted to communicate with the client device 110 and the exchange 130. The gateway 120 facilitates communication between the client device 110 and the exchange 130. For example, the gateway 120 may receive orders from the client device 110 and transmit the orders to the exchange 130. As another example, the gateway 120 may receive market data from the exchange 130 and transmit the market data to the client device 110.

In certain embodiments, the gateway 120 performs processing on data communicated between the client device 110 and the exchange 130. For example, the gateway 120 may process an order received from the client device 110 into a data format acceptable by the exchange 130. Similarly, the gateway 120 may transform market data in an exchange-specific format received from the exchange 130 into a format understood by the client device 110. The processing of the gateway 120 may also include tracking orders from the client device 110 and updating the status of the order based on fill confirmations received from the exchange 130, for example. As another example, the gateway 120 may coalesce market data from the exchange 130 and provide it to the client device 120.

In certain embodiments, the gateway 120 provides services other than processing data communicated between the client device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, and/or the Internet, for example.

In general, the exchange 130 may be owned, operated, controlled, or used by an exchange entity. Exemplary exchange entities include the CME Group, the London International Financial Futures and Options Exchange ("LIFFE"), the IntercontinentalExchange ("ICE"), and Eurex. The exchange 130 may be an electronic matching system, such as a computer, server, or other computing device, that is adapted to allow tradeable objects, for example, offered for trading by the exchange, to be bought and sold.

The exchange 130 is adapted to match orders to buy and sell tradeable objects. The tradeable objects may be listed for trading by the exchange 130. The orders may include orders received from the client device 110, for example. Orders may be received from the client device 110 through the gateway 120, for example. In addition, the orders may be received from other devices in communication with the exchange 130. That is, typically the exchange 130 will be in communication with a variety of other client devices (which may be similar to client device 110) that also provide orders to be matched.

The exchange 130 is adapted to provide market data. The market data may be provided to the client device 110, for example. The market data may be provided to the client device 110 through the gateway 120, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, the system 100 includes more than one client device 110. For example, multiple client devices similar to the client device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the client device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the client device 110 to trade at more than one exchange through the gateway 120, for example.

In certain embodiments, the system 100 includes more than one exchange 130 and more than one gateway 120. For example, multiple gateways similar to the gateway 120, discussed above, may be in communication with multiple exchanges similar to the exchange 130, discussed above. Each gateway may be in communication with one or more different exchanges, for example. Such an arrangement may allow one or more client devices 110 to trade at more than one exchange (and/or provide redundant connections to multiple exchanges), for example.

In certain embodiments, the client device 110 includes one or more computing devices or processing components. In other words, the functionality of the client device 110 may be performed by more than one computing device. For example, one computing device may generate orders to be sent to the exchange 130 while another computing device may provide a graphical user interface to a trader. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the client device 110. For example, the components of the gateway 120 may be part of the same computing platform as the client device 110. As another example, the functionality of the gateway 120 may be performed by components of the client device 110. In certain embodiments, the gateway 120 is not present. Such an arrangement may occur when the client device 110 does not need to utilize the gateway 120 to communicate with the exchange 130, for example. For example, if the client device 110 has been adapted to communicate directly with the exchange 130.

In certain embodiments, the gateway 120 is physically located at the same site as the client device 110. In certain embodiments, the gateway 120 is physically located at the same site as the exchange 130. In certain embodiments, the client device 110 is physically located at the same site as the exchange 130. In certain embodiments, the gateway 120 is physically located at a site separate from both the client device 110 and the exchange 130.

While not shown for the sake of clarity, in certain embodiments, the system 100 may include other devices that are specific to the communications architecture such as middleware, firewalls, hubs, switches, routers, exchange-specific communication equipment, modems, security managers, and/or encryption/decryption devices.

The components, elements, and/or functionality of the system 100 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, EPROM, and/or file server, for execution on a general purpose computer or other processing device.

II. Algorithmic Order Builder

Certain embodiments provide building block buttons and an algorithm area to define an algorithm. Certain embodiments allow for adjusting both the parameters and the logic of an algorithm rapidly, even during a single trading session. Certain embodiments provide live evaluation of an expression as the algorithm is being defined. Certain embodiments reduce the risks of traditionally programmed algorithms such as syntax errors, unclear logic, and the need for a non-trader programmer to develop the algorithm as specified by a trader by reducing or eliminating the writing of programming code by a user. Certain embodiments provide a single application for building, debugging, and simulating (with real market data) an algorithm all at the same time. In addition, the single application may also provide for initiating the placement of orders using the algorithm.

FIG. 2A illustrates a trading interface 200 according to certain embodiments. The trading interface 200 is a trading interface for an algorithmic trading application referred to as the Algorithmic Order Builder ("AOB"). The AOB allows a trader to create an algorithm for an order to be placed. However, it should be understood that elements of the illustrated trading interface 200 may be incorporated into other trading interfaces.

The trading interface 200 includes an instrument selection button 201, a market grid 202, a simulated indicative order entry area 203, an auto hedge option 204, a scratch quantity 205, a variable area 206, an algorithm area 210, and building block buttons 215. The algorithm area 210 includes a price area 211, a quantity area 212, and a conditional area 213.

In operation, an algorithm is defined in the algorithm area 210 by utilizing one or more building block buttons 215 to build an expression in the price area 211, the quantity area 212, and/or the conditional area 213. Default values for user-defined variables in the algorithm may be specified using the variable area 206. Once the algorithm has been defined the simulated indicative order entry area 203 may be used to indicate how the logic of the expression will behave. An order to be managed according to the defined algorithm may then be initiated using a trading interface.

The instrument selection button 201 provides for selection of an instrument (that is, a tradeable object) to which an order to be placed relates. As illustrated in FIG. 2A, the instrument selection button 201 has already been used to select the GEH1-GEM1 calendar spread, as indicated by the name of the selected instrument being displayed in the instrument selection button 201. If an instrument has not yet been selected, the instrument selection button 201 may display "Select Instrument" or provide some other indication that an instrument has not yet been selected.

Upon activation of the instrument selection button 201 (for example by selecting it with a pointer or touching it on a touch screen), an instrument selection interface may be displayed to allow for selection of the instrument.

Figure 2B:
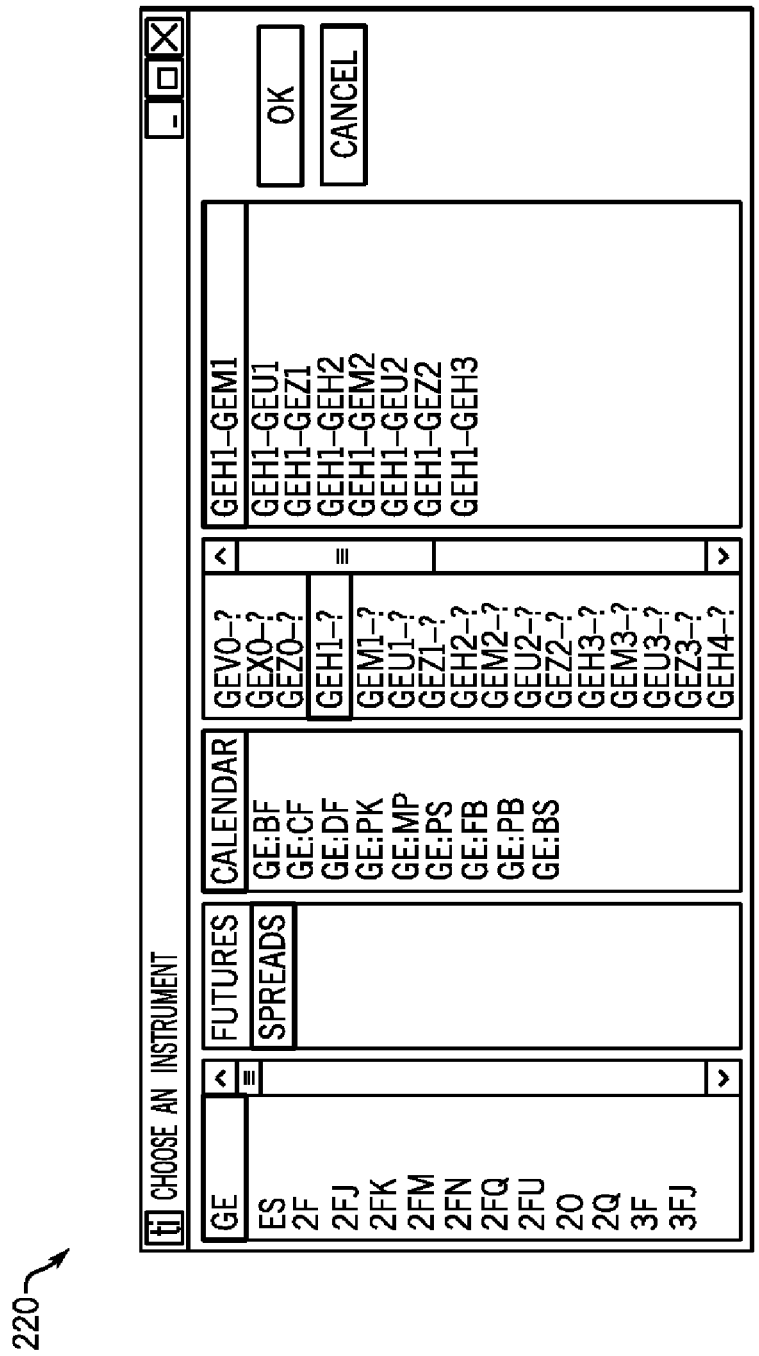
FIG. 2B illustrates an instrument selection interface according to certain embodiments.

FIG. 2B illustrates an instrument selection interface 220 according to certain embodiments. The instrument selection interface 220 displays a list of tradeable products and allows a user to specify a particular tradeable object to be traded by following an instrument tree. The instrument tree allows the user to pick the instrument, instrument type (for example, spreads or futures), and the particular contract to be indicated, for example. For example, as illustrated the GEH1-GEM1 calendar spread has been selected.

Referring back to FIG. 2A, the market grid 202 displays market information for a tradeable object. The tradeable objet may be the instrument selected with the instrument selection button 201, for example. As another example, the tradeable object may be another tradeable object selected by a user. The market grid 202 may display bid and/or ask price, bid and/or ask quantity, last traded price and/or quantity information for the tradeable object, for example. For example, the market grid 202 may display the inside market prices and quantities for the selected instrument.

The simulated indicative order entry area 203 provides for generating feedback for evaluating operational aspects of an algorithm defined in the algorithm area 210. A user may simulate placement of a hypothetical order to buy or sell the selected instrument with the simulated indicative order entry area 203 to indicate how the logic of the expression will behave. A price and/or quantity for the hypothetical order may also be specified with the simulated indicative order entry area 203. Additionally, in certain embodiments, the simulated indicative order entry area 203 may be configured (for example, by selecting a checkbox) to initiate placement of an actual order to buy or sell the selected instrument, where the order is managed according to the defined algorithm.

The auto hedge option 204 provides for specifying that a counter order should be placed when an initiated order is filled. The counter order is an order to sell when the filled order was an order to buy and the counter order is an order to buy when the filled order was an order to sell. The quantity of the counter order may be the same as the filled quantity, for example. The counter order is initially placed at a profitable exit price, such as one tradeable increment (as defined by the exchange) from the price of the filled order, for example. For example, if the filled order bought a quantity of 10 at a price of 100, the counter order may be to sell a quantity of 10 at a price of 101. As another example, if the filled order sold a quantity of 5 at a price of 100, the counter order may be to buy a quantity of 5 at a price of 99.

The scratch quantity 205 is used with the auto hedge option 204. When the quantity in the market at the price level of the counter order drops below the specified scratch quantity 205, then the price level of the counter order is changed to be the price of the corresponding filled order. In this case, the filled order is said to be "scratched" and there is no profit on the trade. In certain embodiments, the counter order may be placed at a price to close the position regardless of the profit or loss.

The variable area 206 provides for specifying and modifying user-defined variables used in the algorithm area 210. The variable area 206 displays each variable name and its value. The variable area may be selected to change a variable name and/or its value. Variables may also be referred to as parameters of the algorithm.

The algorithm area 210 provides for defining an algorithm to manage an order. The algorithm area 210 includes the price area 211, the quantity area 212, and the conditional area 213. Each area corresponds to a different aspect of the algorithm.

The building block buttons 215 are used to build expressions in the algorithm area 210 to define the algorithm. The expressions are evaluated to determine a value for each area of the algorithm area 210. An expression includes one or more elements specified with the building block buttons 215. The use of the building block buttons 215 is discussed in more detail below.

Once the algorithm has been defined in the algorithm area 210, an order to buy or sell may then be initiated with a trading interface. For example, in addition to providing for initiating a hypothetical order, in certain embodiments, the simulated indicative order entry area 203 may also provide for initiating a real order. As another example, trading interfaces similar to those discussed below may be used to initiate an order. The initiated order is then managed according to the defined algorithm.

The price area 211 is evaluated to determine the price at which the order being managed should be placed. The price area 211 evaluates to a number representing the price. If the price area 211 is blank, then the price specified in the simulated indicative order entry area 203 is used. If the price area 211 includes an expression, a price specified in the simulated indicative order entry area 203 may be ignored. The price area 211 may evaluate to a different value at different times, such as when market data changes. If so, the order being managed is changed to work at the new price. This may be achieved by deleting the order and placing a new order at the new price or by using a cancel/replace command, for example.

The quantity area 212 is evaluated to determine the quantity for which the order being managed should be placed. The quantity area 212 evaluates to a number representing the quantity. If the quantity area 212 is blank, then the quantity specified in the simulated indicative order entry area 203 is used. If the quantity area 212 includes an expression, a quantity specified in the simulated indicative order entry area 203 may be ignored. The quantity area 212 may evaluate to a different value at different times, such as when market data changes. If so, the order being managed is changed to work at the new quantity. This may be achieved by deleting the order and placing a new order with the new quantity or by using a change order quantity command, for example. If the quantity area 212 evaluates to 0, the order being managed may be removed from the market until the quantity area 212 evaluates to a non-zero value. This may be similar to the conditional area 213 evaluating to "false," as discussed below.

In certain embodiments, the algorithm area 210 does not include the quantity area 212. Instead, the quantity may be fixed or predefined. For example, a trading interface for managing hedge orders (for example, orders that are automatically placed when another order for a tradeable object of a trading strategy is filled; this may also be referred to as a hedge manager interface) may use a quantity that is based on the filled quantity of the other order and thus is predetermined from the perspective of the algorithm. Thus, an algorithm area in such a trading interface, which may allow an algorithm to be used for working hedge orders, may not include a quantity area 212 because the quantity value does not need to be specified since it is predetermined at the time the algorithm is utilized.

The conditional area 213 is evaluated to determine whether the algorithm should be active. The conditional area 213 evaluates to a Boolean value. When the conditional area 213 evaluates to "true," the algorithm is active. When the conditional area 213 evaluates to "false," the algorithm is inactive. If the conditional area 213 is blank, the algorithm is always active. The conditional area 213 may evaluate to a different value at different times, such as when market data changes. When the algorithm is active, the order being managed is entered into the market and worked according to the determined price and quantity, as discussed above. When the algorithm is inactive, the order being managed is removed from the market. This may be achieved by deleting the order, for example.

In certain embodiments, the algorithm area 210 does not include the conditional area 213. Instead, the algorithm may simply always be "active" once the order is initiated. For example, in a hedge manager interface, because the hedge order may be desired to be filled as quickly as possible, the algorithm managing the hedge order may always be active.

If the expressions in the price area 211, the quantity area 212, and/or the conditional area 213 do not evaluate to the proper type of value (a number for the price area 211 and the quantity area 212 and a Boolean value for the conditional area 213), the expression is invalid. To indicate that the expression is invalid, the background of the particular area may be changed from green (indicating a valid expression) to red (indicating an invalid expression). When an expression in one of the areas of the algorithm area 210 is invalid, an order cannot be placed.

In certain embodiments, other indicators besides (or in addition to) background color may be used to indicate that the expression in an area of the algorithm area 210 is invalid. For example, a different background pattern, a different border color or style, a text message such as "Ready" or "Invalid," and/or an icon of an exclamation point may be used.

If the order being managed according to the algorithm is filled, a counter order may be automatically placed based on the auto hedge option 204 and the scratch quantity 205, as discussed above.

As discussed above, the building block buttons 215 are used to build expressions in the algorithm area 210 to define an algorithm. The building block buttons 215 may also be referred to as icons, movable icons, icon buttons, movable buttons, or user interface elements, for example. The expressions include elements (logic expressions and parameters) and are evaluated to determine a value for each area of the algorithm area 210. A building block button 215 may be selected and placed in a particular area of the algorithm area 210 to build an expression. For example, a user may drag and drop one or more building block buttons 215 into one or more of the areas of the algorithm area 210, such as the price area 211, the quantity area 212, and/or the conditional area 213. As another example, a user may select a building block button 215 by, for example, clicking on it and then it may be placed in the most recently used algorithm area 210. Placing a building block button 215 in the algorithm area 210 places an element in the expression being built in the algorithm area 210. As discussed below, certain elements in an expression may include additional elements that act as sub-expressions, for example.

Types of building block buttons 215 include: instruments, constants, arithmetic operators, logical operators, precedence operators, if-then-else constructs, and variables. Instrument building block buttons specify attributes of the selected instrument, such as bid price and ask quantity, for example. Constant value building block buttons specify numeric and Boolean constant values, for example. Arithmetic operator building block buttons include arithmetic operations such as addition ("+"), subtraction ("−"), multiplication ("*"), and division ("/"). In addition, arithmetic operator building block buttons may include order-side-specific arithmetic operations such as "+/−", which is addition for buy orders and subtraction for sell orders (or addition for sell orders and subtraction for buy orders, as specified by a user). Logic operator building block buttons include logic operations such as AND, OR, and NOT and comparisons such as greater than (">"), less than ("<"), greater than or equal to (">="), less than or equal to ("<="), and equal to ("="), for example. In addition, logic operator building block buttons may include order-side-specific logic operations such as ">/<", which is greater than for buy orders and less than for sell orders (or greater than for sell orders and less than for buy orders, as specified by a user). Precedence operator building block buttons include parentheses ("(" and ")"). In certain embodiments, the precedence operator building block buttons may be used to form sub-expressions comprised of the elements between the parentheses. The if-then-else construct building block button allows for specifying conditional values, for example. The if-then-else construct building block button provides portions where sub-expressions may be built using one or more elements. Variable building block buttons specify a user-defined variable that may have its value changed using the variable area 206, as discussed above, for example.

FIGS. 2C-2I illustrate building a definition for an algorithm in a trading interface 200 according to certain embodiments.

Figure 2C:
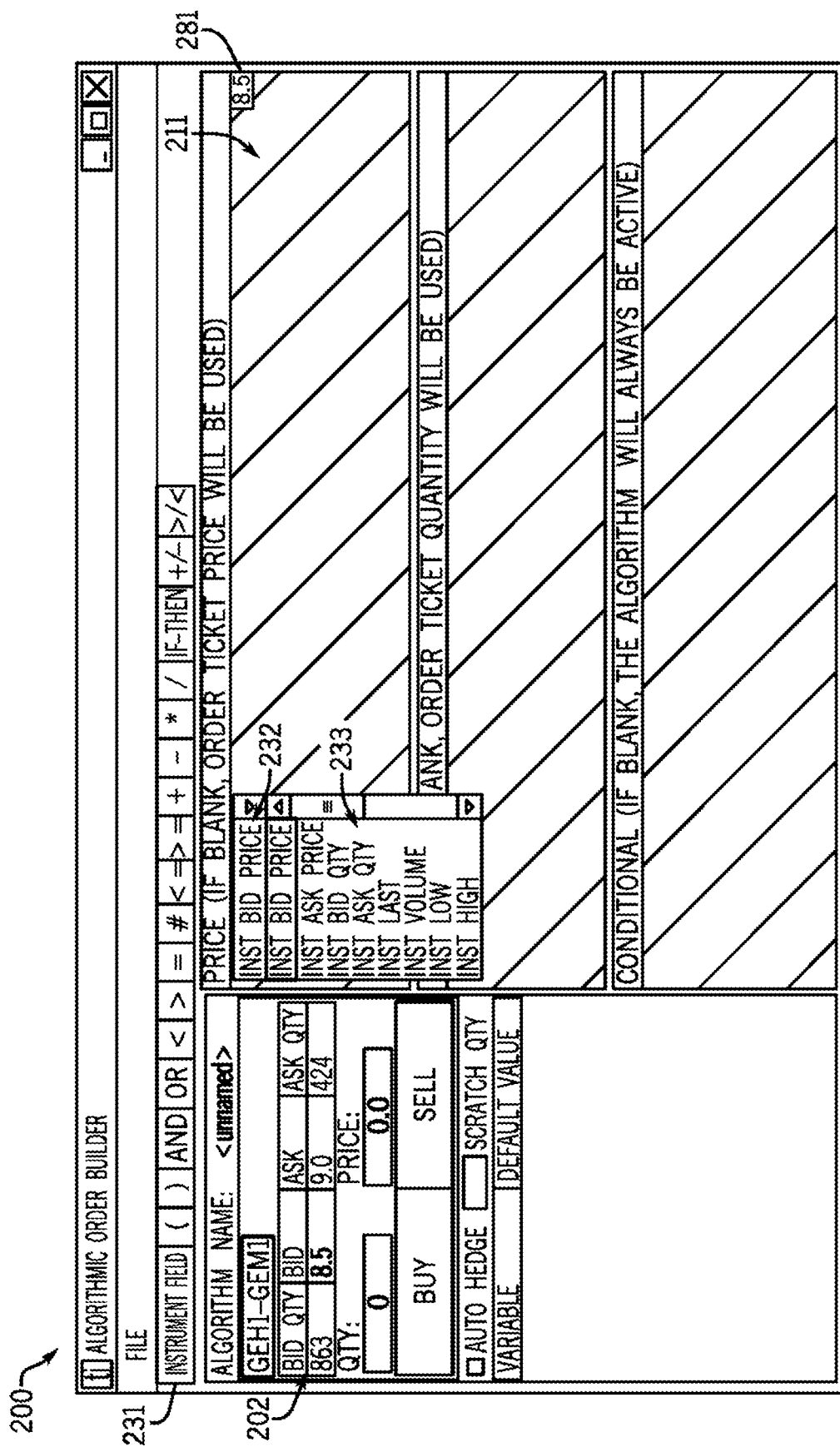
FIGS. 2C, 2D, 2E, 2F, 2G, 2H, and 2I illustrate building a definition for an algorithm in a trading interface according to certain embodiments.

As illustrated in FIG. 2C, the instrument building block button 231 is selected and placed in the price area 211 as instrument building block 232. The instrument building block 232 allows a user to select which attribute of the selected instrument should be used from the list 233. The instrument bid price has been selected. Thus, the price area 211 containing the instrument building block 232 (specified to be the instrument bid price) evaluates to the instantaneous instrument bid price in the market.

Examples of attributes of the selected instrument include the bid price, ask price, bid quantity, ask quantity, last traded price, last traded quantity, volume, trading session high, trading session low, non-implied bid/ask quantity (also referred to as the real bid/ask quantity), settlement price, minimum tradeable increment (also referred to as the tick size), and number of orders in the queue at a price (also referred to as the headcount). In addition, special order-side-specific attributes may be specified (not shown), such as "bid price*", "ask price*", "bid quantity*", and "ask quantity*", for example. For these special attributes, the specified value is used for buy orders and the opposite of the specified value is used for sell orders. For example, if "ask price*" is selected, then the expression evaluates to the ask price for a buy order and the bid price for a sell order.

Figure 2D:
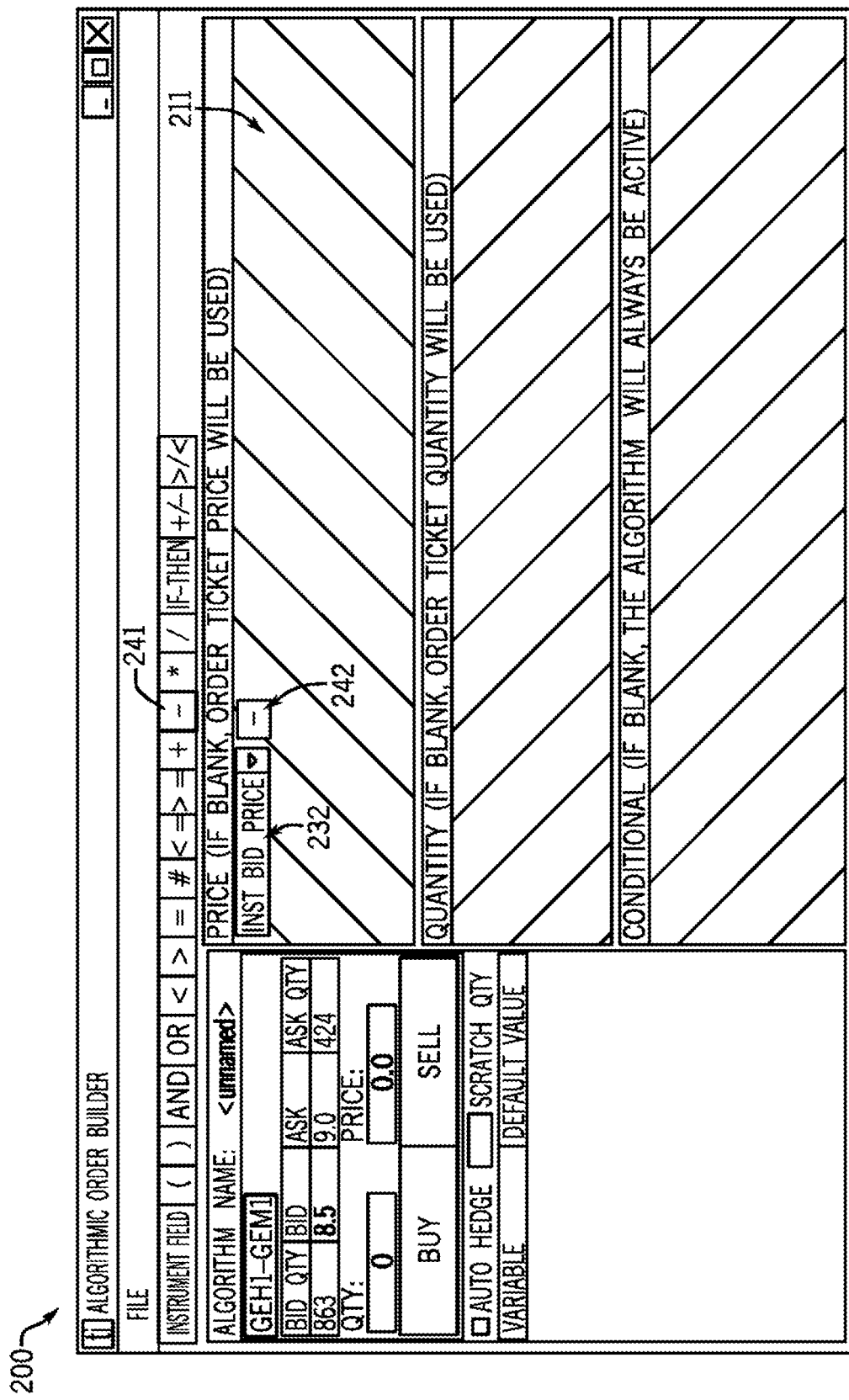

As illustrated in FIG. 2D, the subtraction arithmetic operator building block button 241 is selected and placed in the price area 211 as subtraction building block 242. Now the expression in price area 211 includes instrument building block 232 and subtraction building block 242.

However, the expression in the price area 211 is now invalid and cannot be evaluated ("bid price -" is not syntactically meaningful). This may be handled similarly to the type of the area being invalid, as discussed above. That is, since the expression in the price area 211 is invalid, the background of the price area 211 is changed from green (indicating a valid expression) to red (indicating an invalid expression).

Figure 2E:
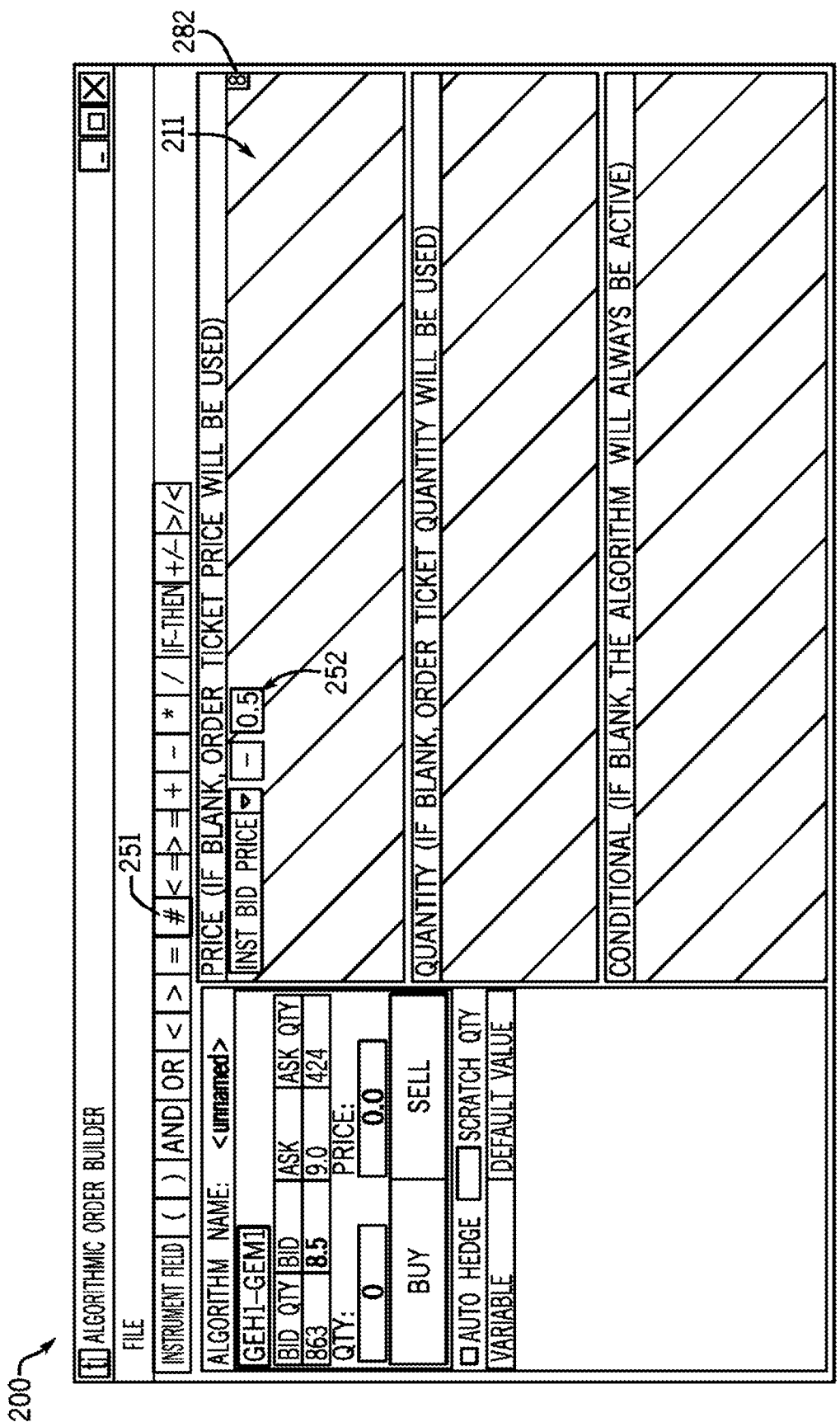

As illustrated in FIG. 2E, the numerical constant value building block button 251 is selected and placed in the price area 211 as the constant value building block 252. The user has specified that the constant value building block 252 should have a value of "0.5." The expression in the price area 211 is now valid again (notice that the background has changed from red back to green) and evaluates to the instantaneous bid price of the instrument minus 0.5.

Figure 2F:
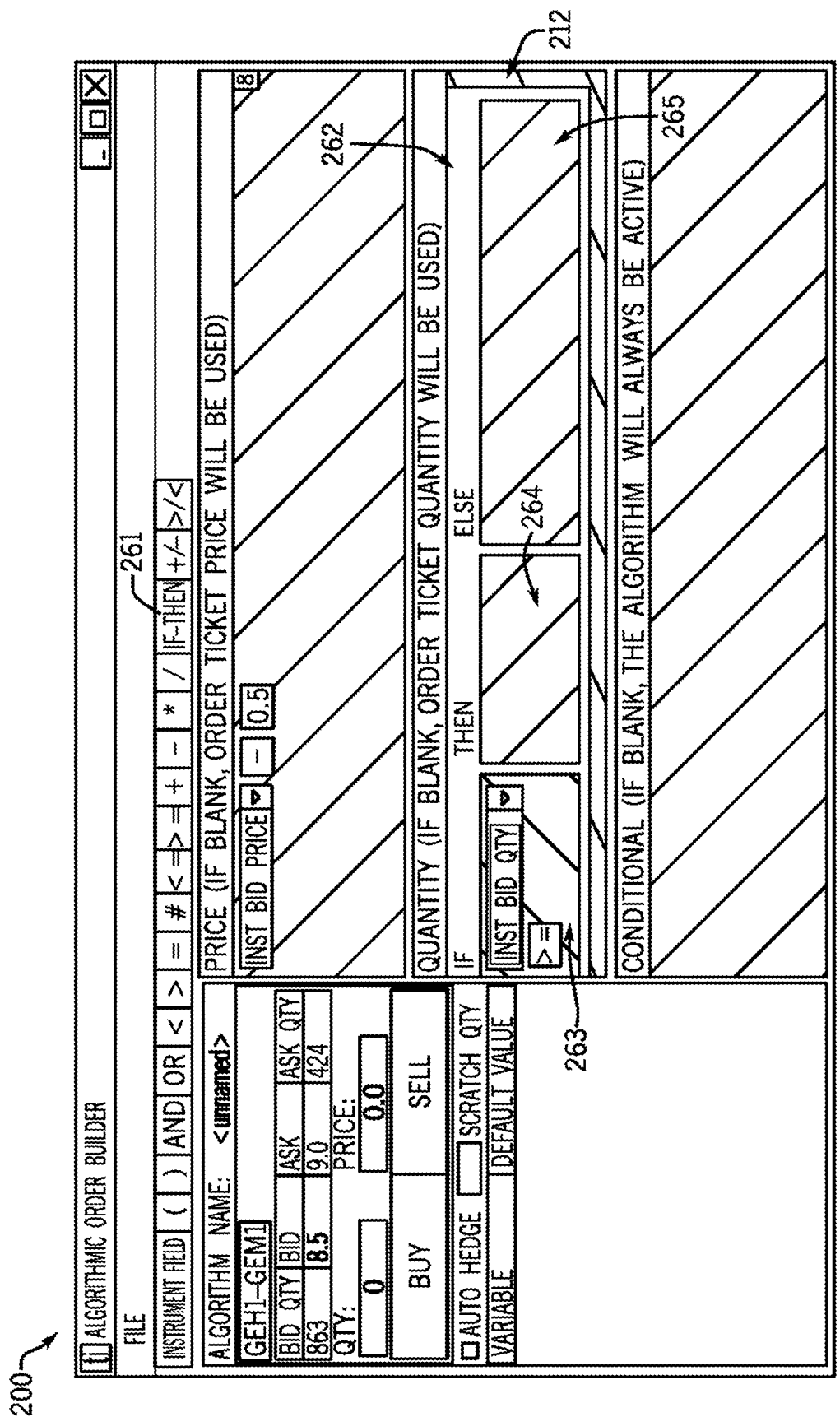

As illustrated in FIG. 2F, the if-then-else construct building block button 261 is selected and placed in the quantity area 212 as the if-then-else construct building block 262. The if-then-else construct building block 262 includes an IF portion 263, a THEN portion 264, and an ELSE portion 265. Sub-expressions of one or more elements (including nested if-then-else construct building blocks) may be built in each portion of the if-then-else construct building block 262.

When the if-then-else construct building block 262 is evaluated, its value is determined as follows. The IF portion 263 is evaluated to determine a Boolean value. When the determined Boolean value from the IF portion 263 evaluates to "true", then the if-then-else construct building block 262 evaluates to the value of the expression in the THEN portion 264. When the determined Boolean value from the IF portion 263 evaluates to "false", then the if-then-else construct building block 262 evaluates to the value of the expression in the ELSE portion 265.

The building block buttons 215 are also used to build expressions in the portions of the if-then-else construct building block 262. As illustrated, the IF portion 263 includes a partially built expression for comparing to determine if the instrument bid quantity is greater than something. However, since this expression is not syntactically meaningful, it is invalid. Note that consequently, the background of the IF portion 263 is red and not green to indicate this. Additionally, because the if-then-else construct building block 262 is not valid (because its IF portion 263 is not valid), the expression in the quantity area 212 is not valid, and therefore it too has a red background.

Figure 2G:
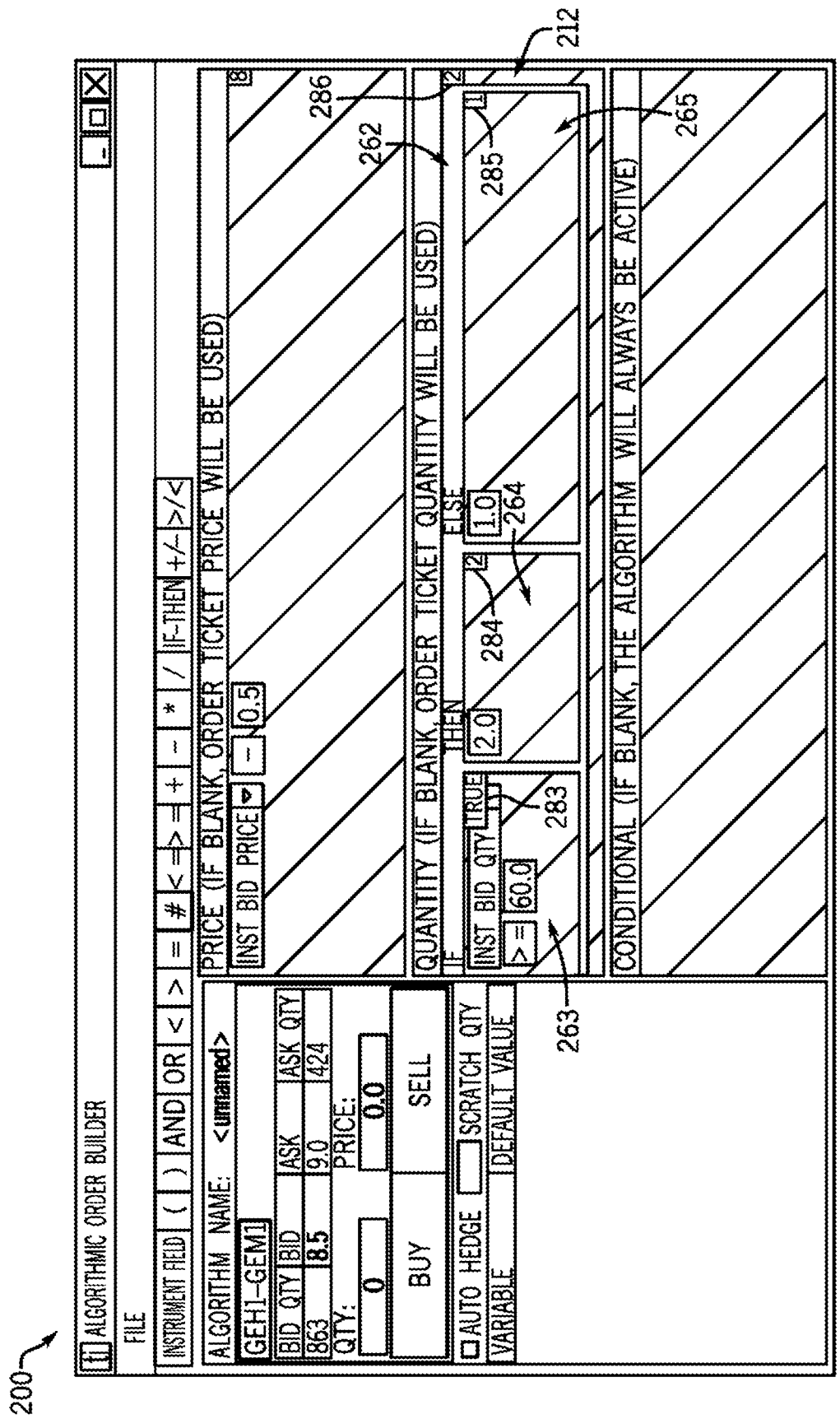

As illustrated in FIG. 2G, the if-then-else construct building block 262 now includes valid expressions in each of its portions and therefore the expression for the quantity area 212 is also valid.

Figure 2H:
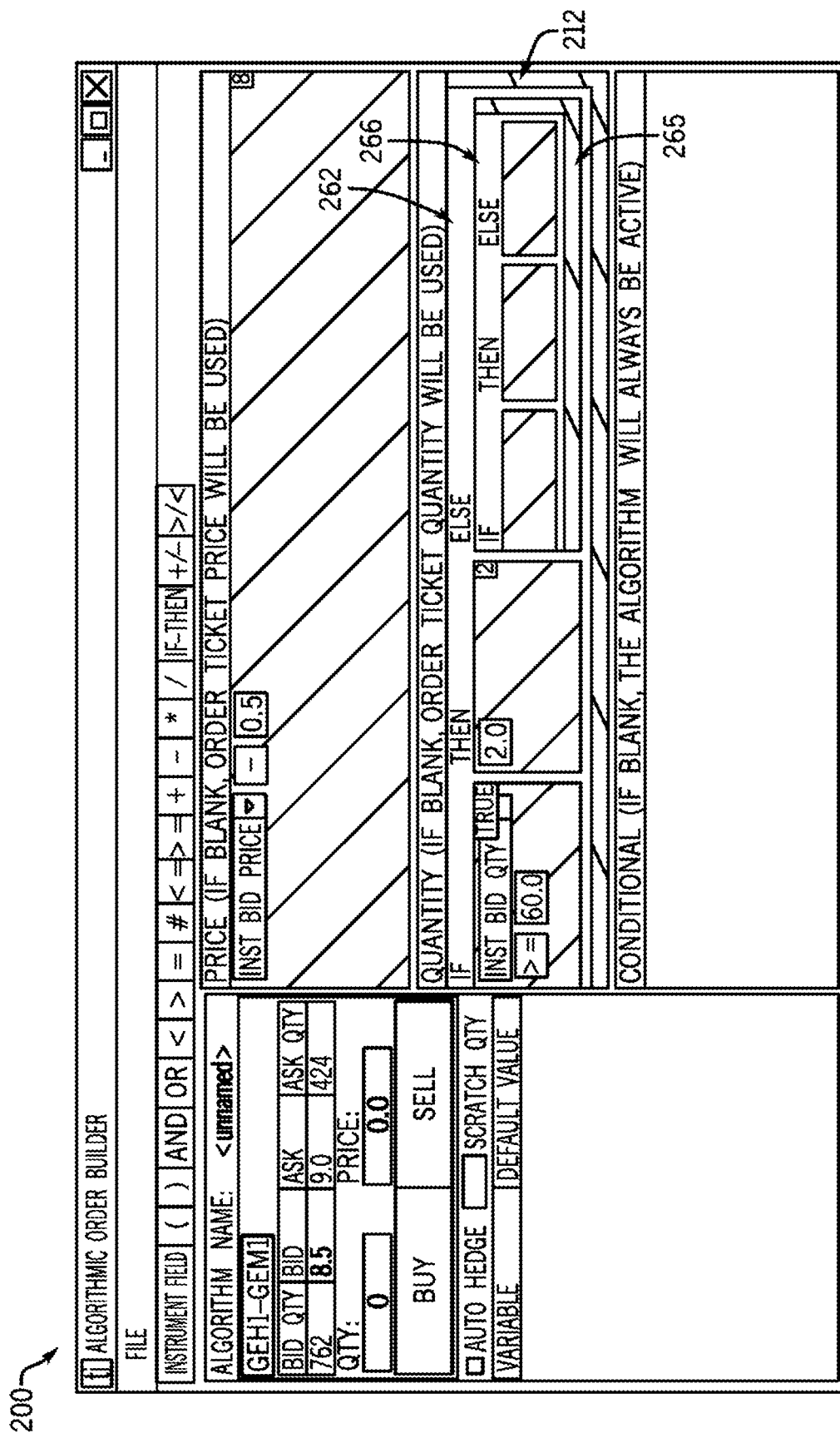

As illustrated in FIG. 2H, if-then-else construct building blocks may be nested. The ELSE portion 265 of the if-then-else construct building block 262 includes another if-then-else construct building bock 266. As illustrated, since the if-then-else construct building block 266 does not include any expressions in any of its portions it cannot be evaluated and is therefore an invalid expression in the ELSE portion 265 of the if-then-else construct building block 262. Consequently, the ELSE portion 265 has a red background to indicate its expression is invalid. Further, because the ELSE portion 265 has an invalid expression, the if-then-else construct building block 262 does not have a valid expression and therefore the background of the quantity area 212 is red.

Figure 2I:
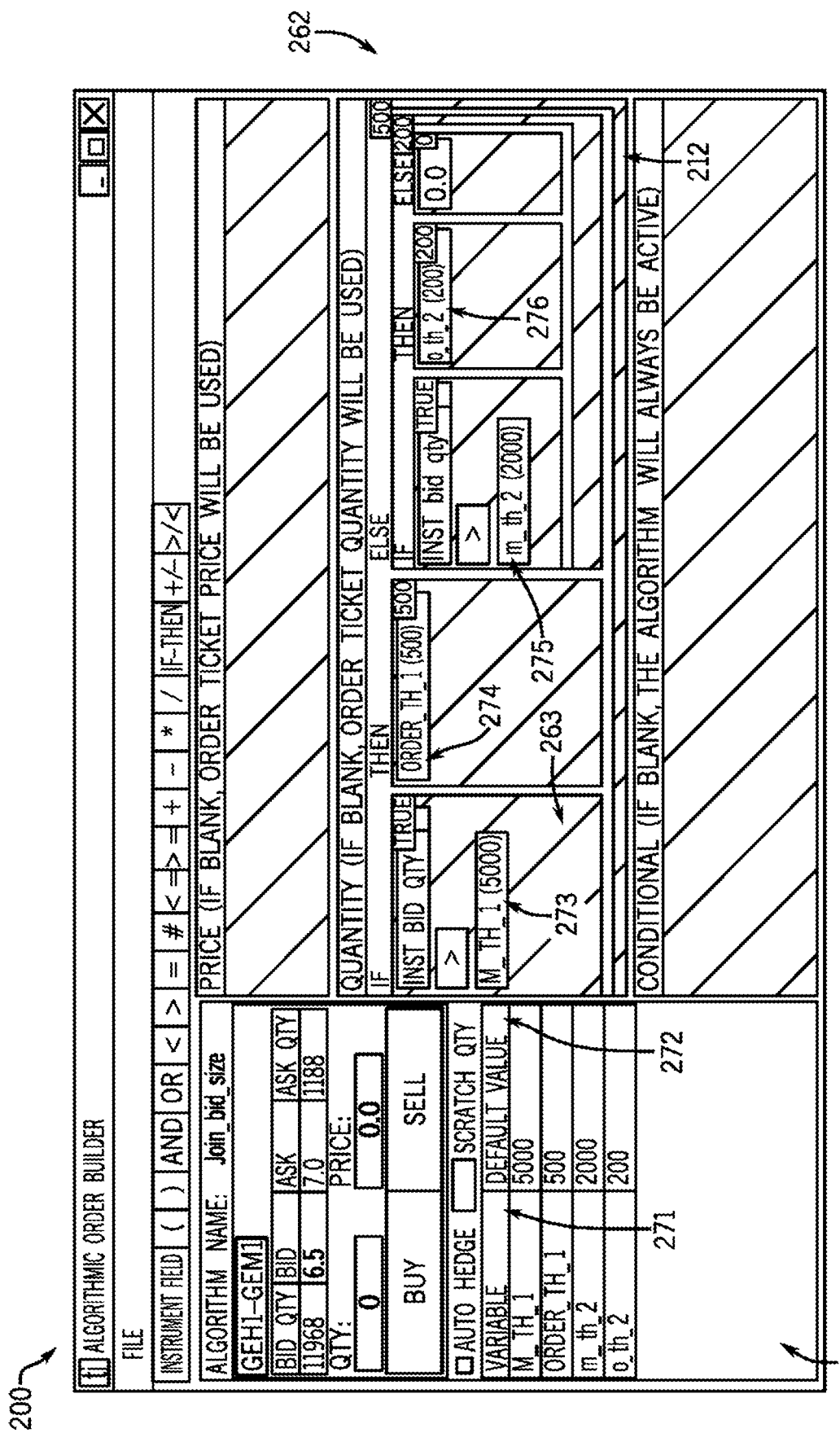

As illustrated in FIG. 2I, the expression in the IF portion 263 of the if-then-else construct building block 262 includes variable building blocks 273, 274, 275, and 276. The variable building blocks 273, 274, 275, and 276 may be placed by using a variable building block button or by selecting an option when using the constant value building block button to indicate that the constant value should be a variable. The variable building block 273 displays the name of the variable ("M_TH_1") and its value ("5000"). This may represent, for example, a minimum threshold. As discussed above, the variable area 206 displays each variable name and its value. As illustrated, variable area 206 includes a name column 271 with entries for each variable building block 273, 274, 275, and 276 and a default value column 272 with corresponding default value entries for each variable. A user can select a default value entry in the default value column 272 to change the default value of the respective variable building block, so that the new default value is used in the evaluation of the expression in the quantity area 212. Similarly, the user can select a name entry in the name column 271 to change the name of the respective variable building block. The variable building blocks 273, 274, 275, and 276 may allow a user to manipulate the behavior of the algorithm, rather than the underlying logic, by changing the value of the variable, which acts as a parameter to the algorithm, for example.

The trading interface 200 provides a live evaluation feature. The live evaluation feature, as illustrated in FIGS. 2C-2I, provides a display of an evaluation value for an expression. The live evaluation value may be provided as the algorithm is being defined, for example. The live evaluation value may be displayed in relation to the expression being evaluated, for example. The evaluation may be performed whenever an expression changes or the value of a building block in the expression changes. The evaluation may also be performed periodically or continuously. In certain embodiments, a live evaluation value may be provided for sub-expressions. In certain embodiments, a live evaluation value may be provided for individual elements of an expression.

As illustrated in FIG. 2C, as discussed above, the instrument bid price has been selected as the attribute for the instrument building block 232. The live evaluation 281 of the price area 211 displays "8.5", which is the current bid price for the instrument (also shown in the market grid 202). As illustrated in FIG. 2D, as discussed above, the expression in the price area 211 is invalid and therefore no live evaluation is displayed because the expression cannot be evaluated. As illustrated in FIG. 2E, the live evaluation 282 of the price area 211 displays an "8", which is the instrument bid price (8.5) minus the constant value (0.5).

In addition to live evaluation of the price area 211, the quantity area 212, and the conditional area 213, live evaluation may be performed for expressions within those areas. For example, as illustrated in FIG. 2G, live evaluations are provided for each of the portions of the if-then-else construct building block 262 as well as for the quantity area 212 itself. The live evaluation 283 for the IF portion 263 is "True" because the instrument bid quantity (863) is greater than or equal to 60. The live evaluation 284 for the THEN portion 264 is 2 because the expression in the THEN portion 264 is just the constant value 2. Similarly, the live evaluation 285 for the ELSE portion 265 is 1 because the expression in the ELSE portion 265 is just the constant value 1. The live evaluation 286 for the quantity area 212 is then "2" because the evaluation of the if-then-else construction building block 262 is the value of the THEN portion 264 because the IF portion 263 evaluates to "true".

The building block buttons 215 and algorithm area 210 of the trading interface 200 allow a user such as a trader or non-programmer to reduce the time and risk needed to develop an algorithm. This is achieved in part by reducing or eliminating syntax errors (for example, due to the complexities of particular programming languages) and providing live evaluation and feedback for the algorithm being built (for example, by flagging errors and allowing for debugging of logic while the algorithm is being built).

Once an algorithm has been defined in the algorithm area 210, it may be saved. An algorithm may also be given a name (for example, while the algorithm is being built and/or when the algorithm is saved). The saved algorithm may then be recalled or referenced at future time with the trading interface 200 or with another trading interface. For example, the saved algorithm may be loaded with the trading interface 200 so that it may be edited or re-used on another order. As another example, the saved algorithm may be referenced as an order type from another trading interface as discussed below.

Figure 2J:
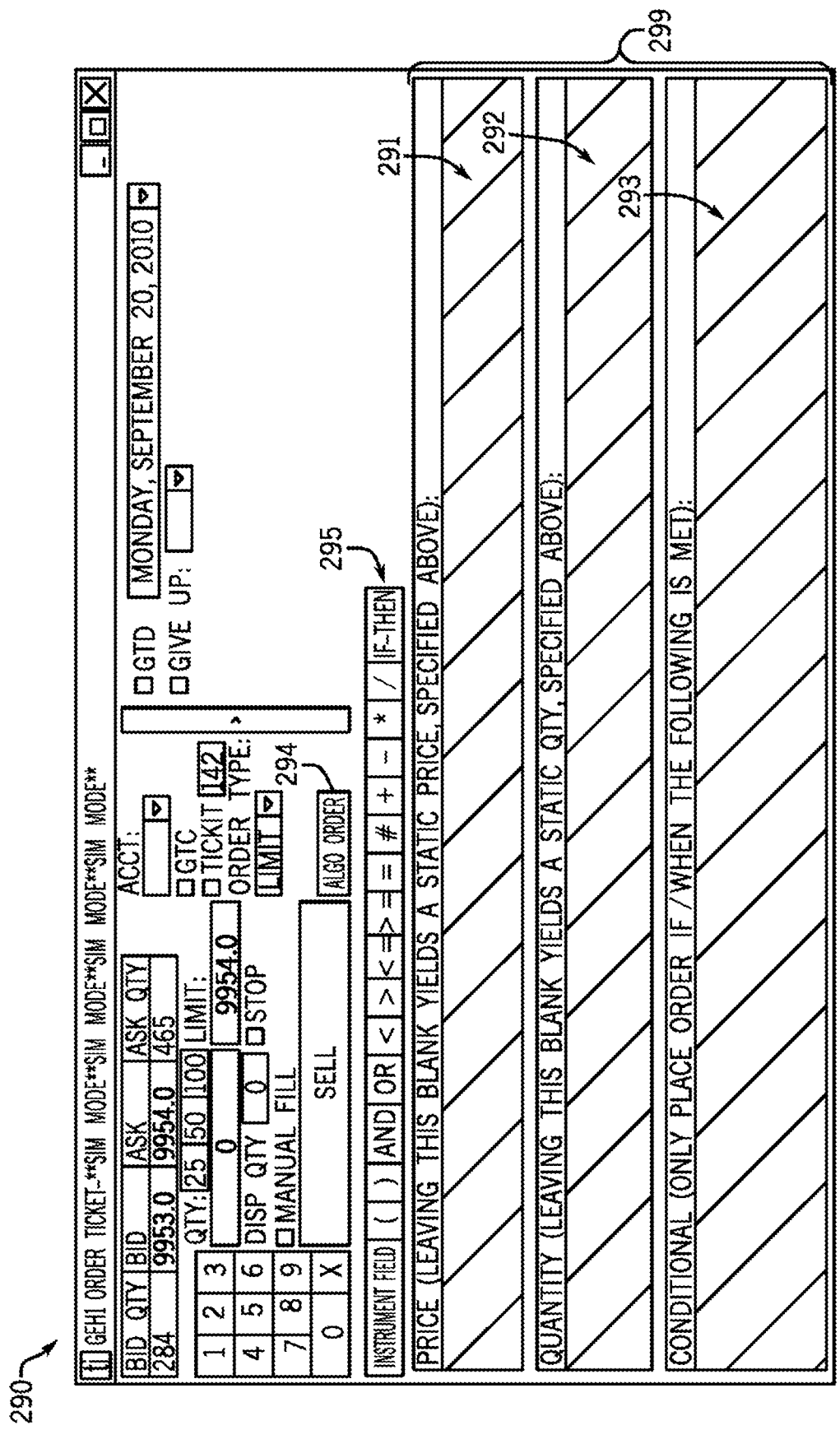
FIG. 2J illustrates a trading interface according to certain embodiments.

FIG. 2J illustrates a trading interface 290 according to certain embodiments. The trading interface 290 is an order ticket adapted to provide for initiating an order managed by an algorithm, where the algorithm is defined specifically for that order.

The trading interface 290 includes an algorithm area 299, an algorithm order button 294, and building block buttons 295. The algorithm area 299 includes a price area 292, a quantity area 293, and a conditional area 294. The price area 291 is similar to the price area 211 discussed above. The quantity area 292 is similar to the quantity area 212 discussed above. The conditional area 293 is similar to the conditional area 213 discussed above. The building block buttons 295 are similar to the building block buttons 215 discussed above.

The trading interface 290 may be used to initiate placement of typical trading orders. In addition, the algorithm order button 294 may be selected to enable the algorithm area 299. When enabled, the algorithm order area 299 provides for defining an algorithm using the price area 291, the quantity area 292, and the conditional area 293 in a manner similar to that discussed above for the trading interface 200. Once the algorithm has been defined in the algorithm area 299 and initiated, it is managed according to the defined algorithm in a manner similar to that discussed above for the trading interface 200.

Similarly, an algorithm area and building block buttons similar to those in trading interface 200 and 290 may be incorporated into other components of a trading application. For example, a hedge manager interface may be adapted to incorporate similar features so that an algorithm may be defined and specified to manage a hedge order.

The components, elements, and/or functionality of the trading interface 200 and the trading interface 290 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, EPROM, and/or file server, for execution on a general purpose computer or other processing device.

III. Algo Design Lab

Certain embodiments provide a design canvas area and blocks for designing an algorithm. Certain embodiments provide blocks with complex functionality for use in an algorithm. Certain embodiments provide for grouping blocks placed in the design canvas area. Certain embodiments provide for virtualized group blocks enabling dynamic instantiation of portions of an algorithm to handle particular discrete events. Certain embodiments allow for adjusting both the parameters and the logic of an algorithm rapidly, even during a single trading session. Certain embodiments provide live feedback for blocks as the algorithm is being designed. Certain embodiments provide safety features to reduce potential errors when an algorithm is designed. Certain embodiments provide for operation of some or all portions of an algorithm when a connection between a client device and an algorithm server is broken. Certain embodiments reduce the risks of traditionally programmed algorithms such as syntax errors, unclear logic, and the need for a non-trader programmer to develop the algorithm as specified by a trader by reducing or eliminating the writing of programming code by a user. Certain embodiments provide a single application for building, debugging, and simulating (with real market data) an algorithm all at the same time. In addition, the single application may also provide for initiating the placement of orders using the algorithm.

Figure 3A:
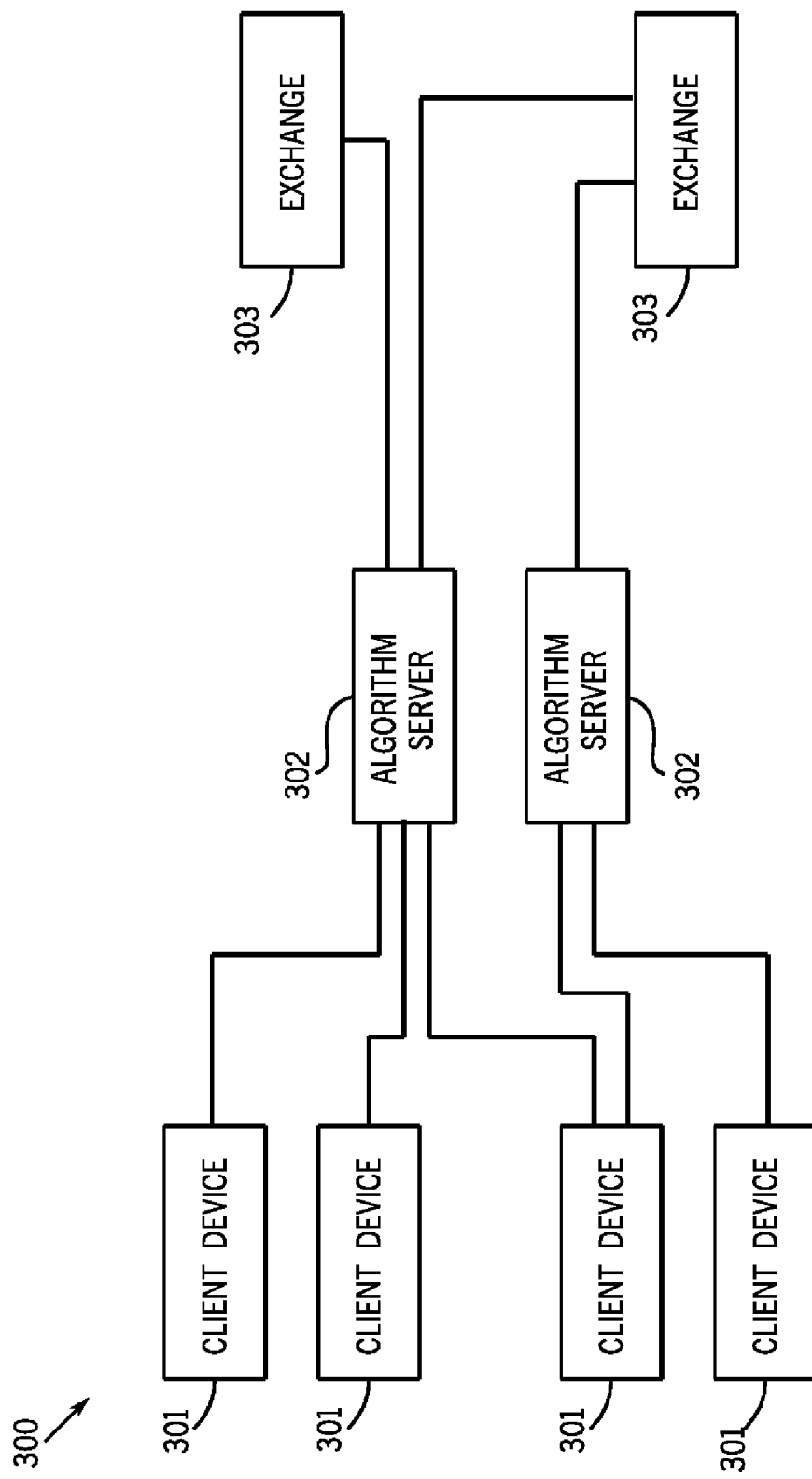
FIG. 3A illustrates a block diagram of an electronic trading system in which certain embodiments may be employed.

FIG. 3A illustrates a block diagram of an electronic trading system 300 in which certain embodiments may be employed. The system 300 includes one or more client devices 301, one or more algorithm servers 302, and one or more electronic exchanges 303. Each client device 301 is in communication one or more algorithm servers 302. Each algorithm server 302 is in communication with one or more exchanges 303. In addition, in certain embodiments, although not shown in FIG. 3A, a client device 301 may also be in communication with one or more exchanges 303. Communication with an exchange by a client device 301 and/or an algorithm server 302 may be done through a gateway similar to the gateway 120, discussed above, for example.

Client device 301 may be similar to client device 110, discussed above, for example. In certain embodiments, the client device 301 may be referred to as a trader terminal. Exchange 303 may be similar to exchange 130, discussed above, for example.

In certain embodiments, the algorithm server 302 is located physically near or at an exchange 303. In certain embodiments, the algorithm server 302 is part of the client device 301.

In operation, an algorithm for electronic trading may be designed on a client device 301. The algorithm may then be communicated to an algorithm server 302. The algorithm server 302 executes the algorithm to perform electronic trading with the exchange 303. Market data may be received by the algorithm server 302 for use by the algorithm. In addition, market data may be received by the client device 301 for use in designing the algorithm. The market data may be received from the exchange 303, for example. As another example, market data may be received from a simulator or from stored/historical data.

Figure 3B:
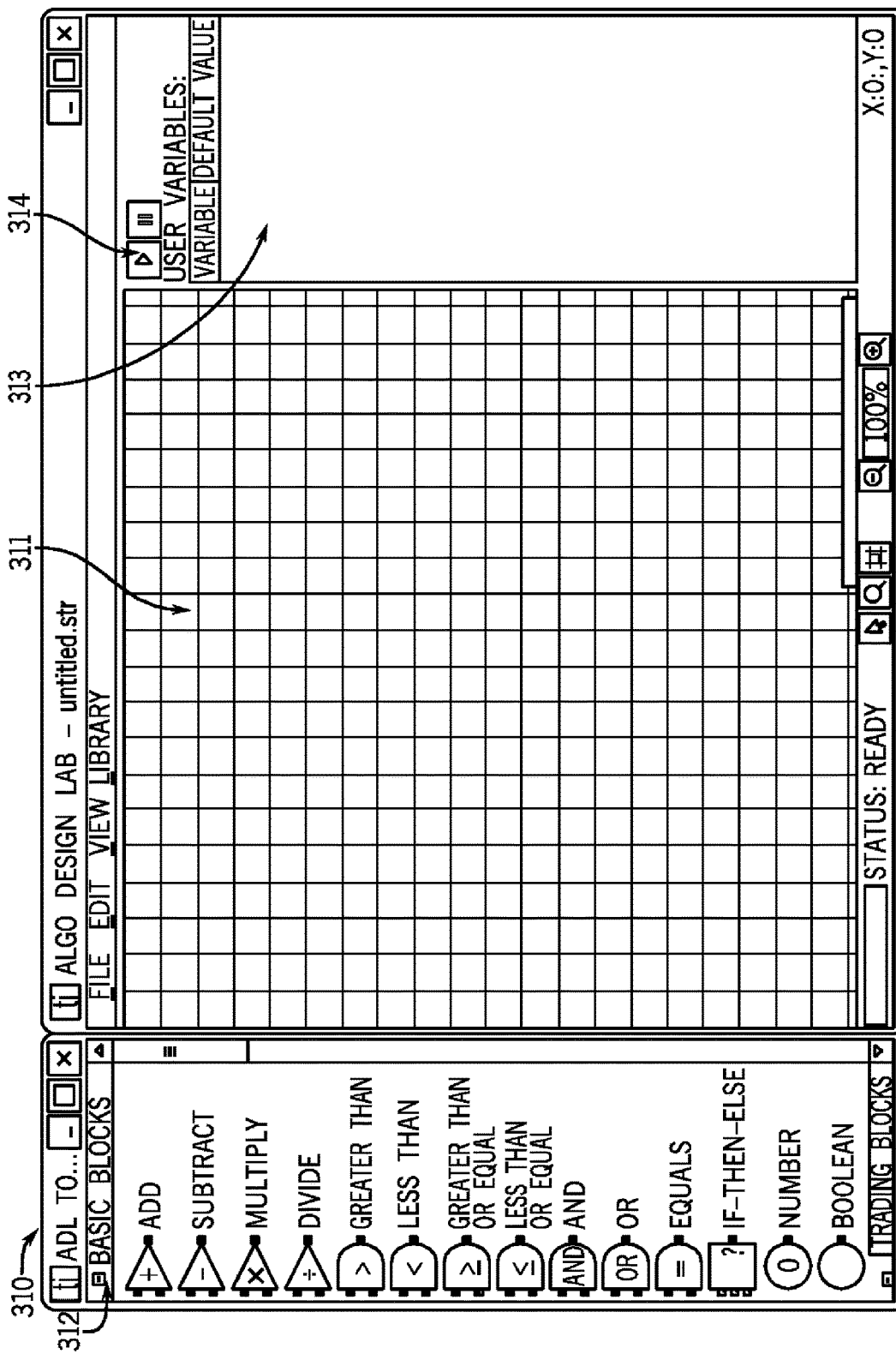
FIG. 3B illustrates a trading interface according to certain embodiments.

FIG. 3B illustrates a trading interface 310 according to certain embodiments. The trading interface 310 is a trading interface for an algorithmic trading application referred to as the Algo Design Lab ("ADL"). The ADL allows a trader to design an algorithm for electronic trading. However, it should be understood that elements of the illustrated trading interface 310 may be incorporated into other trading interfaces.

The trading interface 310 includes a design canvas area 311, a block list area 312, a variable area 313, and a control area 314. In certain embodiments one or more of these areas may be in separate windows or toolbars. For example, the block list area 312 may be in a separate window from the design canvas area 311.

In operation, an algorithm is defined in the design canvas area 311 by utilizing one or more block from the block list area 312. Default values for user-defined variables in the algorithm may be specified using the variable area 313. Once the algorithm has been defined, the algorithm may be simulated using controls in the control area 314 to indicate how the logic of the algorithm will behave. An order to be managed according to the defined algorithm may then be initiated using a trading interface.

The design canvas area 311 provides for defining an algorithm. The design canvas area 311 may also be referred to as a whiteboard area. The design canvas area 311 provides a visual programming environment for designing the algorithm. Designing an algorithm includes building, testing, simulating, and/or evaluating the algorithm.

In certain embodiments, the design canvas area 311 is the primary focus of the interface for the trading application 310 and may be a large, white space, for example. In the design canvas area 311, blocks may be arranged according to the preference of the user. In certain embodiments, the design canvas area 311 provides grid lines that may be used to arrange the blocks. In certain embodiments, the design canvas area 311 includes an overview display or map that may be used to navigate through a large algorithm with many blocks. In certain embodiments, the design canvas area 311 may be zoomed in or out so that a user may see more or less of the algorithm at a time.

Blocks are placed in the design canvas area 311 and connected to define the algorithm. The blocks to be placed may be selected from the block list area 312. Once a block has been placed, it may then be connected to other placed blocks.

The block list area 312 includes one or more blocks which may be selected and placed in the design canvas area 311. Blocks represent different functionalities that may be combined according to user preference to build an algorithm.

In general, blocks have inputs and outputs. However, certain blocks may have only inputs and others may have only outputs. For example, a pause block may have only an input. As another example, a number block may have only an output.

Inputs and outputs of blocks are of one of two primary types: continuous or discrete. A continuous type input/output, at any particular point in time (hence continuous) has a value. A discrete type input/output receives/provides discrete events (individual messages/objects) corresponding to specific actions/events that occur at some particular point in time. When a specific action/event occurs, a corresponding discrete event may be generated.

In addition to the primary type of the input/output, an input/output may have a particular value types. For example, a continuous input might have a value type of Boolean, number, integer, floating point number, or instrument. As another example, a block may have two continuous inputs of a variable value type, where the value type for the two inputs may be Boolean or numeric, for example, but must match. An equals block, which takes two inputs and compares them to output a Boolean indicating whether the inputs are equal may have variable inputs so that it may be used to compare Booleans or numbers or instruments, for example. As another example, a discrete output might have a value type of fill confirmation. That is, the discrete output might provide fill confirmation discrete events. As another example, a discrete output might provide more than one type of discrete event for actions such as order request confirmations (indicating an order was placed), fill confirmations (indicating an order was filled or partially filled), order change confirmations (indicating a working order parameters such as price or quantity was changed), order deletion confirmations (indicating a working order was deleted or cancelled), or trade confirmations (indicating a trade has occurred). As another example, a discrete event may be empty in that it indicates only that an event has occurred. An empty discrete event may, for example, be triggered by a timer, a change in a Boolean value, or used to activate a portion of an algorithm at a particular time (such as a time of day or a time when certain market conditions have been met, for example). A discrete event of a particular type may include different information than a discrete event of another type. For example, an order confirmation may include information such as an order identifier and/or an instrument. As another example, a fill confirmation discrete event may include information such as an order identifier, price, quantity, instrument, and/or time of a fill. As another example, an order deletion confirmation may include an order identifier, instrument, and/or time of deletion. As another example, an empty discrete event may not include any information (or may include only a time the event occurred). A discrete event may include user-defined information. For example, a discrete event a fill confirmation for a filled order for instrument A may include user-defined market information such as a bid price in instrument B at the time of the fill in instrument A.

In certain embodiments, a block includes indicators of the primary type for its inputs/outputs. For example, continuous inputs/outputs may be indicated with a particular background color, foreground color, background pattern, border color, border style, shape, symbol, number, text, and/or font and discrete inputs/outputs might be indicated with another color, pattern, border, shape, symbol, number, text, and/or font.

In certain embodiments, a block includes indicators of the value type for its inputs/outputs. For example, inputs/outputs with a particular value type may be indicated with a particular background color, foreground color, background pattern, border color, border style, shape, symbol, number, text, and/or font and inputs/outputs with a different value type may be indicated with another color, pattern, border, shape, symbol, number, text, and/or font.

In certain embodiments, the primary type and/or the value type of an input or output is displayed in a pop-up window when a cursor is positioned near the block. In certain embodiments, information about the configuration of a block is displayed in a pop-up window when a cursor is positioned near the block.

Blocks represent different functionality. In the trading interface 310, blocks have been separated into four general categories of functionality: basic blocks, trading blocks, discrete blocks, and miscellaneous blocks. However, these groupings are for convenient organization and utilization by a user; blocks do not need to be grouped and a block's group does not necessitate particular features. Some blocks may appropriately fit in more than one category and other organizations or groupings of blocks may also be employed.

Basic blocks generally have continuous inputs and outputs and provide arithmetic operations (for example, addition, subtraction, multiplication, and division), logical operations (for example, AND, OR, and comparison such as equality, greater than, and less than), constant values (for example, number and Boolean), and if-then-else constructs.

Trading blocks generally provide more complex functionality related to manipulating an order (for example, placing an order, modifying an existing order, or deleting an order) or order-related information (for example, a fill confirmation). Trading blocks may have both continuous and discrete inputs and outputs. For example, a market maker block may have continuous inputs for specifying an instrument, price, quantity, and condition for quoting an order and may have a continuous output of the working quantity and a discrete output for providing notification of fills. Trading blocks allow users, including non-programmers (such as traders), to utilize a visual design environment (such as that provided by the ADL) to create and deploy trading algorithms. The trading blocks may allow for more rapid and accurate design of an algorithm as compared to a typical programmer with fewer steps or instructions as compared to other visual programming platforms.

Discrete blocks generally have discrete inputs and outputs and provide operations based on the occurrence of discrete events. For example, a generator block may generate an occurrence of a discrete event. As another example, a value extractor block may extract a value from a discrete event and make it available as a continuous value to another portion of the algorithm. As another example, a sequencer block may be used to control the sequence in which subsequent blocks are processed in response to a discrete event. Certain discrete blocks may store data to be referenced at a subsequent time. For example, a value accumulator block may receive a discrete event and extract a user-specified value from it. The extracted value may be accumulated with values extracted from each received discrete event.

Miscellaneous blocks provide a variety of functionality that may not necessary fit into the above-discussed categories. For example, these blocks may provide special purpose or more complex calculations or may add additional control to the execution of the algorithm itself. Further, miscellaneous blocks may provide more precise tools to control risk, convert numbers into tradeable values, or use time (either precise or elapsed) as an input or variable.

Figure 3C:
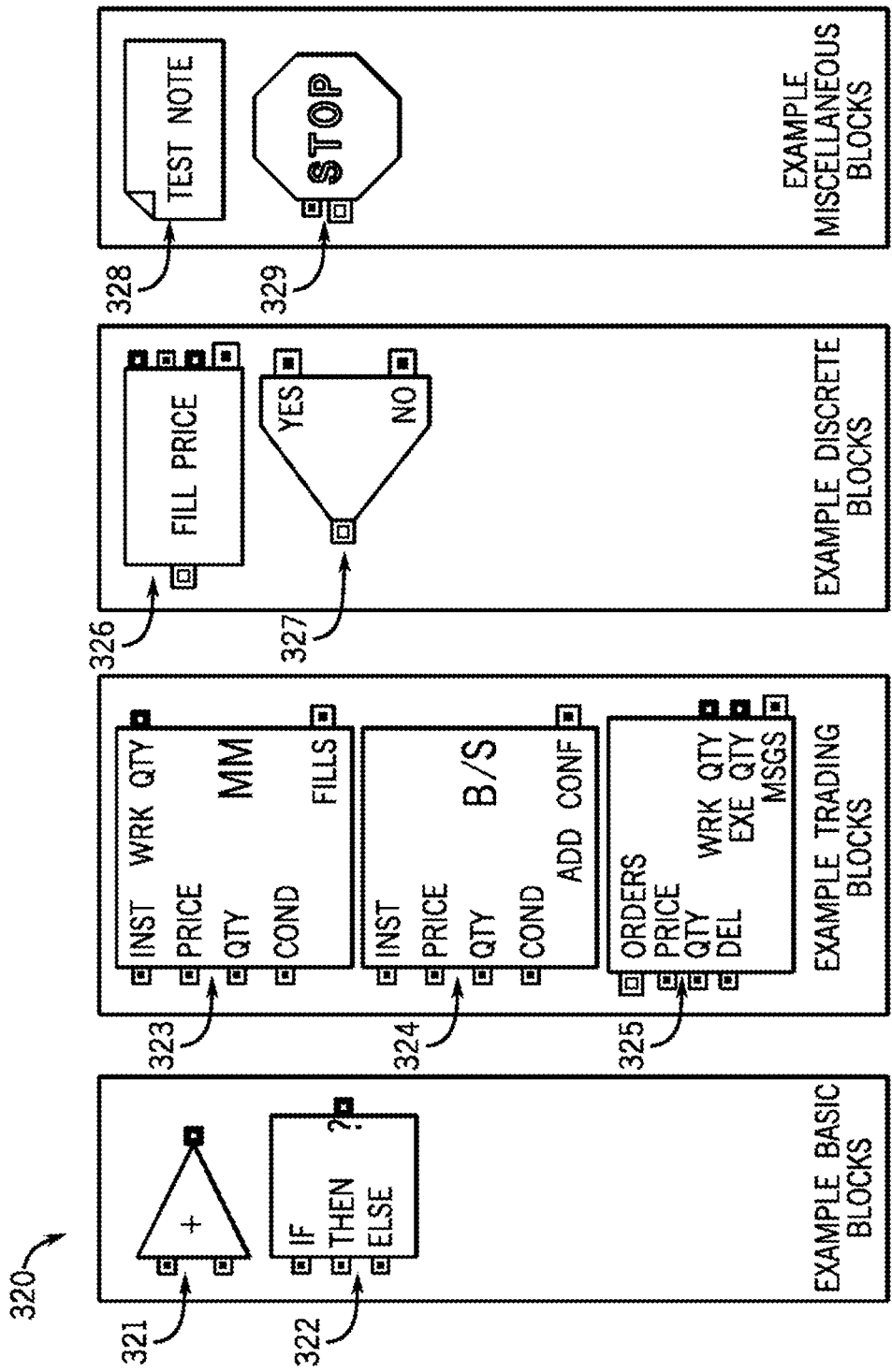
FIG. 3C illustrates examples of blocks that may be used in the trading interface according to certain embodiments.

FIG. 3C illustrates examples of blocks 320 that may be used in the trading interface 310 according to certain embodiments. Example blocks from each of the categories identified above are illustrated. Example basic blocks include the add block 321 and the if-then-else block 322. Example trading blocks include the market maker block 323, the conditional buy/sell block 324, and the order handler block 325. Example discrete blocks include the value extractor block 326 and the branch block 327. Example miscellaneous blocks include the note block 328 and the pause block 329. Each of these blocks, along with other examples of blocks that may be included in certain embodiments are discussed in more detail below.

Basic blocks may include add, subtract, multiply, divide, greater than, less than, greater than or equal, less than or equal, AND, OR, equals, IF-THEN-ELSE, number, Boolean, and constant blocks, for example.

An add block may add two continuous numeric inputs together to produce one continuous numeric output. The add block may have a triangular shape with a plus symbol ("+") in the middle, two continuous inputs on the left side, and one continuous output on the right side. The add block may also be referred to as an adder block.

A subtract block may subtract one continuous numeric input (for example, the bottom input) from a second continuous numeric input (for example, the top input) to produce one continuous numeric output. The subtract block may have a triangular shape with a minus symbol ("−") in the middle, two continuous inputs on the left side, and one continuous output on the right side.

A multiply block may multiply two continuous numeric inputs together to produce one continuous numeric output. The multiplier block may have a triangular shape with a multiplication symbol ("X" or "*") in the middle, two continuous inputs on the left side, and one continuous output on the right side.

A divide block may divide one continuous numeric input (for example, the top input) by a second continuous input (for example, the bottom input) to produce one continuous numeric output. The divide block may have a triangular shape with a division symbol ("/" or "÷") in the middle, two continuous inputs on the left side, and one continuous output on the right side.

A greater than block may compare two continuous numeric inputs to determine if one input (for example, the top input) is greater than a second input (for example, the bottom input). The output is a continuous Boolean output of TRUE if the first input is greater than the second input and FALSE for all other conditions. The greater than block may have a rectangular shape on the left side and an arched shape to the right side with a greater than symbol (">") in the middle, two continuous numeric inputs on the left side, and one continuous Boolean output on the right side.

A less than block may compare two continuous numeric inputs to determine if one input (for example, the top input) is less than a second input (for example, the bottom input). The output is a continuous Boolean output of TRUE if the first input is less than the second input and FALSE for all other conditions. The less than block may have a rectangular shape on the left side and an arched shape to the right side with a less than symbol ("<") in the middle, two continuous numeric inputs on the left side, and one continuous Boolean output on the right side.

A greater than or equal block may compare two continuous numeric inputs to determine if one input (for example, the top input) is greater than or equal to a second input (for example, the bottom input). The output is a continuous Boolean output of TRUE if the first input is greater than or equal to the second input and FALSE for all other conditions. The greater than or equal block may have a rectangular shape on the left side and an arched shape to the right side with a greater than or equal to symbol (">=" or "≥") in the middle, two continuous numeric inputs on the left side, and one continuous Boolean output on the right side.

A less than or equal block may compare two continuous numeric inputs to determine if one input (for example, the top input) is less than or equal to a second input (for example, the bottom input). The output is a continuous Boolean output of TRUE if the first input is less than or equal to the second input and FALSE for all other conditions. The less than or equal block may have a rectangular shape on the left side and an arched shape to the right side with a less than or equal to symbol ("<=" or "≤") in the middle, two continuous numeric inputs on the left side, and one continuous Boolean output on the right side.

An AND block may perform a logical conjunction of two continuous Boolean inputs such that if a first input (for example, the top input) is TRUE and a second input (for example, the bottom input) is TRUE, then the Boolean output is TRUE. If either of the inputs is FALSE, then the output value is FALSE. The AND block may have a rectangular shape on the left side and an arched shape to the right side with "AND" text in the middle, two continuous Boolean inputs on the left side, and one continuous Boolean output on the right side.

An OR block may perform a logical disjunction of two continuous Boolean inputs such that if either of the inputs is TRUE, then the Boolean output is TRUE. If both inputs are FALSE, then the output value is FALSE. The OR block may have a rectangular shape on the left side and an arched shape to the right side with "OR" text in the middle, two continuous Boolean inputs on the left side, and one continuous Boolean output on the right side.

An equals block may compare two continuous inputs to determine if one input (for example, the top input) is equal to a second input (for example, the bottom input). The inputs may be of variable value type so that the equals block may accept values such as numeric, Boolean, or instrument, as long as each input is of the same type. The output is a continuous Boolean output of TRUE if the two inputs are equal and FALSE for all other conditions. The equals block may have a rectangular shape on the left side and an arched shape to the right side with an equals symbol ("=") in the middle, two continuous variable inputs on the left side and one continuous Boolean output on the right side. The equals block may also be referred to as an equality block.

An IF-THEN-ELSE block may have three continuous inputs: a Boolean IF input, a variable THEN input, and a variable ELSE input. The IF-THEN-ELSE block has one continuous variable output. If the IF input value is TRUE, the output is the value of the THEN input. If the IF input value is FALSE, the output is the value of the ELSE input.

The IF-THEN-ELSE block may have a rectangular shape with a "?" symbol in the middle, one continuous Boolean IF input and two continuous variable ELSE and THEN inputs on the left side, and one continuous variable output on the right side.

A number block may have one continuous numeric output that provides a numeric value specified by the user. When placed, the user may be prompted to enter the numeric value for the number block. Alternatively, the number block may default to a predefined value such as 1. In addition, the value may be specified to the order ticket quantity or order ticket price. If so, the value of the number block will be the respective value specified when an order is initiated to be managed using the algorithm. The specified value may be changed by the user during the design of the algorithm by, for example, selecting the number block and using an action such as a menu item or double-click to be prompted to enter a value. The specified value may also be changed if the number block is specified to be variable using the variable area 313 discussed below. The number block may have a circular shape with the specified number in the middle and one continuous numeric output on the right side. This block may also be referred to as a constant number block.

A Boolean block may have one continuous Boolean output that provides a Boolean value specified by the user. When placed, the user may be prompted to enter the Boolean value for the Boolean block. Alternatively, the Boolean block may default to a predefined value such as TRUE. The specified value may be changed by the user during the design of the algorithm by, for example, selecting the Boolean block and using an action such as a menu item or double-click to be prompted to enter a value. The specified value may also be changed if the Boolean block is specified to be variable using the variable area 313 discussed below. The Boolean block may have a circular shape with the specified Boolean value displayed textually in the middle and one continuous Boolean output on the right side. This block may also be referred to as a constant Boolean block.

In certain embodiments, the number block and the Boolean block may be consolidated into a single block such as a constant block. A constant block may have one continuous variable output that provides a value specified by the user. When placed, the user may be prompted to enter the value type and value for the constant block. Alternatively, the constant block may default to a predefined value type such as numeric and a predefined value such as 1. In addition, the value may be specified to the order ticket quantity or order ticket price. If so, the value of the constant block will be the respective value specified when an order is initiated to be managed using the algorithm. The specified value may be changed by the user during the design of the algorithm by, for example, selecting the constant block and using an action such as a menu item or double-click to be prompted to enter a value. The specified value may also be changed if the constant block is specified to be variable using the variable area 313 discussed below. The constant block may have a circular shape with the specified value displayed textually in the middle and one continuous variable output on the right side. In certain embodiments, the constant block may also support specifying an instrument for value, similar to the instrument block discussed below.

Trading blocks may include instrument, instrument attribute, market maker, legger, custom spread, responsive buy/sell, conditional buy/sell, order handler, IF-THEN-ELSE instrument, instrument attribute at price, spread between, trade, order, fill calculator, and fill accumulator blocks, for example.

An instrument block may have one continuous instrument output that provides an instrument name. The instrument name may be an exchange-listed instrument or a synthetic instrument, for example. When placed, the user may be prompted to specify the instrument name for the instrument block. The instrument name may be selected from a list, for example. Alternatively, the instrument block may default to a predefined value. The specified value may be changed by the user during the design of the algorithm by, for example, selecting the instrument block and using an action such as a menu item or double-click to be prompted to enter a value. The specified value may also be changed if the instrument block is specified to be variable using the variable area 313.

An instrument attribute block may have a continuous instrument input and a continuous numeric output. The instrument attribute block may take an instrument name and output a value for a specified attribute of that instrument. Attributes may include best bid quantity, best bid price, best ask quantity, best ask price, volume, session high price, session low price, minimum tradeable increment, last traded price, last traded quantity, total quantity (total quantity traded at the last traded price, until a trade occurs at a new price), settlement price from previous trading session, real (non-implied) best bid quantity, real (non-implied) best ask quantity, bid headcount (number of orders in the market at the best bid price), ask headcount (number of orders in the market at the best ask price), or position (user's overall inventor in a particular instrument). When placed, the user may be prompted to enter the attribute to be provided by the instrument attribute block. Alternatively, the instrument attribute block may default to a predefined value such as bid quantity. The specified attribute may be changed by the user during the design of the algorithm by, for example, selecting the instrument attribute block and using an action such as a menu item or double-click to be prompted to enter an attribute. The specified attribute may also be changed if the instrument attribute block is specified to be variable using the variable area 313 discussed below.

A market maker block may submit a buy or sell order for a tradeable object specified by a continuous instrument input at a price and quantity specified by two continuous numeric inputs, when the condition continuous Boolean input is TRUE. The condition input is optional and defaults to TRUE if no input is provided. The market maker block may delete the order when the condition input is FALSE. The market maker block may also modify an existing order's price or quantity if the respective price and quantity input values change. The value specified in the quantity input represents the maximum desired fill quantity, taking into account prior fills. For example, if quantity input value of 5 is provided, an order for 5 may be entered into a market and if a quantity of 3 is filled, an order of 2 will continue to be worked, even if the price input changes. If the quantity input changes, the order worked will be for the new quantity specified minus the already filled quantity of 3. The market maker block may provide one or more discrete outputs that provide fill confirmation and/or order request discrete events. The market maker block may include an option to specify that orders generated by the market maker block should stay in the order book even if the algorithm is deleted, halted, stopped, or paused. This feature may be useful for hedging portions of algorithms, for example. The market maker block may include an option to specify that an order generated by the market maker block is to be marked as hung while it is displayed in the order book, which may make it easier to identify an improperly functioning or incomplete algorithm (if, for example, orders are not expected to stay in the order book). The market maker block may also include an option to specify a color or textual flag to be associated with orders placed by the market maker block to make them easier to identify in an order window, for example.

A legger block may submit buy or sell orders for tradeable objects of legs of a custom spread, where the tradeable objects for each leg are specified by a continuous instrument input. The price and quantity desired for the custom spread are specified by two continuous numeric inputs. The legger block works an individual order(s) for the spread when the condition continuous Boolean input is TRUE. The condition input is optional and defaults to TRUE if no input is provided. The legger block may delete the order(s) when the condition input is FALSE. The legger block may also modify the price and/or quantity of a working order(s) if the price and/or quantity input values change. The value specified in the quantity input represents the maximum desired fill quantity of the spread, taking into account prior fills. For example, if quantity input value of 5 is provided, an order for 5 may be entered into a market and if a quantity of 3 is filled, an order of 2 will continue to be worked, even if the price input changes. If the quantity input changes, the order worked will be for the new quantity specified minus the already filled quantity of 3. The legger block may provide one or more discrete outputs that provide spread fill, order request, and/or leg fill discrete events. After instruments have been provided for the legs of the spread, the legger may be configured by, for example, selecting the legger block and using an action such as a menu item or double-click to be prompted to specify parameters and settings. Parameters that may be specified for each leg of the spread include "multiple" (the coefficient of the spread leg), "trade quantity" (quantity for each leg of the spread, where a positive number is a buy and a negative number is a sell), "work market?" (toggle whether the leg of the spread will actively quote), "net change" (toggle whether to convert the custom spread calculation to a net change rather than price), "pay-up ticks" (number of minimum price increments through which the custom spread will enter a limit order on a lean leg; a positive number means more aggressive to get filled, a negative number means less aggressive to get filled), and "lean ratio" (quantity units required to exist on a lean leg in order to work one quantity unit on a quoting leg; this may be a ratio of quantity between the two legs or an threshold quantity in the lean leg, for example). Settings that may be specified include "side" (buy or sell the custom spread), "always work inside market" (toggle that, when true, legger block will only work individual leg orders that appear on the best or inside market and, in certain embodiments, will only work the leg more likely to get filled as determined by looking at market bid/ask size ratios), "disable 'sniping' mode" (toggle the default behavior that if the legger block can achieve the desired spread price, it will delete the current working orders and simultaneously submit orders on all legs to get filled at the desired spread price; when disabled, the legger block will only work the specified "work market?" legs even if the desired price becomes momentarily available), "clip size" (quantity to be worked at one time incrementally increasing until the total quantity has been filled as defined by the provided spread quantity input), and "flag" (specifies a user-defined flag associated with a spread fill discrete event to make identifying them easier). The legger block may include an option to specify that orders generated by the legger block should stay in the order book even if the algorithm is deleted, halted, stopped, or paused. The legger block may include an option to specify that an order generated by the legger block is to be marked as hung while it is displayed in the order book, which may make it easier to identify an improperly functioning or incomplete algorithm (if, for example, orders are not expected to stay in the order book). The legger block may also include an option to specify a color or textual flag to be associated with orders placed by the legger block to make them easier to identify in an order window, for example. This block may also be referred to as an autospreading block or a spreader block.

A custom spread block may submit buy or sell orders for tradeable objects of legs of a custom spread, where the custom spread is provided as an instrument from an external application. The price and quantity desired for the custom spread are specified by two continuous numeric inputs. The custom spread block works an individual order(s) for the spread when the condition continuous Boolean input is TRUE. The condition input is optional and defaults to TRUE if no input is provided. The custom spread block may delete the order(s) when the condition input is FALSE. The custom spread block may also modify the price and/or quantity of a working order(s) if the price and/or quantity input values change. The value specified in the quantity input represents the maximum desired fill quantity of the spread, taking into account prior fills. For example, if quantity input value of 5 is provided, if a quantity of 3 is filled, an order of 2 will continue to be worked, even if the price input changes. If the quantity input changes, the order worked will be for the new quantity specified minus the already filled quantity of 3. The custom spread block may include an optional Boolean input to enable dynamic sizing of the order quantities of the legs of the individual orders instead of requiring the original order quantity to be present on hedging legs. The custom spread block may provide one or more discrete outputs that provide fill confirmation and/or order request discrete events. When placed, the user may be prompted to specify a custom designed instrument from an external application, where the custom designed instrument provides synthetic market data representing a trading strategy. Alternatively, specified custom designed instrument may be specified and/or changed by the user during the design of the algorithm by, for example, selecting the custom spread block and using an action such as a menu item or double-click to be prompted to specify the custom designed instrument from an external application. Additionally, during the design of the algorithm, a user may specify settings that may include "disable 'sniping' mode" (toggle the default behavior that if the custom spread block can achieve the desired spread price, it will delete the current working orders and simultaneously submit orders on all legs to get filled at the desired spread price; when disabled, the custom spread block will only work the specified quoting legs even if the desired price becomes momentarily available) and "clip size" (quantity to be worked at one time incrementally increasing until the total quantity has been filled as defined by the provided spread quantity input). The custom spread block may include an option to specify that orders generated by the custom spread block should stay in the order book even if the algorithm is deleted, halted, stopped, or paused. The custom spread block may include an option to specify that an order generated by the custom spread block is to be marked as hung while it is displayed in the order book, which may make it easier to identify an improperly functioning or incomplete algorithm (if, for example, orders are not expected to stay in the order book). The custom spread block may also include an option to specify a color or textual flag to be associated with orders placed by the custom spread block to make them easier to identify in an order window, for example. In certain embodiments, a custom spread block may provide a specified custom designed instrument from an external application as a continuous instrument output. In certain embodiments, a custom spread block may provide a specified numeric or Boolean value from an external application as a continuous numeric or Boolean output. This block may also be referred to as a custom strategy block or custom external application block.

A responsive buy/sell block may initiate placement of a buy or sell order for an instrument specified by a continuous instrument input when a discrete event is received on a discrete input. The price and/or quantity to place the order at may be provided by continuous numeric inputs. Alternatively, the price and/or quantity may be specified by user-defined equations that are evaluated to determine the respective price or quantity value to be used. In certain embodiments, one of the price and quantity may be provided by a continuous numeric input and the other may be provided by evaluating a user-defined equation. The specified equation(s) for price and/or quantity (if used) may be changed by the user during the design of the algorithm by, for example, selecting the responsive buy/sell block and using an action such as a menu item or double-click to be prompted to enter the equation(s). An equation may be entered textually or using building block buttons similar to the building block buttons 215 discussed above, for example. Once the responsive buy/sell block has initiated placement of the order, the order is not updated based on subsequent changes in the provided price and/or quantity values. The responsive buy/sell block may include an option to specify that orders generated by the responsive buy/sell block should stay in the order book even if the algorithm is deleted, halted, stopped, or paused. The responsive buy/sell block may include an option to specify that an order generated by the responsive buy/sell block is to be marked as hung while it is displayed in the order book, which may make it easier to identify an improperly functioning or incomplete algorithm (if, for example, orders are not expected to stay in the order book). The responsive buy/sell block may also include an option to specify a color or textual flag to be associated with orders placed by the responsive buy/sell block to make them easier to identify in an order window, for example.

A conditional buy/sell block may initiate placement of a buy or sell order for an instrument specified by a continuous instrument input at a price and quantity specified by two continuous numeric inputs, when the condition continuous Boolean input is TRUE. The condition input is optional and defaults to TRUE if no input is provided. The conditional buy/sell block does not delete the order when the condition input value is FALSE (but an placement of an order is not initiated until the condition input becomes TRUE). The conditional buy/sell block may only submit one order at a time. In certain embodiments, the conditional buy/sell block will continue to submit orders (one at a time) to try to achieve the initially provided quantity value, even if the orders may be deleted (for example, by another block in the algorithm or manually by a user). Once the conditional buy/sell block has initiated placement of the order, the order is not updated based on subsequent changes in the provided price and/or quantity values. The conditional buy/sell block may provide one or more discrete outputs that provide fill confirmation and/or order request discrete events. The conditional buy/sell block may include an option to specify that orders generated by the conditional buy/sell block should stay in the order book even if the algorithm is deleted, halted, stopped, or paused. The conditional buy/sell block may include an option to specify that an order generated by the conditional buy/sell block is to be marked as hung while it is displayed in the order book, which may make it easier to identify an improperly functioning or incomplete algorithm (if, for example, orders are not expected to stay in the order book). The conditional buy/sell block may also include an option to specify a color or textual flag to be associated with orders placed by the conditional buy/sell block to make them easier to identify in an order window, for example.

An order handler block may receive an order event on a discrete input and manage the corresponding order based on price and quantity values provided by two continuous numeric inputs. If a value provided on a continuous Boolean input becomes TRUE, the order is deleted. The order handler block may provide one or more discrete outputs that provide fill confirmation, delete confirmation, and/or change confirmation discrete events. The order handler block may provided working quantity and/or filled quantity on continuous numeric outputs. The order handler block may include an option to specify that orders managed by order handler block should stay in the order book even if the algorithm is deleted, halted, stopped, or paused.

An IF-THEN-ELSE instrument block may have three continuous inputs: a Boolean IF input, an instrument THEN input, and an instrument ELSE input. The IF-THEN-ELSE instrument block has one continuous instrument output. If the IF input value is TRUE, the output is the instrument value of the THEN input. If the IF input value is FALSE, the output is the instrument value of the ELSE input. The IF-THEN-ELSE instrument block may have a rectangular shape with a "?" symbol in the middle, one continuous Boolean IF input and two continuous instrument ELSE and THEN inputs on the left side, and one continuous instrument output on the right side. The IF-THEN-ELSE instrument block is similar to the IF-THEN-ELSE block discussed above but specialized for instrument values.

An instrument attribute at price block may have a continuous instrument input, a continuous numeric input, and a continuous numeric output. The instrument attribute at price block may take an instrument name (provided by the continuous instrument input) and a price (provided by the continuous numeric input) and output a value for a specified attribute of that instrument at the specified price. Attributes may include bid quantity, ask quantity, real (non-implied) bid quantity, real (non-implied) ask quantity, bid headcount (number of bid orders in the market at the specified price), and ask headcount (number of ask orders in the market at the specified price). When placed, the user may be prompted to enter the attribute to be provided by the instrument attribute at price block. Alternatively, the instrument attribute at price block may default to a predefined value such as bid quantity. The specified attribute may be changed by the user during the design of the algorithm by, for example, selecting the instrument attribute at price block and using an action such as a menu item or double-click to be prompted to enter an attribute. The specified attribute may also be changed if the instrument attribute at price block is specified to be variable using the variable area 313 discussed below.

A spread between block may have two continuous instrument inputs and a continuous instrument output. The spread between block may take two instrument names (for example, one from a "front leg" input and the other from a "back leg" input) and output an instrument name corresponding to the exchange listed spread of the two provided instruments (for example, "front leg—back leg"). For example, a spread between block may be used to reference a spread between two different instruments such as "CLZ0" (December Crude 2010) and "CLF1" (Jan Crude 2011).

These "legs" may be referred to as the "front leg" and "back leg," respectively. The corresponding output of the spread between block is the exchange listed spread instrument, in this example the exchange listed instrument "CLZ0-CLF1" (the December 2010— January 2011 spread market). This block may be used to improve programming safety to reduce errors in the process of correctly referencing spreads between instruments. For example, the two input instruments may be denoted as variables that can be changed when the algorithm is running or specified to be different exchange listed spreads for different orders being managed by the algorithm. The spread between block provides safety by finding the "correct" listed spread instrument without needing a third variable to be set or changed to match the two individual instrument variables. The spread between block may also be used to locate or search for the existence of certain exchange listed spreads.

A trade block may provide trade data in discrete events on a discrete event output for an instrument provided on a continuous instrument input. The discrete events include trade price and trade quantity values associated with each trade. The trade data may be received from an exchange, for example. The trade price and trade quantity may be extracted from the discrete events by a value extractor block, a value accumulator block, a discrete min block, and/or a discrete max block, for example.

An order block may allow an existing order (that is, an order that has already been placed outside of the algorithm and is not being managed by another algorithm) to be managed according to the defined algorithm. For example, the order block may be used to provide particular types of auto-hedging routines to limit orders that have been placed manually by a user. The order block provides a continuous instrument output of the instrument the existing order is for and continuous numeric outputs for the quantity, price, and executed quantity for the existing order. The order block also provides a discrete output for order discrete events related to the order such as fill confirmations. In certain embodiments, if a defined algorithm includes an order block it may be presented in a list of available algorithms to be applied to an existing order in a trading interface include an order window, for example. As another example, an order identifier may be provided as a variable to the algorithm when it is run or specified in the order block itself. When applied to the existing order, the defined algorithm including the order block may then manage the order according to the algorithm.

A fill calculator block may provide a discrete output for spread fill discrete events. The fill calculator block may be used when the algorithm buys/sells a custom spread without using a legger block or a custom spread block. The fill calculator block receives multiple continuous instrument inputs and a discrete input for each trade execution (fill) leg of the spread, the former providing the instruments for the legs and the latter providing discrete events for fill confirmations. After instruments have been provided for the legs of the spread, the fill calculator block may be configured by, for example, selecting the fill calculator block and using an action such as a menu item or double-click to be prompted to specify parameters and settings. Parameters that may be specified for each leg of the spread include "multiple" (the coefficient of the spread leg), "trade quantity" (quantity for each leg of the spread, where a positive number is a buy and a negative number is a sell), and "net change" (toggle whether to convert the custom spread calculation to a net change rather than price). Settings that may be specified include "side" (buy or sell the custom spread for the fill calculator) and "flag" (specifies a user-defined flag associated with a spread fill discrete event to make identifying them easier).

An accumulator block may receive an order or fill discrete event on a discrete input and provide on a continuous numeric output the accumulated quantity for the received discrete events. For example, if an accumulator block is connected to a market maker block, the accumulator block may increase the value of its continuous numeric output for each partial fill discrete event received from the market maker block. This block may be used to keep track of the total number of fills, for example. The accumulator block may be a pass-through block so each discrete event received is passed out through a corresponding discrete output. The accumulator block may include a reset discrete input which, upon receiving an event, will reset the accumulated quantity to 0. The accumulator block may be similar to the value accumulator block discussed below but with more restricted functionality because it accumulates only the filled quantity.

Discrete blocks may include generator, value extractor, value accumulator, value bucket, discrete moving average, state, branch, multiplexer, funnel, sequencer, discrete min, and discrete max blocks, for example.

A generator block may provide a discrete event on a discrete output whenever a condition is TRUE. The condition may be provided by a continuous Boolean input so that whenever the condition input becomes TRUE, an event is generated. Alternatively, the condition may be specified to be an event such as: "on start" (the condition is TRUE when the algorithm is started and FALSE thereafter so that a single discrete event is provided when the algorithm is started), "on change" (the condition is TRUE whenever the continuous Boolean input value changes so that going from TRUE to FALSE or FALSE to TRUE both generate a discrete event), "every X" (the condition is TRUE once each specified time interval, where the interval may be specified in minutes, seconds, or milliseconds).

A value extractor block may receive a discrete event on a discrete input and extract a user-specified value from the event. Alternatively, the value extractor block may, when the discrete event is received, evaluate a user-defined equation to determine the extracted value. The exacted value may then be provided on a continuous output. The value type of the output depends on the type of value extracted. The following expressions may be available for use in specifying the value to be extracted from the discrete event: "instrument" (providing the instrument associated with the discrete event), "fill price" (providing the fill price associated with the discrete event), "fill quantity" (providing the fill quantity associated with the discrete event), "order quantity" (providing the order quantity associated with the discrete event), "order price" (providing the order price associated with the discrete event), "executed quantity" (providing the accumulation of fills with regard to the order quantity), "working quantity" (providing the accumulation of a non-executed order quantity at a specific order price), "trade quantity" (providing the quantity of a trade executed at an exchange), "trade price" (providing the price of a trade executed at an exchange), and "variable" (providing the value of a specified user-defined variable or the value of any other block output in the algorithm that is not part of a virtualized group block). In certain embodiments, the value extractor block may reference a value from another block's output. The value may be referenced using a "variable" expression discussed above or the value may be provided to a continuous variable input of the value extractor block, for example. The value extractor block may be a pass-through block so each discrete event received is passed out through a corresponding discrete output.

A value accumulator block may receive a discrete event on a discrete input and extract a user-specified value from the event to accumulate the value as each discrete event is received. The accumulated value is provided on a continuous numeric output. The following expressions may be available for use in specifying the value to be extracted from the discrete event: "fill price" (providing the fill price associated with the discrete event), "fill quantity" (providing the fill quantity associated with the discrete event), "order quantity" (providing the order quantity associated with the discrete event), "order price" (providing the order price associated with the discrete event), "executed quantity" (providing the accumulation of fills with regard to the order quantity), "working quantity" (providing the accumulation of a non-executed order quantity at a specific order price), "trade quantity" (providing the quantity of a trade executed at an exchange), "trade price" (providing the price of a trade executed at an exchange), and "variable" (providing the value of a specified user-defined variable or the value of any other block output in the algorithm that is not part of a virtualized group block). The value accumulator block may be a pass-through block so each discrete event received is passed out through a corresponding discrete output. The value accumulator block may include a reset discrete input which, upon receiving an event, will reset the accumulated value to 0. The value accumulator block is similar to the accumulator block discussed above but supports more flexible configuration of what value is accumulated.

A value bucket block may provide for creating a table of key-value pairs. The table may be a hash table, for example. The key for the table of the value bucket block is referred to as a bucket hole. The value for the table corresponding to a particular bucket hole (that is, the key of the table) is referred to as a bucket value. The value bucket block receives a discrete event on a discrete input. When the discrete event is received, a user-defined equation for the bucket hole is evaluated to determine the appropriate entry in the table. A user-defined equation for the bucket value is then evaluated to determine a new bucket value for the entry in the table corresponding to the determined bucket hole. As discussed below, the new bucket value may be combined with or replace the previous bucket value. When placed, the user may be prompted to enter the equations for the bucket hole and bucket value. Alternatively, the value bucket block may default to predefined equations such as a bucket hole of "0" and a bucket value of "0". The specified equations may be changed by the user during the design of the algorithm by, for example, selecting the value bucket block and using an action such as a menu item or double-click to be prompted to enter one or both of the bucket hole and bucket value equations. The equations may be entered textually or using building block buttons similar to the building block buttons 215 discussed above, for example. Expressions available for use in specifying the equations (which may be provided by building block buttons) may include "instrument" (providing the instrument associated with the discrete event), "fill price" (providing the fill price associated with the discrete event), "fill quantity" (providing the fill quantity associated with the discrete event), "order quantity" (providing the order quantity associated with the discrete event), "order price" (providing the order price associated with the discrete event), "executed quantity" (providing the accumulation of fills with regard to the order quantity), "working quantity" (providing the accumulation of a non-executed order quantity at a specific order price), "trade quantity" (providing the quantity of a trade executed at an exchange), "trade price" (providing the price of a trade executed at an exchange), and "variable" (providing the value of a specified user-defined variable or the value of any other block output in the algorithm that is not part of a virtualized group block). As part of specifying the value bucket equation, a user may also configure how a new bucket value is combined with the previous bucket value. For example, the new bucket value may be added to the previous bucket value (providing for a summation of the bucket values determined for the same bucket hole for each received discrete event). As another example, an average of the bucket values determined for the same bucket hole may be determined. As another example, the new bucket value may replace the previous bucket value (providing the most recent value as the bucket value for a particular bucket hole). The value bucket may default to summing the bucket values for a particular bucket hole, for example. The value bucket block may be a pass-through block so each discrete event received is passed out through a corresponding discrete output. The value bucket block may also have a hole continuous numeric input that provides a value to be used as the bucket hole so that the corresponding bucket value for the provided bucket hole is provided on a value continuous numeric output. The value bucket block may include a reset discrete input which, upon receiving an event, will reset the stored table.

A discrete moving average block may provide a moving average for a value determined by evaluating a specified user-defined equation each time a discrete event is received at a discrete input. The number of data points to be used in determining the moving average is specified by a continuous numeric input. The moving average is provided to a continuous numeric output. The discrete moving average block may keep a list of the evaluated data points until the number of data points specified by the corresponding input has been reached, at which point the newest data point may be added to the list, the oldest removed from the list, and the moving average be calculated over the data points in the list. When placed, the user may be prompted to enter the equation to be evaluated. Alternatively, the discrete moving average block may default to a predefined value such as 0 for the equation. The specified equation may be changed by the user during the design of the algorithm by, for example, selecting the discrete moving average block and using an action such as a menu item or double-click to be prompted to enter an equation. The equation may be entered textually or using building block buttons similar to the building block buttons 215 discussed above, for example. Expressions available for use in specifying the equation (which may be provided by building block buttons) may include "instrument" (providing the instrument associated with the discrete event), "fill price" (providing the fill price associated with the discrete event), "fill quantity" (providing the fill quantity associated with the discrete event), "order quantity" (providing the order quantity associated with the discrete event), "order price" (providing the order price associated with the discrete event), "executed quantity" (providing the accumulation of fills with regard to the order quantity), "working quantity" (providing the accumulation of a non-executed order quantity at a specific order price), "trade quantity" (providing the quantity of a trade executed at an exchange), "trade price" (providing the price of a trade executed at an exchange), and "variable" (providing the value of a specified user-defined variable or the value of any other block output in the algorithm that is not part of a virtualized group block). The discrete moving average block may also take a discrete input that is a reset input. When a discrete event is received by the reset input, the recorded data points are discarded. This may result in the moving average output being 0 or "Not a Number" (NaN). The discrete moving average block may also provide an OK continuous Boolean output that indicates whether a sufficient number of data points have been recorded to fully calculate the moving average. The OK output is FALSE until the needed number of data points have been recorded and TRUE thereafter (until reset). For example, if the number of data points input provides a value of 20, 20 data points (that is, 20 evaluations of the specified equation, each triggered by the receipt of a discrete event) will need to be recorded before the OK output becomes TRUE. The discrete moving average block may also provide a number of data points continuous numeric output that indicates the number of data points that have been recorded. The discrete moving average block may be a pass-through block so each discrete event received is passed out through a corresponding discrete output.

A state block may receive a discrete event on a discrete input and evaluate a conditional for each discrete output to determine whether the discrete event should be provided on the discrete output. The state block may be used to design a state machine which is a model of behavior composed of a finite number of states, transitions between those states, and actions, for example. Multiple state blocks may be linked together similar to a "flow" graph where a user may inspect the way the logic runs when certain conditions are met. Because a current state is determined by past states, it may essentially record information about the past. A transition indicates a state change and is described by a conditional that would need to be fulfilled to enable the transition. The state block allows the user to define an exit action and the conditional that defines the transition. For example, in a state block providing two discrete outputs each corresponding to a different state transition, the user specifies a conditional for each. After a discrete event is received, the state block waits for one or more of the conditionals associated with each transition to become TRUE (if, when the discrete event is received, none of the conditionals are TRUE). When the conditional associated with a particular state transition evaluates to TRUE, the state block provides the discrete event (that has been held since it was received) on the output associated with that particular state transition. A conditional may be provided on a continuous Boolean input. Alternatively, the conditional may be provided by a specified user-defined equation that evaluates to a Boolean value. The specified equation may be changed by the user during the design of the algorithm by, for example, selecting the state block and using an action such as a menu item or double-click to be prompted to enter the equation. The equation may be entered textually or using building block buttons similar to the building block buttons 215 discussed above, for example. A state block may be used to evaluate a user defined pattern in a market such as if there are multiple consecutive trades at non-lower prices. These signals may be used as a conditional input into a trading block such as a market maker block, for example. A state block could also evaluate information such as whether a discrete event is a buy or a sell fill message, for example. Expressions available for use in specifying the equation (which may be provided by building block buttons) may include "instrument" (providing the instrument associated with the discrete event), "fill price" (providing the fill price associated with the discrete event), "fill quantity" (providing the fill quantity associated with the discrete event), "order quantity" (providing the order quantity associated with the discrete event), "order price" (providing the order price associated with the discrete event), "executed quantity" (providing the accumulation of fills with regard to the order quantity), "working quantity" (providing the accumulation of a non-executed order quantity at a specific order price), "trade quantity" (providing the quantity of a trade executed at an exchange), "trade price" (providing the price of a trade executed at an exchange), and "variable" (providing the value of a specified user-defined variable or the value of any other block output in the algorithm that is not part of a virtualized group block).

A branch block may receive a discrete event on a discrete input and evaluate a conditional. If the conditional is TRUE, then the discrete event will be provided on a first discrete output (the "YES" path) and if the conditional is FALSE, then the discrete event will be provided on a second discrete output (the "NO" path). The conditional may be provided on a continuous Boolean input. Alternatively, the conditional may be provided by a specified user-defined equation that evaluates to a Boolean value. The specified equation may be changed by the user during the design of the algorithm by, for example, selecting the branch block and using an action such as a menu item or double-click to be prompted to enter the equation. The equation may be entered textually or using building block buttons similar to the building block buttons 215 discussed above, for example. A branch block may be used to evaluate whether the discrete event is a buy or a sell fill event, for example. A "buy?" building block button may be used to build such an equation. Other expressions available for use in specifying the equation (which may be provided by building block buttons) may include "instrument" (providing the instrument associated with the discrete event), "fill price" (providing the fill price associated with the discrete event), "fill quantity" (providing the fill quantity associated with the discrete event), "order quantity" (providing the order quantity associated with the discrete event), "order price" (providing the order price associated with the discrete event), "executed quantity" (providing the accumulation of fills with regard to the order quantity), "working quantity" (providing the accumulation of a non-executed order quantity at a specific order price), "trade quantity" (providing the quantity of a trade executed at an exchange), "trade price" (providing the price of a trade executed at an exchange), and "variable" (providing the value of a specified user-defined variable or the value of any other block output in the algorithm that is not part of a virtualized group block).

A multiplexer block may receive a discrete event on a discrete input and provide the discrete event on a particular discrete output. For example, the multiplexer block may receive a discrete event from an order handler block and based on the type of the discrete event (for example, fill, change, or delete), provide it on the appropriate discrete output of the multiplexer block. When placed, the user may be prompted to specify which discrete event types for which outputs are provided. Alternatively, the multiplexer block may default to a predefined configuration of providing an output for every discrete event type. The specified discrete event types for which outputs are provided may be changed by the user during the design of the algorithm by, for example, selecting the multiplexer block and using an action such as a menu item or double-click to be prompted to specify the discrete event types. The multiplexer block may be used in conjunction with the order handler block to manage an order, for example.

A funnel block may receive discrete events on two or more discrete inputs and provide them on a single discrete output. The funnel block does not hold a discrete event, it passes it through to the output. The funnel block may be used in conjunction with state blocks that need multiple inputs, for example.

A sequencer block may guarantee the order in which discrete events are passed through the outputs. The sequencer block may have a discrete input and two or more discrete outputs. When a discrete event is received at the input, the sequencer block provides the discrete event to each output in order. That is, in the processing for a received discrete event, the sequencer blocker will first provide the discrete event to the first output, and then the discrete event will be provided to the second output, and so on. This may allow a user to precisely determine which order blocks which receive discrete inputs are updated in the algorithm. However, if multiple blocks are connected to the same discrete output of the sequencer block, the order those blocks receive the discrete event is unspecified. This block may also be referred to as a sequence block.

A discrete min block may compare two discrete inputs and provide a continuous numeric output of the minimum value of a specified attribute (for example, trade price, trade quantity, etc.). When a discrete event is received on one of the inputs, the specified attribute value is extracted from the event and stored. The extracted value is compared with the most recently stored value for the other discrete input to determine which is the smaller value and that value is provided on the continuous numeric output. If no discrete event has been received for an input, the value extracted from the other input may always treated as the larger value. As an alternative, the value for a particular discrete input may simply default to 0. The discrete min block may be a pass-through block so each discrete event received is passed out through a corresponding discrete output. The discrete min block may include a reset discrete input which, upon receiving an event, will reset the stored values for each discrete input and update the minimum output correspondingly.

A discrete max block may compare two discrete inputs and provide a continuous numeric output of the maximum value of a specified attribute (for example, trade price, trade quantity, etc.). When a discrete event is received on one of the inputs, the specified attribute value is extracted from the event and stored. The extracted value is compared with the most recently stored value for the other discrete input to determine which is the larger value and that value is provided on the continuous numeric output. If no discrete event has been received for an input, the value extracted from the other input may always treated as the larger value. As an alternative, the value for a particular discrete input may simply default to 0. The discrete max block may be a pass-through block so each discrete event received is passed out through a corresponding discrete output. The discrete max block may include a reset discrete input which, upon receiving an event, will reset the stored values for each discrete input and update the maximum output correspondingly.

Miscellaneous blocks may include min, max, rounding, display to decimal, not, once true, is number, moving average, conditional f(x), numeric f(x), average, timer, note, random number, square root, log, and pause blocks, for example.

A min block may compare two continuous numeric inputs to determine which is the smaller value and output it. The min block may have a triangular shape with "MIN" text in the middle, two continuous numeric inputs on the left side, and one continuous numeric output on the right side.

A max block may compare two continuous numeric inputs to determine which is the larger value and output it. The max block may have a triangular shape with "MAX" text in the middle, two continuous numeric inputs on the left side, and one continuous numeric output on the right side.

A rounding block may round a number provided by a continuous numeric input to the nearest increment provided by a continuous numeric input to produce one continuous numeric output. If no increment value is provided, the round block may round to the nearest integer. In addition, a user may specify one of three options for the rounding block: normal rounding, always up rounding, and always down rounding. Normal rounding uses the traditional rounding rules (for example, 0.5 rounds up to 1 and 0.49 rounds down to 0). Always up rounding will round the number to the higher increment if the value falls between two increments (for example, 2.1 rounds up to 3 and 2 rounds to 2). Always down rounding will round the number to the lower increment if the value falls between two increments (for example, 2.9 will round down to 2 and 2 rounds to 2). If no option is specified, the rounding block may default to normal rounding, for example. The rounding block may have a rectangular shape with "Round" text in the middle, two continuous numeric inputs on the left side, and one continuous numeric output on the right side.

A display to decimal block may use a number provided by a continuous numeric input and an instrument provided by a continuous instrument input to outputs number in decimal form. For example, a display to decimal block may be utilized if a user wishes to use a number block to feed a value such as a price into the rest of the algorithm (perhaps as a variable) without having to calculate the value in decimal format. The user may be used to seeing the price of the instrument ZN as 117125, which may represent a price of 117 and 12.5/32nds. With the display to decimal block, the number 117125 may be provided as an input, along with the instrument, and the display to decimal block will convert the number to the appropriate decimal format value (here, 117.390625) for use by the rest of the algorithm. The display to decimal block may have a rectangular shape with "D2Dec" text in the middle, one continuous instrument input and one continuous numeric input on the left side, and one continuous numeric output on the right side.

A NOT block may perform a logical negation of a continuous Boolean input such that if the input value is TRUE the output is FALSE and if the input value is FALSE the output is TRUE. The NOT block may have a rectangular shape on the left side and an arched shape to the right side with a negation symbol ("!" or "¬") in the middle, one continuous Boolean input on the left side, and one continuous Boolean output on the right side.

A once true block may provide a continuous Boolean output of TRUE for the life of the algorithm when a continuous Boolean input turns TRUE. Until the input value become TRUE at least once, the output value of the once true block is FALSE. Once the input value has become TRUE, the once true block always outputs a value of TRUE regardless if the input value subsequently changes. The once true block may have a rectangular shape on the left side and an arched shape to the right side with "T" text in the middle, one continuous Boolean input on the left side and one continuous Boolean output on the right side. This block may also be referred to as a once true always true block.

An is number block may provide a continuous Boolean output of TRUE if the value provided on a continuous numeric input is a number and output FALSE if the provided value is "Not a Number" (NaN). The is number block may have a rectangular shape on the left side and an arched shape to the right side with "IsNum?" text in the middle, one continuous numeric input on the left side and one continuous Boolean output on the right side.

A moving average block may take a data value (which may be changing over time, such as a price or quantity) as a continuous numeric input and a number of minutes value as a continuous numeric input and provide a moving average over the specified number of minutes as a continuous numeric output. The moving average block may record the data value every second. For example, if a user desires to have a one minute moving average, the moving average block will record 60 data points and average them for the output. The moving average block may also take a continuous Boolean value that indicates whether the data value input is valid. This input is optional and default to TRUE. When the data value is about to be recorded (by default once per second), the moving average block checks to see if the valid input is TRUE. If so, the data value is recorded as a data point. If the valid input is FALSE, the data value is not recorded as a data point. The moving average block may also take a discrete input that is a reset input. When a discrete event is received by the reset input, the recorded data points are discarded. Depending on the data value being recorded, this may result in the moving average output being 0 or "Not a Number" (NaN). The moving average block may also provide an OK continuous Boolean output that indicates whether a sufficient number of data points have been recorded to fully calculate the moving average. The OK output is FALSE until the needed number of data points have been recorded and TRUE thereafter (until reset). For example, if number of minutes input provides a value of 20 (for a 20 minute moving average), 1200 data points (1 data point for every second over the 20 minute period) will need to be recorded before the OK output becomes TRUE. The moving average block may also provide a number of data points continuous numeric output that indicates the number of data points that have been recorded. The moving average block may have a rectangular shape with "MvgAvg" text in the middle, four inputs (2 continuous numeric inputs, 1 continuous Boolean input, and 1 discrete input) on the left side, and three outputs (2 continuous numeric outputs and 1 continuous Boolean output) on the right side.

A conditional f(x) block may evaluate a user-defined equation that provides a value for a continuous Boolean output. When placed, the user may be prompted to enter the equation to be evaluated. Alternatively, the conditional f(x) block may default to a predefined value such as TRUE. The specified equation may be changed by the user during the design of the algorithm by, for example, selecting the conditional f(x) block and using an action such as a menu item or double-click to be prompted to enter an equation. The equation may be entered textually or using building block buttons similar to the building block buttons 215 discussed above, for example. In certain embodiments, the conditional f(x) block may reference a value from another block's output. The value may be referenced using a building block button 215 that specifies the block and output or the value may be provided to a continuous variable input of the conditional f(x) block. The conditional f(x) block may have a rectangular shape on the left side and an arched shape to the right side with "f(x)" text in the middle, no inputs on the left side (unless values are referenced in the user-defined equation, in which case continuous inputs are provided corresponding to each variable), and one continuous Boolean output on the right side.

A numeric f(x) block may evaluate a user-defined equation that provides a value for a continuous numeric output. When placed, the user may be prompted to enter the equation to be evaluated. Alternatively, the numeric f(x) block may default to a predefined value such as 0. The specified equation may be changed by the user during the design of the algorithm by, for example, selecting the numeric f(x) block and using an action such as a menu item or double-click to be prompted to enter an equation. The equation may be entered textually or using building block buttons similar to the building block buttons 215 discussed above, for example. In certain embodiments, the numeric f(x) block may reference a value from another block's output. The value may be referenced using a building block button 215 that specifies the block and output or the value may be provided to a continuous variable input of the numeric f(x) block. The numeric f(x) block may have a rectangular shape on the left side and an arched shape to the right side with "f(x)" text in the middle, no inputs on the left side (unless values are referenced in the user-defined equation, in which case continuous inputs are provided corresponding to each variable), and one continuous numeric output on the right side.

In certain embodiments, the conditional f(x) block and the numeric f(x) block may be consolidated into a single block such as an f(x) block. An f(x) block may evaluate a user-defined equation that provides either a Boolean or a numeric value for a continuous variable output. When placed, the user may be prompted to enter the equation to be evaluated. Alternatively, the f(x) block may default to a predefined value such as 0. The specified equation may be changed by the user during the design of the algorithm by, for example, selecting the f(x) block and using an action such as a menu item or double-click to be prompted to enter an equation. The equation may be entered textually or using building block buttons similar to the building block buttons 215 discussed above, for example. In certain embodiments, the f(x) block may reference a value from another block's output. The value may be referenced using a building block button 215 that specifies the block and output or the value may be provided to a continuous variable input of the f(x) block. The f(x) block may have a rectangular shape on the left side and an arched shape to the right side with "f(x)" text in the middle, no inputs on the left side (unless values are referenced in the user-defined equation, in which case continuous inputs are provided corresponding to each variable), and one continuous variable output on the right side.

An average block may average the values of two or more continuous numeric inputs to produce one numeric continuous output. For example, the average block may have 10 inputs. As another example, the average block may begin with one input and each time a connection is made to an average block input a new input may be dynamically provided. The values of the inputs are summed and then divided by the number of inputs providing values to produce the output. The average block may have a rectangular shape with "AVE" or "AVG" text in the middle, two or more continuous numeric inputs on the left side, and one continuous numeric output on the right side.

A timer block may provide continuous numeric outputs for the hour, minute, and second of a time. For example, the time may be the current time. The current time may be the time at the computing device providing the trading interface to a user or the current time at an algorithm server, for example. As another example, the time may be from when the algorithm was started running. As another example, the time may be the time since the start of the current trading session. As another example, the time may be from 12 am CST of the current trading session. As another example, the time may be a time provided by an exchange. The timer block may have a rectangular shape with "TIMER" text or a clock symbol in the middle and three continuous numeric outputs on the right side.

A note block may provide a text box for users to enter comments and notes about the algorithm being designed. A note block may not have any inputs or outputs. When placed, the user may be prompted to enter the text for the note block. Alternatively, the note block may default to a predefined value such as "Add note here." The specified value may be changed by the user during the design of the algorithm by, for example, selecting the note block and using an action such as a menu item or double-click to be prompted to enter a value. The note block does not affect the operation of the algorithm. The note block may have a rectangular shape with the text value displayed in the middle.

A random number block may provide a random number to a continuous numeric output. The random number may be specified to be an integer or a floating point value when the random number block is placed or later configured. The random number block may default to providing an integer value. The random number may be between a minimum value specified by a continuous numeric input and a maximum value specified by a continuous numeric input. If the minimum input is not provided, it may default to 0, for example. If the maximum input is not provided it may default to the maximum integer supported by the computing device for an integer output or to 1 for a floating point output. The random number block may also have a discrete input to signal when a new random number should be provided. If a discrete input is not provided, the random number block may provide a new random number once per second, for example. The random number block may be a pass-through block so each discrete event received is passed out through a corresponding discrete output. The random number block may have a square shape with a question mark symbol ("?") or "RAND" text in the middle, two continuous numerical inputs and one discrete input on the left side, and one continuous numerical output on the right side.

A square root block may provide a square root value on a continuous numeric output for a value provided on a continuous numeric input. The output may be "Not a Number" (NaN) if the input is a negative number. The square root block may have a triangular shape with a square root symbol ("√") in the middle, one continuous numeric input on the left side, and one continuous numeric output on the right side.

A log block may provide a logarithm value on a continuous numeric output for a value provided on a continuous numeric input. A base value for the logarithm may be provided on a continuous numeric input. If the base value is not provided it may default to the natural logarithm, for example. The log block may have a square shape with "Log" text in the middle, two continuous numeric inputs on the left side, and one continuous numeric output on the right side.

A pause block may pause the entire algorithm if a discrete event is received on a discrete input or if a value provided on a continuous Boolean input becomes TRUE. In certain embodiments, if the Boolean input value becomes FALSE again, the algorithm may resume running. In certain embodiments, once the algorithm has been paused because of the pause block, the algorithm must be manually restarted. The pause block may be octagonal shaped with a red background, "Stop" text in the middle, one continuous Boolean input and one discrete input on the left side.

Instructions or logic (herein referred to as programming code) representing the algorithm are generated based on the definition of the algorithm. In certain embodiments, the programming code is source code (such as human and/or compiler readable text) which may subsequently be compiled. In certain embodiments, the programming code is in an intermediate language. In certain embodiments, the programming code includes machine-executable instructions. In certain embodiments, generation of programming code includes compilation of generated source code and/or intermediate language code. In certain embodiments, generation of programming code does not include compilation of generated source code and/or intermediate language code and such compilation is a separate process. The generated programming code (after compilation, if appropriate) may then be simulated and/or used to trade according to the defined algorithm. As used herein, where programming code is discussed to be run, executed, and/or simulated, it is assumed that the generated programming code has additionally been compiled, if appropriate to be run, executed, and/or simulated.

In certain embodiments, the programming code is generated as the algorithm is being designed. Note that while the algorithm is being designed, the definition of the algorithm may be changing as blocks and/or connections are added, modified, and/or removed. In certain embodiments, the programming code is generated automatically when a change is made to the algorithm definition. In certain embodiments, the programming code is generated at the request of a user.

In certain embodiments, the programming code is generated by a component of the algorithmic trading application of the trading interface 310 at a client device. In certain embodiments, the programming code is generated by a component of the algorithmic trading application at another device, such as a algorithm generation device, an algorithm server similar to the algorithm server 302 discussed above, and/or a gateway similar to the gateway 120 discussed above, for example. In certain embodiments, the programming code is generated by more than one component. For example, multiple components of the algorithmic trading application may work together to generate the code. Such components may be specialized to generate different aspects or functionalities of the programming code, for example.

In certain embodiments, the programming code is generated by more than one device. For example, programming code may be generated by a client device and an algorithm server. The programming code generated based on the algorithm definition may be different based on which component or device is generating it. For example, programming code generated on the client device may be optimized for execution by the client device and/or may contain different features (for example, user interface-related functionality) than programming code generated on an algorithm server (which may not, for example, include user interface-related functionality). For clarity, unless otherwise noted, the following discussion is with respect to generation of programming code on the client device, but it should be understood that similar actions are taken when the programming code is generated at another device such as an algorithm server.

In certain embodiments, the generated programming code is done in an object-oriented manner using a programming language such as C# and the .NET 4.0 framework.

In certain embodiments, the programming code is generated by traversing each block and connection in the algorithm definition. For each block, programming code is generated. When generating programming code, some blocks may become primitive variables. For example, an adder block may become a floating point variable whose value is set to be the sum of the values of the outputs connected to the adder block's inputs, which may be determined recursively. Other blocks which may have more complex functionality may be generated as subclasses derived from base classes. The base class may provide the core functionality associated with the corresponding block. The generated subclass may then override virtual methods having return values to provide values specific to the block for which the programming code is being generated to the core functionality of the base class. For example, a market maker block placed in the design canvas area 311 may have programming code generated which is a subclass of a base market maker class. The subclass may override virtual methods to get values for various inputs of the market maker block and to specify whether the market maker block was configured to buy or sell. Unlike the basic blocks discussed above, the market maker block is a trading block which provides more complex functionality.

Continuous connections between blocks specify how the connected output values and input values relate. Continuing the adder example above, the floating point value representing the output of the adder block may be set to be the sum of the values of other primitive variables (representing other blocks/outputs) connected to the adder block's continuous inputs. In certain embodiments, continuous connections may be used to flatten the generated programming code so that multiple blocks (that would generate to primitive variables) with continuous connections may be condensed to simple expressions without using multiple intermediate variables.

Discrete connections between blocks are used to generate event generators and event handlers so that the proper method (the handler) is invoked when a discrete event is generated. The discrete event is passed from the event generator to the event handler to be processed.

When running, the algorithm responds to actions that cause the state of the algorithm to change. The actions may include external events such as market events (for example, a price update, quantity update, order confirmation, trade confirmation, fill confirmation, or trade notification) or timer events (for example, from a system clock or alarm). These external events may result in discrete events being generated such as order confirmation discrete events, trade confirmation discrete events, fill confirmation discrete events, or trade notification discrete events and/or continuous values such as price or quantity values for an instrument being updated. The actions may also include internal events such as discrete events generated by blocks in the algorithm or continuous values changing.

When an internal or external discrete event occurs (for example, a trade confirmation discrete event or a generator block generates a discrete event), each interested block in the algorithm has an event handler method invoked so that the block may perform its specified functionality associated with the event. The event handlers may be evaluated in an unspecified order. For example, the event handlers may be evaluated based on the order their respective blocks were placed in the algorithm definition. The event handler processing may include performing the block's function based on the received event, updating continuous output values, and generating a discrete event and providing it on an output to other connected blocks.

When an internal or external continuous value changes (for example, market data is updated or the system clock's time changes), each interested block that is directly or indirectly connected to the source of the data ("downstream blocks") has its value updated to reflect the new data. Primitive variables that are a result of some blocks will have their new values assigned, for example.

If a continuous output value is updated either by a discrete event or a continuous value change, each directly or indirectly connected block to receive the updated value is added to a list of blocks to be processed. When the blocks interested in the external event have completed their processing, the list of blocks is then processed so that those blocks may then act in response to the internal event. Internal events are processed in a manner similar to an external event. This process may then be repeated as each block's processing generates new changes to the state of the algorithm.

FIGS. 3D-1 through 3D-7 illustrate example programming code generated according to certain embodiments. Note that the programming code illustrated is only a portion of programming code that may be generated and is intended to be exemplary and simplified to emphasize certain features for clarity.

Figures 2, 3D:
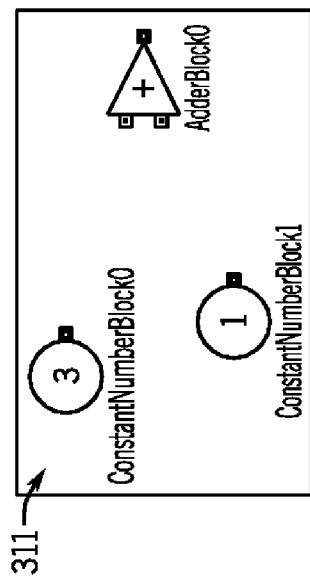

Programming code may be generated even when no blocks have been placed in the design canvas area 311, as illustrated in FIG. 3D-1. The generated programming code includes a new class ("CustomAlgorithm0") which represents the algorithm being designed. This new class is a subclass of an Algorithm class, which provides basic interfaces and functionality for effectuating an algorithm with the algorithmic trading application. The CustomAlgorithm0 class may override virtual methods of the Algorithm class so that functionality specific to the algorithm being designed may be incorporated into the framework of the algorithmic trading application and executed.

Continuing the example, as illustrated in FIG. 3D-2, when a block is placed in the design canvas area 311, additional programming code may be generated. As discussed above, some blocks may become primitive variables and the continuous connections between them tell how they relate. For example, as illustrated, two constant number blocks ("ConstantNumberBlock0" and "ConstantNumberBlock1") have been placed in the design canvas area 311 as well as an adder block ("AdderBlock0"). Note that the blocks have not been connected. The marked portion of the generated programming code illustrates that these basic blocks are represented in the programming code as primitive variables (of type "double").

Figures 3, 3D, 4, 5, 6:
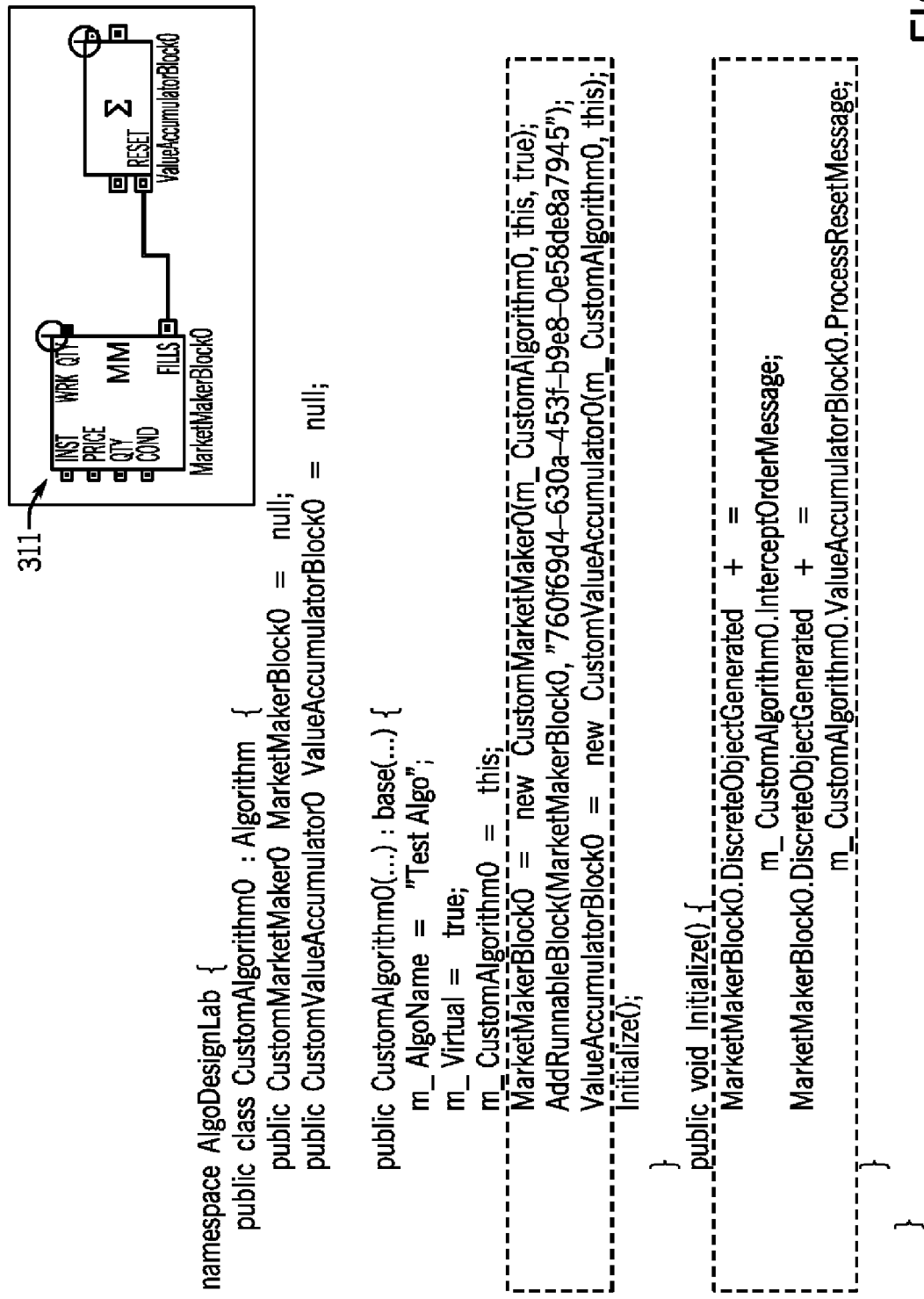
Figures 3, 3D, 4, 5, 6, 7:
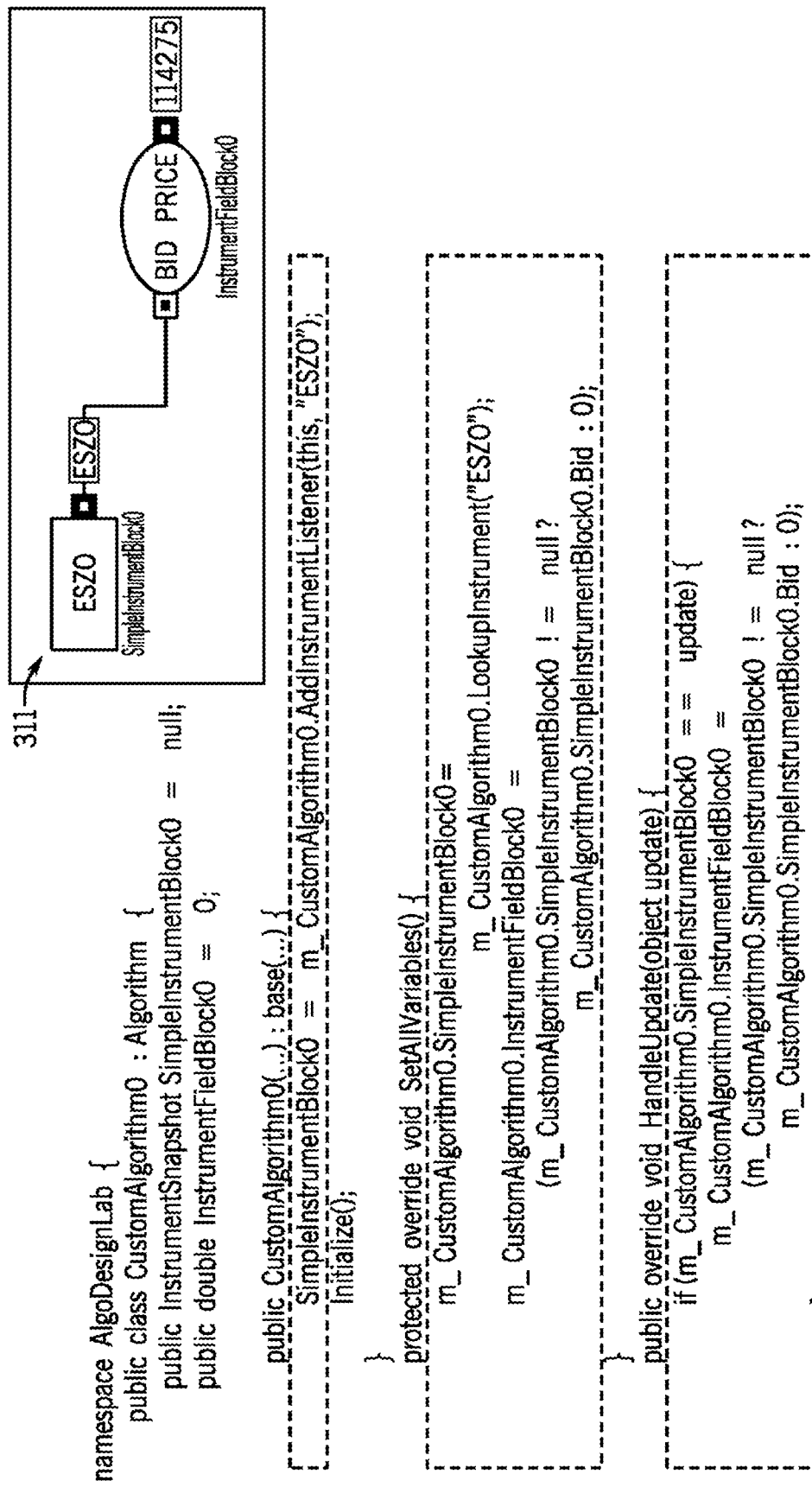

As illustrated in FIG. 3D-3, connections have been made from ConstantNumberBlock0 and ConstantNumberBlock1 to AdderBlock0. Connections specify the relationship between blocks. The marked portion of the generated programming code illustrates that the value of AdderBlock0 is equal to the value of ConstantNumberBlock0 plus the value of ConstantNumberBlock1. This is because the functionality represented by the adder block is to add the values of the two inputs.

As illustrated in FIG. 3D-4, a market maker block has been placed in the design canvas area 311. Unlike the basic blocks discussed above, the market maker block is a trading block which provides more complex functionality. The generated programming code adds a new class ("CustomMarketMaker0") which represents the functionality of the particular market maker block that has been placed. CustomMarketMaker0 is a subclass of MarketMaker, which provides the basic functionality for the market maker block. The CustomMarketMaker0 class may override virtual methods with a return type of the MarketMaker class so that functionality specific to the placed market maker block may be incorporated into the framework of the algorithmic trading application and executed. In this case, CustomMarketMaker0 overrides methods that are invoked by logic in the MarketMaker base class to get the values for the various inputs of the market maker block. As illustrated in FIG. 3D-5, the quantity input of the placed market maker block has been connected to the output of the adder block discussed above. The marked portion of the generated programming code illustrates that the virtual method "GetQty" of the CustomMarketMaker0 class has been overridden to return the value of AdderBlock0.

Continuing the example, as illustrated in FIG. 3D-6, a connection has been made between a discrete output and a discrete input. In particular, a connection was made between the discrete fills output of the market maker block and the reset input of a value accumulator block. The value accumulator block is a discrete block and similar to a trading block, a new class ("CustomValueAccumulator0") is added (not shown). The marked portions of the generated programming code illustrate that the new subclasses ("CustomMarketMaker0" and "CustomValueAccumulator0") are instantiated and that the event "DiscreteObjectGenerated" of MarketMakerBlock0 is linked with event handlers for the CustomAlgorithm0 ("InterceptOrderMessage") and the ValueAccumulatorBlock0 ("ProcessResetMessage"). Thus, when the MarketMakerBlock0 has a fill message, it will fire the DiscreteObjectGenerated event and all handlers that have been linked will be notified. In this case, when the ProcessResetMessage handler is notified, it will reset the accumulator value to 0.

Continuing the example, as illustrated in FIG. 3D-7, a connection has been made between an instrument block ("SimpleInstrumentBlock0") and an instrument attribute block ("InstrumentFieldBlock0"). The instrument block is generated to be an instance of the "InstrumentSnapshot" class which updates its continuous outputs based on received market data for the instrument "ESZ0." The InstrumentSnapshot class provides member variables or properties that may be referenced to get the corresponding value for that attribute of the instrument. For example, when the "SetAllVariables" (setting all values in the algorithm) or "HandleUpdate" (setting values that are affected by the update of a particular continuous value) methods are invoked, the instrument attribute block sets its value to be the ".Bid" property of the instrument block.

Figure 3E:
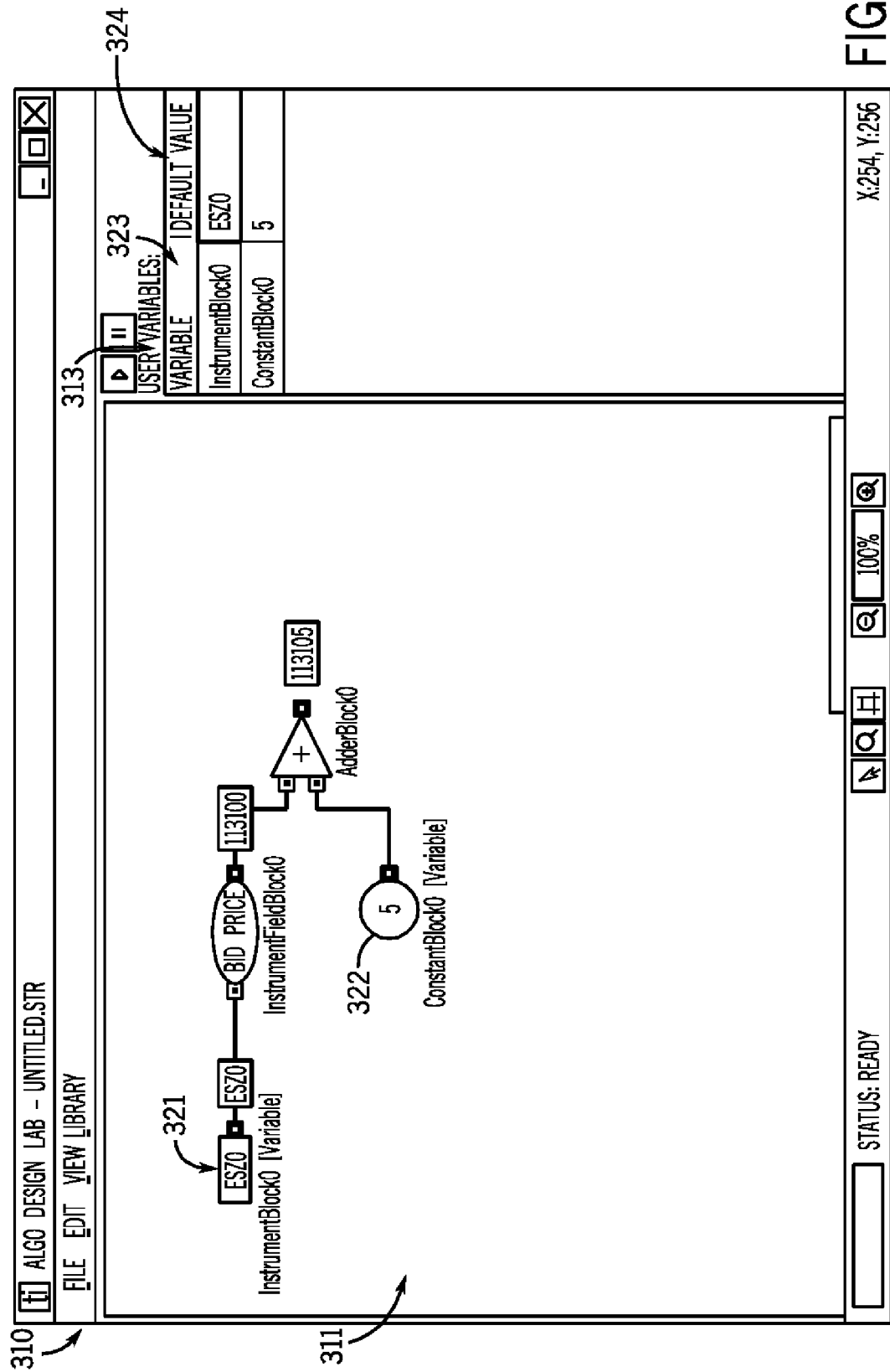

FIG. 3E illustrates a trading interface 310 according to certain embodiments. Certain blocks may be specified to be "variable." For example, constant number blocks, constant Boolean blocks, and instrument blocks may be specified to be variable.

The variable area 313 provides for modifying variable blocks. The variable area 313 displays each variable block name and its default value. The variable area may be selected to change a variable block name and/or its default value. Variables may also be referred to as parameters of the algorithm.

As illustrated, the design canvas area 311 includes two blocks that have been specified as variable, instrument block 321 and constant block 322. A block may be specified as variable when it is being placed or after it is placed, for example. For example, a cursor may be used to select the block and then a menu option may be selected to specify the block should be made variable. A block specified variable may be indicated with a different color, border, background, pattern, and/or text, for example. Here, the text "[Variable]" has been appended to the displayed block name.

As discussed above, the variable area 313 includes a name column 323 with entries for each variable block 321 and 32 and a default value column 324 with corresponding default value entries for each variable block. For example, instrument block 321 is named "InstrumentBlock0" and has a default value of "ESZ0" and constant block 322 is named "ConstantBlock0" and has a default value of "5."

A user can select a default value entry in column 324 to change the default value of the variable block, so that the new default value is used in the evaluation of the algorithm. Similarly, the user can select a name entry in the name column 323 to change the name of the respective variable block. The variable blocks 321 and 322 may allow a user to manipulate the behavior of the algorithm, rather than the underlying logic, by changing the value of the variable bock, which acts as a parameter to the algorithm, for example.

The control area 314 provides controls for use in designing the algorithm. The control area 314 may include a play button and a pause button for initiating and pausing simulation of the algorithm. The simulation of the algorithm may be used to indicate how the logic of the algorithm will behave. In addition, the control area 314 may include a generate button (not shown) which will cause programming code to be generated based on the algorithm. The generate button may be used when programming code is not being generated automatically based on changes to the algorithm. This may be desirable when the algorithm being designed is complex and generation of programming code (and the subsequent compilation of that programming code if appropriate) after each modification to the algorithm takes an undesirably long time. In certain embodiments, the control area 314 may include a compile button (not shown) which will cause programming code generated based on the algorithm to be compiled. The compile button may be used when programming code is not being generated and/or compiled automatically based on changes to the algorithm. This may be desirable when the algorithm being designed is complex and compilation of programming code after each modification to the algorithm takes an undesirably long time.

Figure 3F:
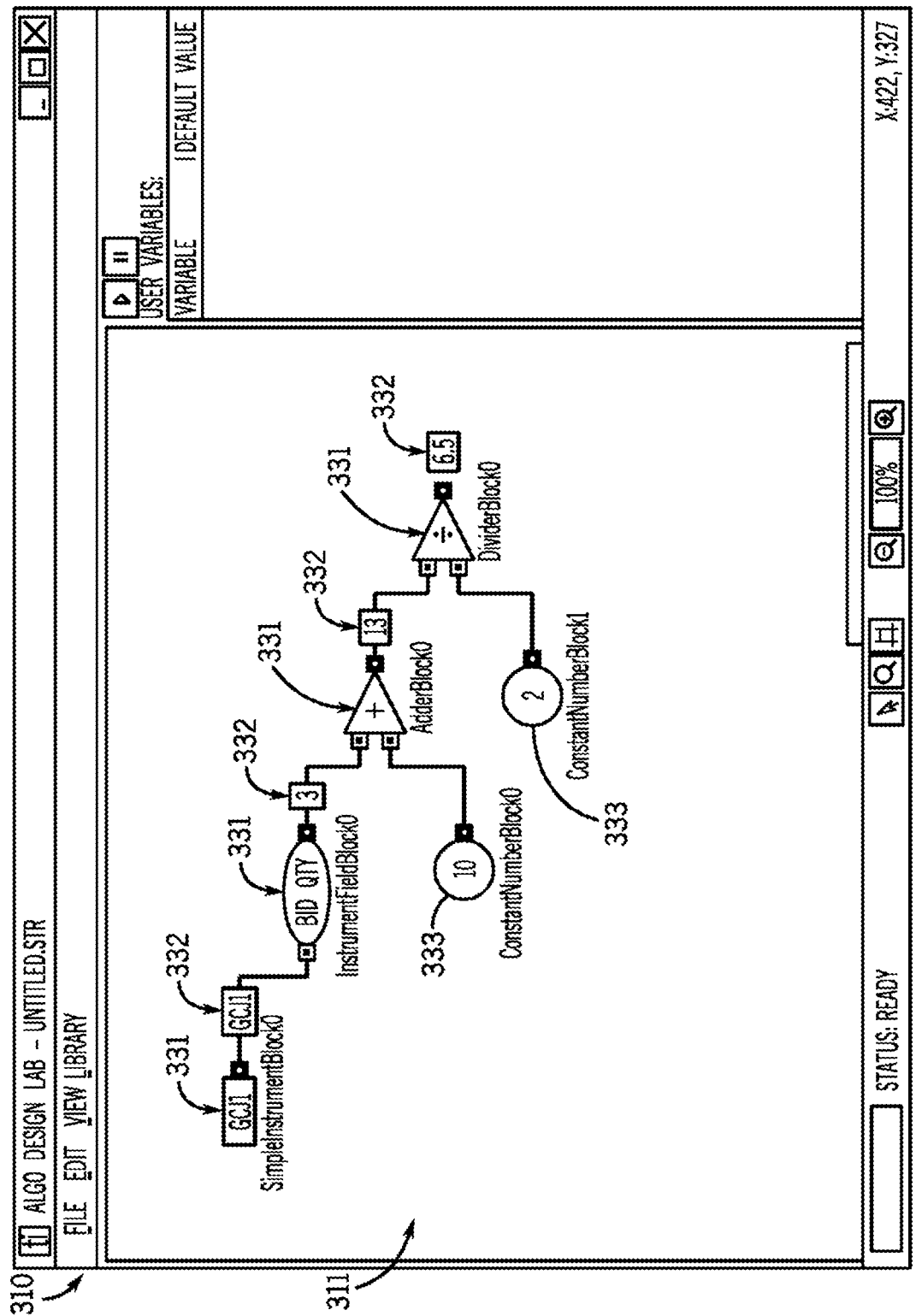
Figure 3G:
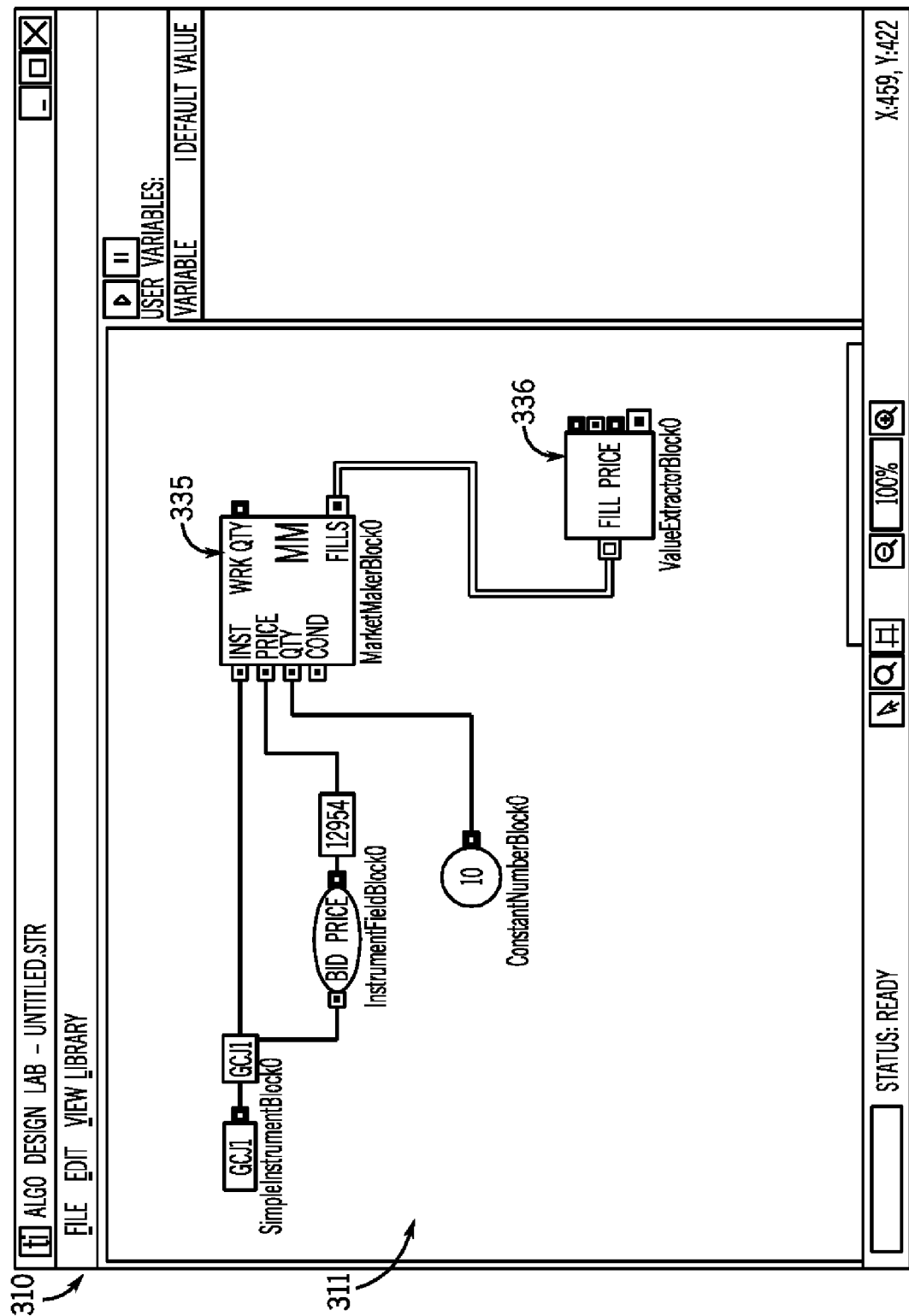

FIGS. 3F-3G illustrate a trading interface 310 according to certain embodiments. The trading interface 310 provides a live feedback feature. The live feedback feature provides, for a particular block in the design canvas area 311, a display of a value for the particular block. For example, a live feedback value may be displayed for one or more inputs and/or outputs of that block. The live feedback value may be displayed in relation to the block or the corresponding input and/or output, for example. The live feedback may be updated whenever the value of an input or output for a block changes. Note that the change in an output for one block may result in a change in the output of another block which takes the first block's output as an input (either directly or indirectly), resulting in live feedback for both blocks being updated.

As illustrated in FIG. 3F, various blocks 331 have been placed in the design canvas area 311. For each output of the blocks 331, live feedback 332 is provided showing the value of the output. Note that blocks 333 are number blocks and live feedback is not provided because the value of the output is shown in the display of the blocks 333 themselves. In certain embodiments, live feedback is provided for one or more inputs of a particular placed block. In certain embodiments, live feedback is provided for both inputs and outputs of a particular placed block. In certain embodiments, live feedback is provided for all blocks in the design canvas area 311.

The live feedback for the instrument block displays a value of "GCJ1." The live feedback for the instrument attribute block, which is configured to provide the bid quantity, displays a value of "3," representing that the bid quantity for the instrument GCJ1 is 3. The live feedback for the adder block displays a value of 13, which is the sum of the two input values 3 (from the instrument attribute block) and 10 (from the first number block). The live feedback for the divide block displays a value of 6.5, which is the result of dividing the first input value 13 (from the adder block) by the second input value of 2 (from the second number block).

The live feedback may not be provided for certain blocks unless the algorithm is being simulated. For example, as illustrated in FIG. 3G, live feedback is not provided for the outputs of the market maker block 335. This is because, unless the algorithm is running (for example, being simulated), the market maker block 335 does not operate and interact with a market. Thus, the market maker block 335 does not provide any continuous values based on its operation (because it is not operating) nor does it generate any discrete events (again, because it is not operating). Live feedback is also not provided for the outputs of the value extractor block 336. This is because the value extractor block 336 has a discrete input and thus its outputs only have values when a discrete event is received. However, unless the algorithm is running, discrete events are not received.

The live feedback values to be displayed are provided from the algorithm itself. For example, generated programming code for the algorithm being designed may include additional instructions to update the display of a trading interface such as trading interface 310. In certain embodiments, the generated programming code for the algorithm does not include additional instruments for updating the display of a trading interface because, for example, no trading interface may be present, such as on an algorithm server 302. As illustrated in FIGS. 3D-2 and 3D-3, the "SetAllVariables" method, when invoked, invokes a "SendUpdate" method. The SendUpdate method provides to the user interface an identification of the block the update is for, the particular output index the update is for, and the value (here, the value of the adder block). Thus, whenever the value for a block changes, the update is provided to the user interface to update the live feedback. The SendUpdate method may also be invoked by base classes of blocks which generate to derived classes to provide the user interface updated values. Similarly, as illustrated in FIG. 3D-6, the "InterceptOrderMessage" event handler was registered to be invoked when the event "DiscreteObjectGenerated" occurs. The InterceptOrderMessage method provides to the user interface notification the corresponding discrete event. Thus, whenever this discrete event is generated, the user interface can provide live feedback.

When an algorithm is running (such as when it is being simulated), live feedback may be provided for all of the blocks in the design canvas area 311. Because discrete events occur at particular points in time, an indicator of the occurrence of a discrete event may be displayed when the event occurs. For example, a discrete input and/or output may flash, change color, size, or shape, when a discrete event occurs at that input/or output. As another example, a connection between a discrete input and output may flash, change color, size, or shape, when a discrete event is provided through the connection. As another example, an animation along the connection may be provided to represent a discrete event being provided from the output to the input along the connection. The animation may be, for example, an icon, such as a red circle, moving along the connection or the connection may pulsate.

The live feedback feature provides feedback to a user when an algorithm is being designed and when an algorithm is being run. The live feedback may allow the user to evaluate how the logic of the algorithm behaves, including the algorithm's operational safety and completeness, general tendencies, and profit/loss possibilities.

FIGS. 3H-3L illustrate a trading interface 310 according to certain embodiments. The trading interface 310 provides safety features to reduce potential errors when an algorithm is designed.

Figure 3H:
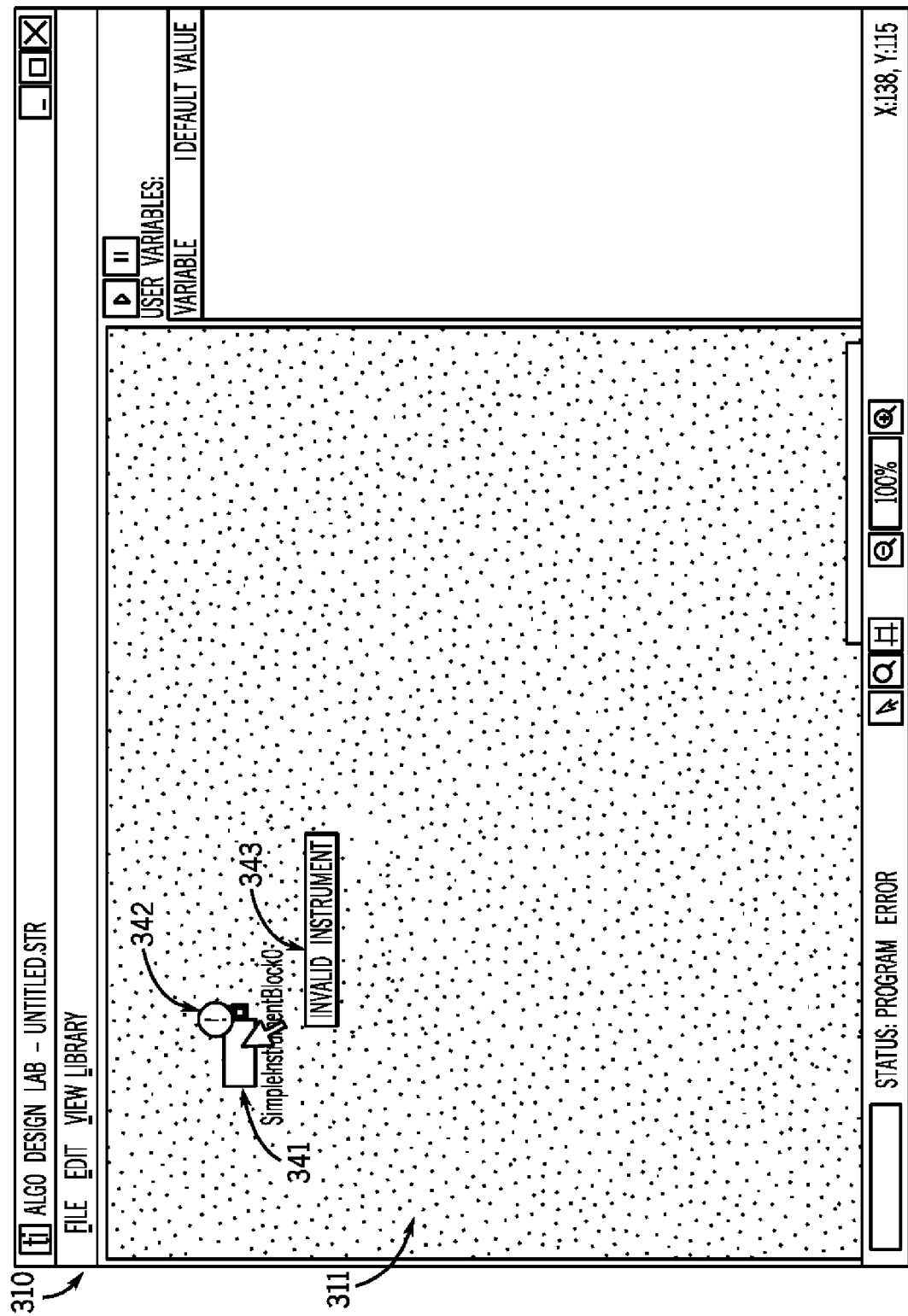

As illustrated in FIG. 3H, instrument block 341 has been placed in the design canvas area 311. However, when the instrument block 341 was placed, no instrument was specified, which is an invalid configuration because the instrument block cannot output the instrument name if the instrument has not been specified. A warning indicator 342 (here, an icon with an exclamation point ("!") in a red circle) is displayed near the instrument block 341 to indicate there is a problem and an explanation 343 of the problem is displayed when a cursor is placed near the instrument block 341. In certain embodiments, other (or additional) indicators may be displayed to indicate a problem such as the background of the design canvas area 311 being tinted red and/or a warning or error message being displayed in a status bar, for example.

Figure 3I:
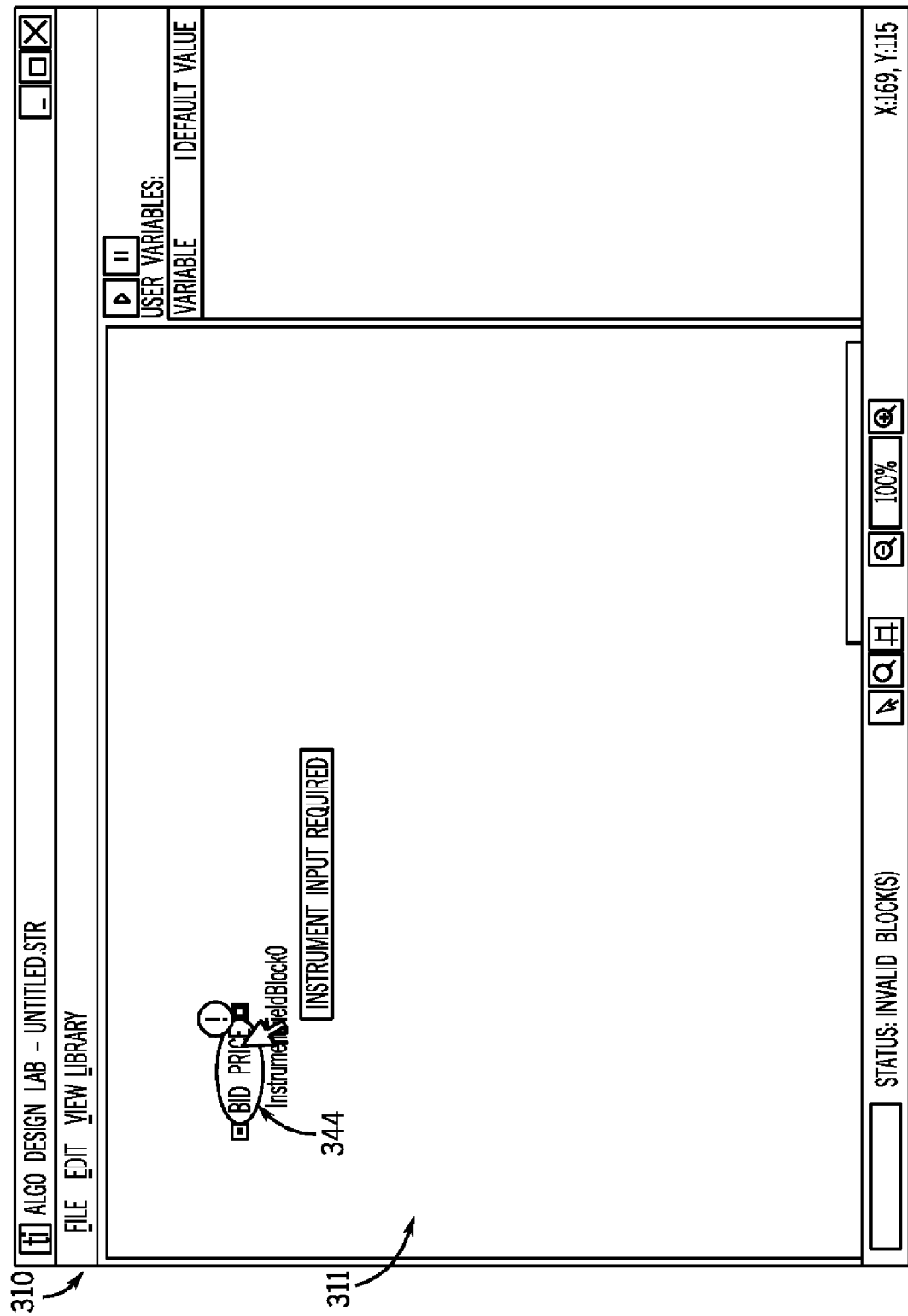

As illustrated in FIG. 3I, instrument attribute block 344 has been placed in the design canvas area 311. However, the instrument attribute block 344, configured to provide the best bid price for an instrument, has not been provided with a required input: the instrument name to provide the best bid price for. That is, the instrument attribute block 344 has not been connected to an instrument block (or other block that may provide an instrument name). Consequently, the algorithm definition is invalid. A warning indicator and an explanation are also displayed, similar to those in FIG. 3H.

Figure 3J:
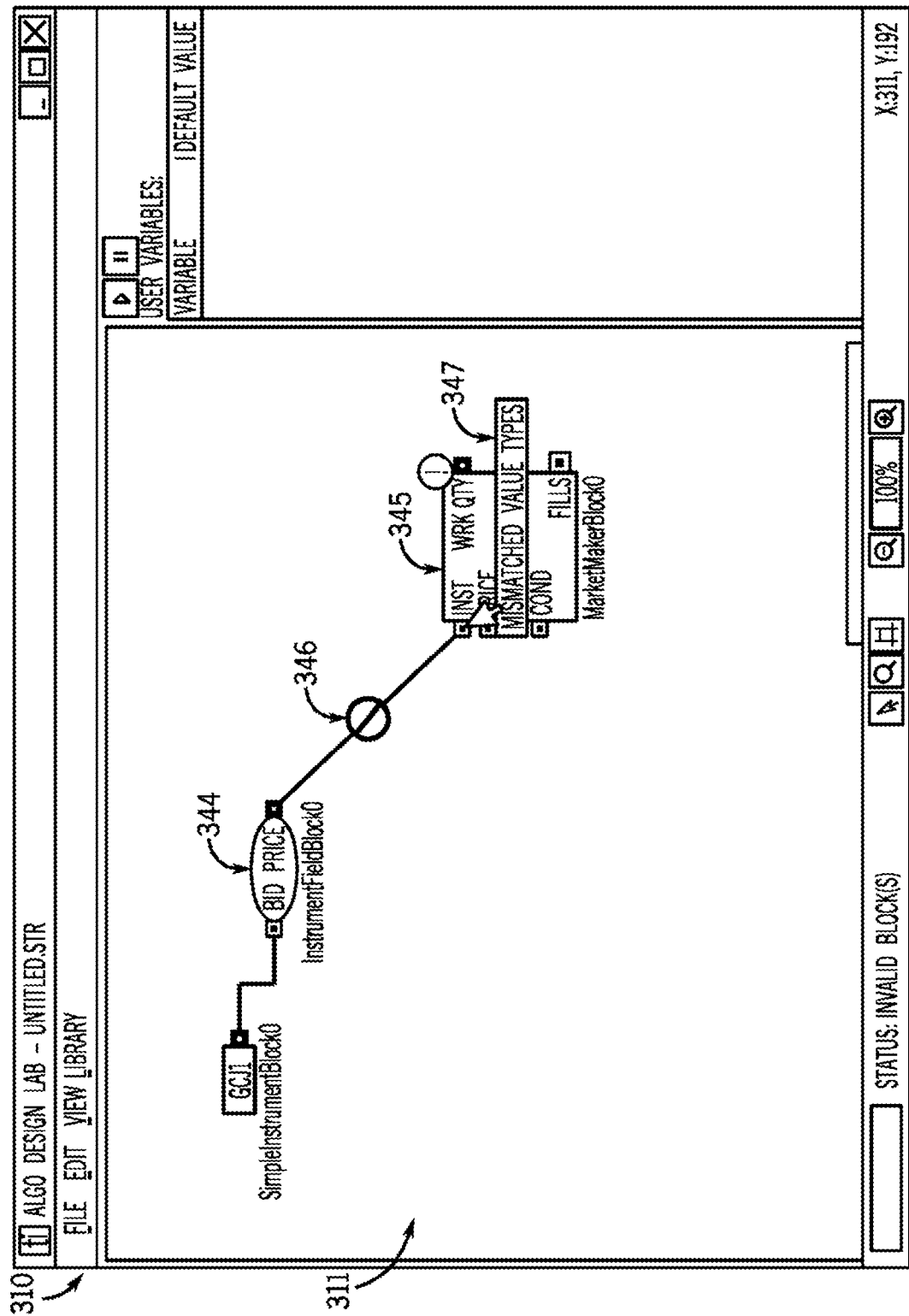

As illustrated in FIG. 3J, an instrument attribute block 344 and a market maker block 345 have been placed in the design canvas area 311. A user is attempting to connect the output of the instrument attribute block 344 (a continuous output with a numeric value type) to the instrument input of the market maker block 345 (a continuous input with an instrument value type). The value types for these inputs and outputs are incompatible and therefore would result in an invalid algorithm definition. An indicator 346 (here, a circle with a slash through it) is displayed on the attempted connection line to indicate the connection is not valid. In addition, an explanation 347 is also displayed. Similar feedback may also be provided if a connection is attempted between a continuous output and a discrete input.

Figure 3K:
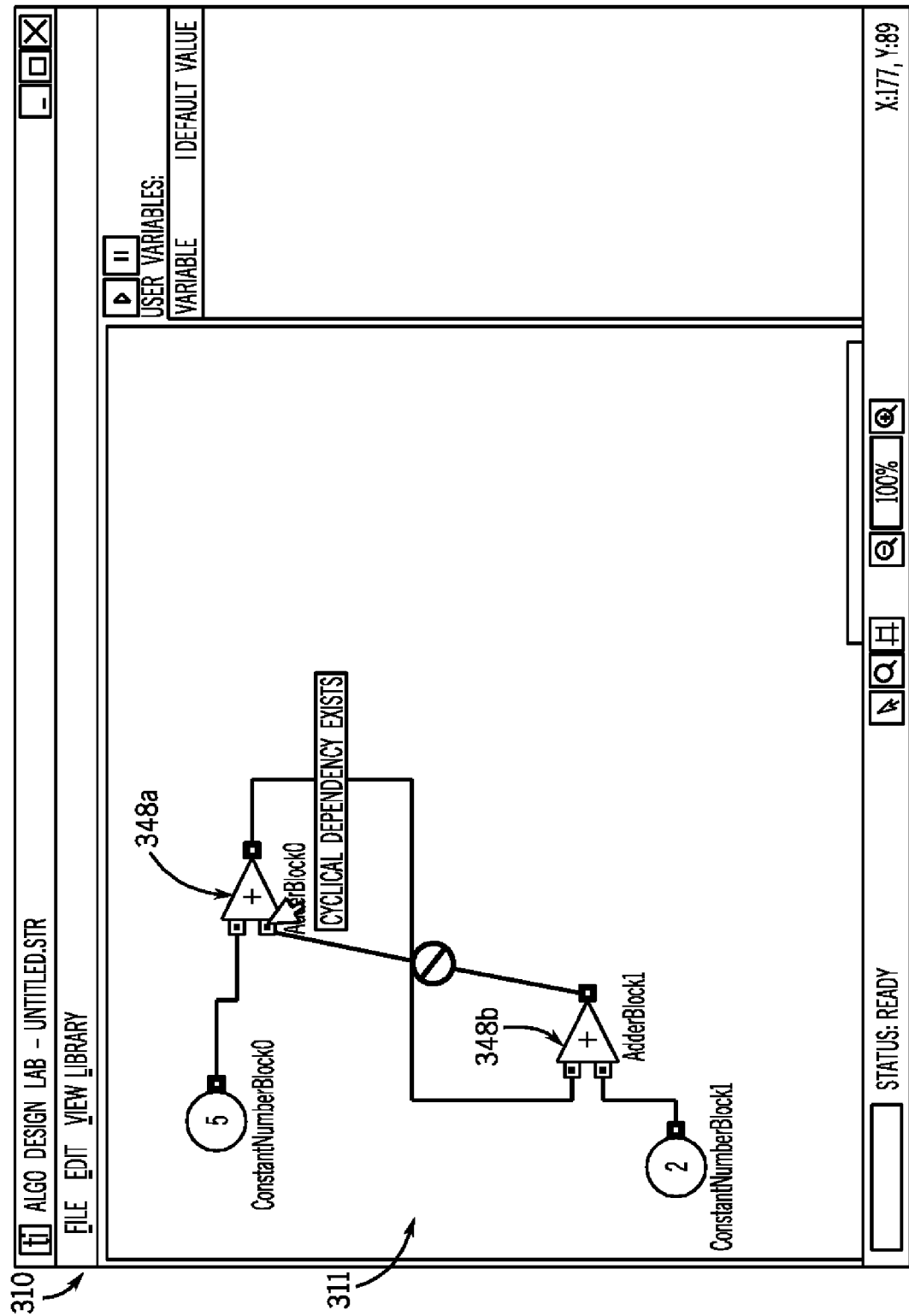

As illustrated in FIG. 3K, adder block 348a and adder block 348b have been placed in the design canvas area 311. A user is attempting to connect the output of adder block 348b to the input of adder block 348a. However, the output of adder block 348a is already connected as an input to the adder block 348b. Allowing the attempted connection would result in a cyclic dependency in the generated programming code. Specifically, in attempting to generate programming code to determine the value for the adder block 348a would result in an infinite loop. Thus, such an algorithm definition is invalid and, similar to the feedback provided in FIG. 3J, the connection is indicated to be invalid and an explanation is displayed.

Figure 3L:
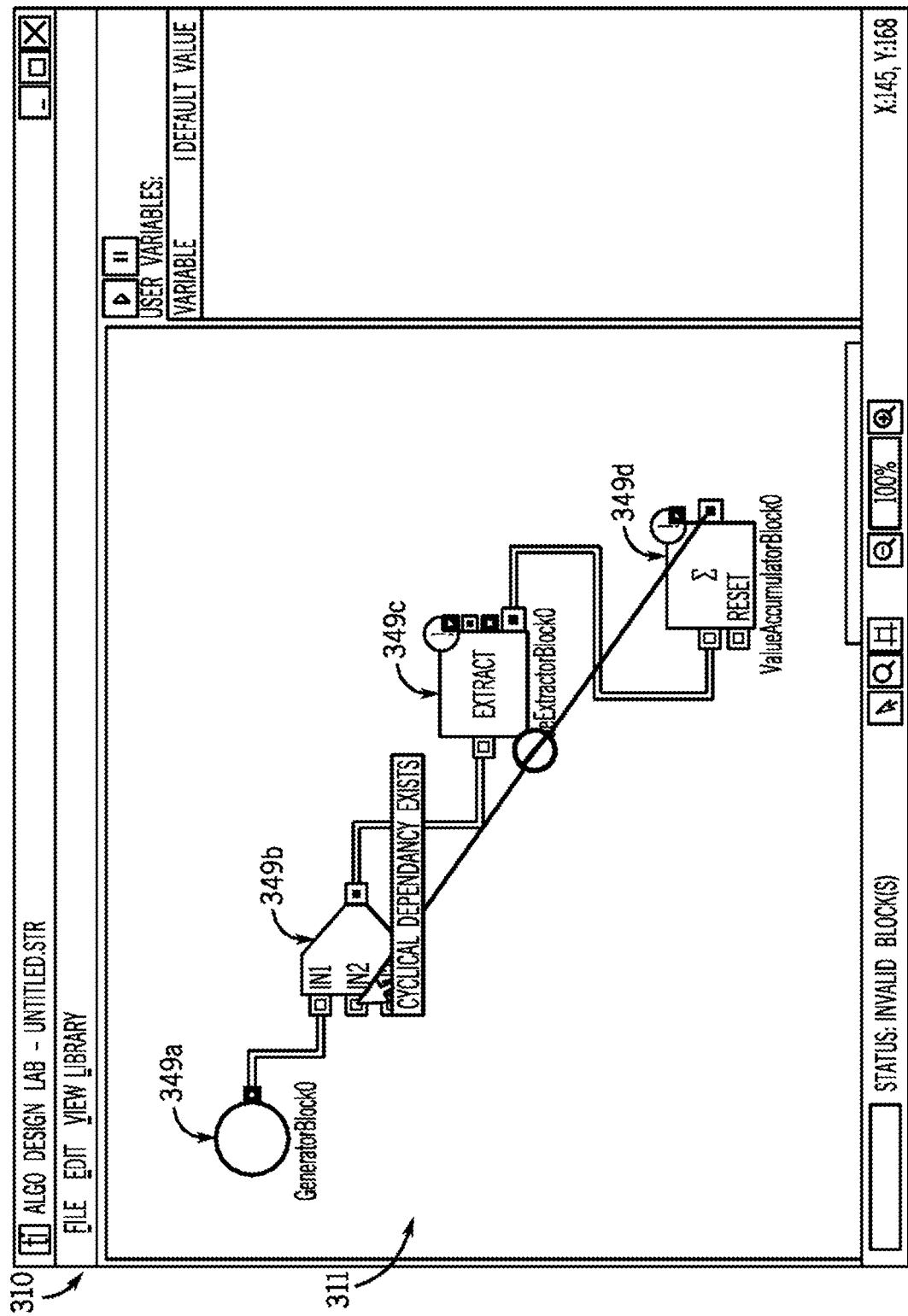

As illustrated in FIG. 3L, generator block 349a, funnel block 349b, value extractor block 349c, and value accumulator block 349d have been placed in the design canvas area 311. A user is attempting to connect the discrete output of value accumulator block 349d to a discrete input of funnel block 349b. However, each of funnel block 349b, value extractor block 349c, and value accumulator block 349d are pass-through blocks, so each discrete event received is passed out through a corresponding discrete output the output. Thus, when a discrete event is provided by the generator block 349a (also connected to the funnel block 349b), it will be passed through each connected block. Allowing the attempted connection would result in an infinite loop in the generated programming code. Specifically, the generated programming code would, in processing the discrete event provided by the generator block, infinitely pass the discrete event to each block in turn to be processed, where that processing includes providing the discrete event to the next block in the cycle. Thus, such an algorithm definition is invalid and, similar to the feedback provided in FIG. 3J, the connection is indicated to be invalid and an explanation is displayed.

In certain embodiments, warnings and/or error messages may be provided in a separate area of the trading interface 310. This may allow a user to readily view all outstanding warnings and errors rather than individually examining each block, for example.

FIGS. 3M-3R illustrate a trading interface 310 according to certain embodiments.

The trading interface 310 provides grouping features to allow, for example, reducing clutter, enabling re-use of portions of algorithms (including creating modules that may be shared between algorithms), and to enable the virtualizing feature. Reduced clutter and re-use of portions of algorithms may lead to better algorithms because it reduces the likelihood of mistakes in the algorithm design. Advantages of the virtualizing feature are discussed below.

Figure 3M:
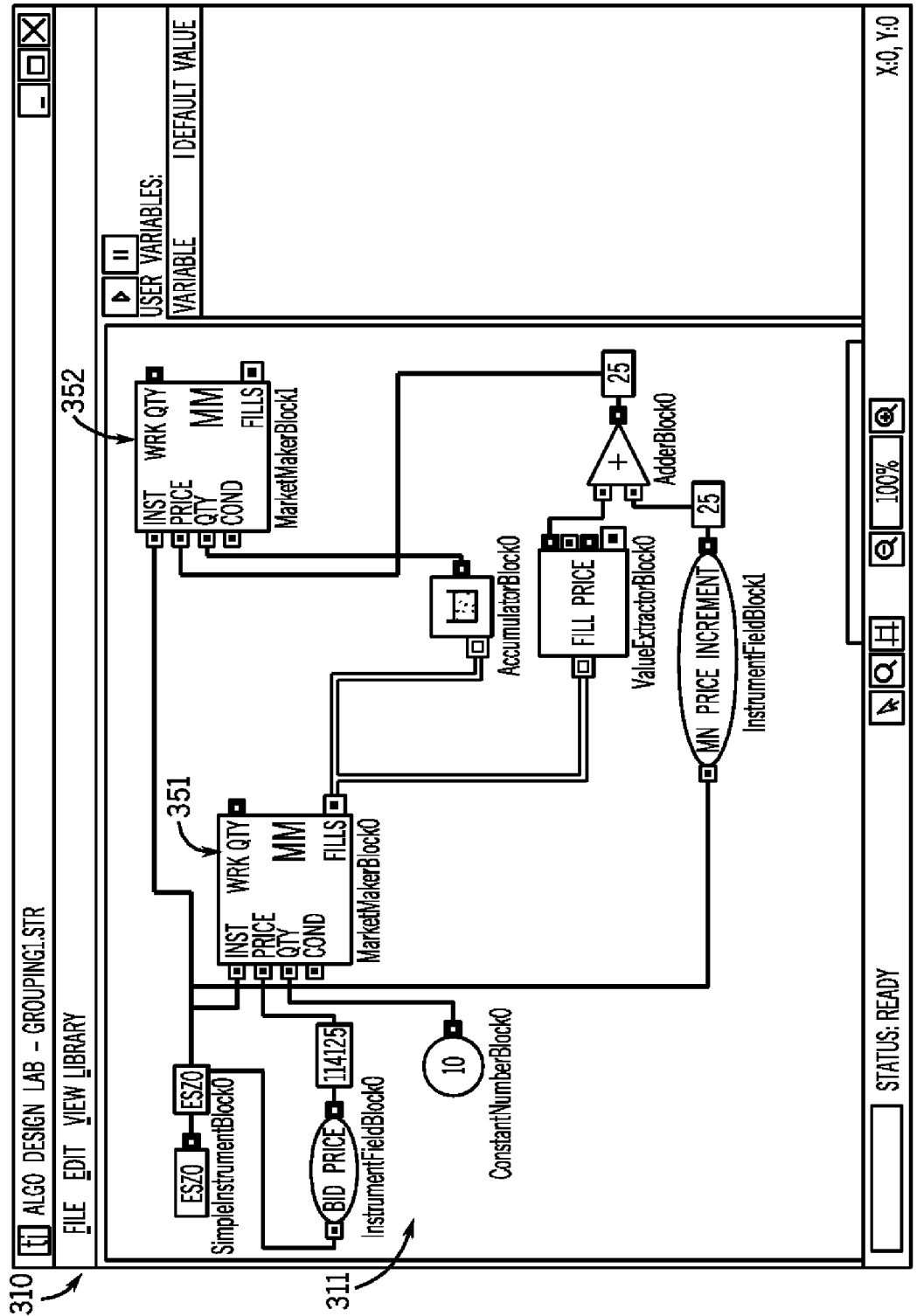

As illustrated in FIG. 3M, a definition for a simple scalping algorithm has been designed. As an overview, the scalping algorithm will buy at the best bid price and then sell at one trading increment above the fill price, making a profit of one trading increment per unit bought and sold. More particularly, the algorithm includes a buy market maker block 351 and a sell market maker block 352. The buy market maker block 351 is provided with an instrument to buy ("ESZ0") specified by an instrument block. The buy market maker block 351 is provided with a price to buy at specified by an instrument field block which provides the best bid price for the instrument. The buy market maker block 351 is provided with a fixed quantity of 10 to buy specified by a number block. When the buy market maker block 351 receives fill confirmations for the buy order it is working, a discrete event is generated.

The sell market maker block 352 will work the sell orders to cover the position taken by the buy market maker block 351. The sell market maker block 352 is provided with the same instrument ("ESZ0") to sell. The sell market maker block 352 is provided with a price to sell at specified by an adder block which adds the minimum price increment for the instrument (provided by an instrument field block) to the fill price (provided by a value extractor block from the discrete event generated by the buy market maker block 351 when a fill confirmation is received). The sell market maker block 352 is provided with a quantity to sell specified by an accumulator block which provides the accumulated quantity that has been bought by the buy market maker block 351, which is extracted from the discrete events generated when fill confirmations are received by the buy market maker block 351.

Thus, when the algorithm is run, the buy market maker block 351 will buy a quantity of 10 at the best bid price and sell (perhaps across multiple sell orders) a quantity of 10 at the fill price plus the minimum price increment.

Figure 3N:
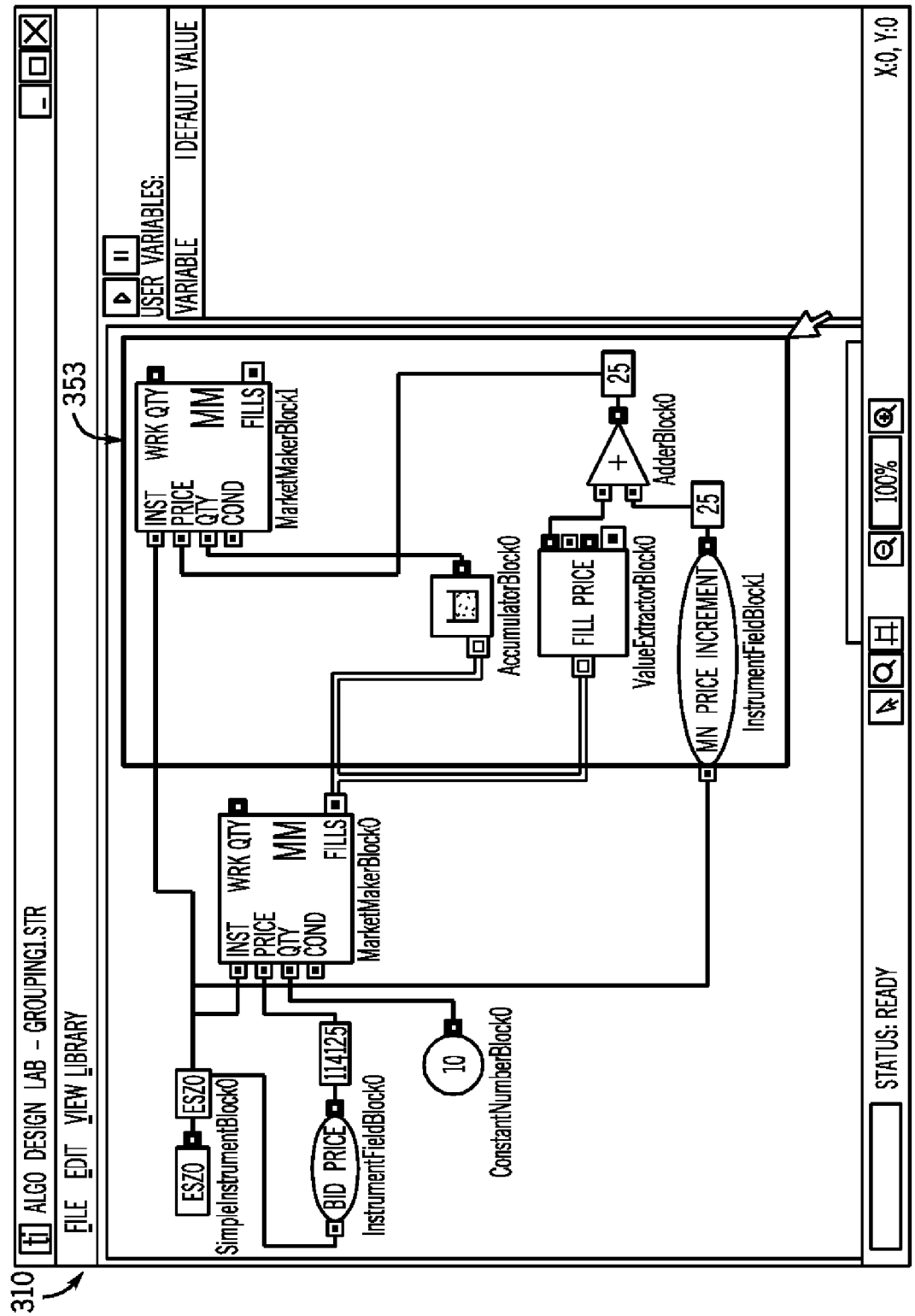
Figure 30:
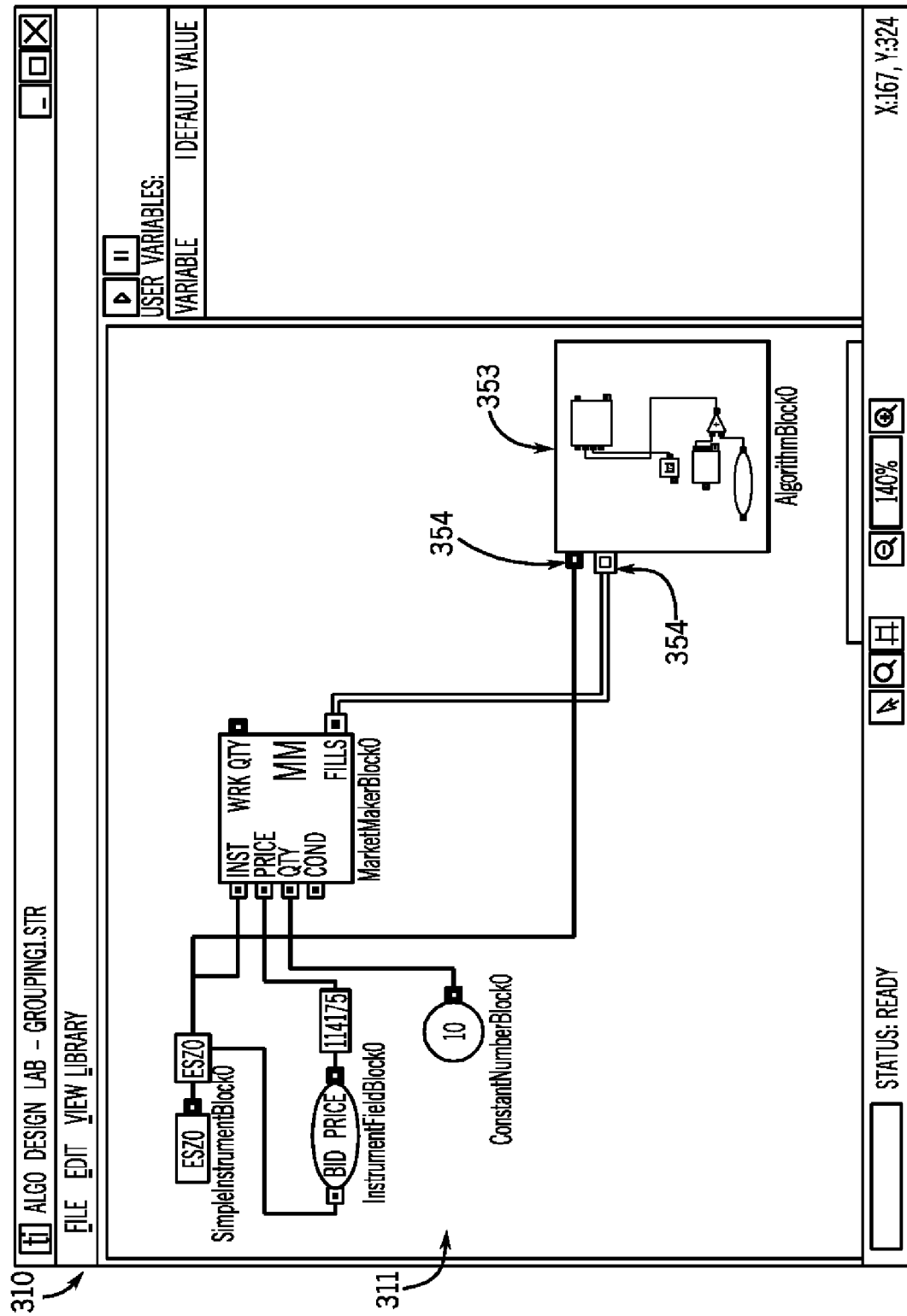

As illustrated in FIG. 3N, the blocks associated with the covering logic portion of the algorithm have been selected by drawing a box 353 around them. Other user interface techniques may also be used to select the blocks of interest to the user such as selecting with a cursor in combination with the shift or control key being pressed, for example.

Once the blocks have been selected, they may be grouped by an action such as selecting a menu item.

As illustrated in FIG. 3O, the grouped blocks are then displayed in a group block 353 with a thumbnail image of the blocks contained therein. The group block 353 reduces the clutter of the design canvas area 311 by reducing the number of blocks and connections shown. In addition, a group block may be saved in a library of modules so that it may be loaded in another algorithm and re-used. A group block may also be referred to as a grouped block. The blocks within the group block may be referred to as a portion of the defined algorithm, a sub-algorithm, or a subroutine, for example.

The group block 353 may be created with inputs 354 corresponding to the inputs of blocks in the group block 353 that are provided values by outputs of blocks not in the group block 353. For example, as illustrated in FIG. 3O, the group block 353 has a continuous instrument input and a discrete input. The continuous instrument input corresponds to the continuous instrument inputs of the sell market maker block 352 and the instrument field block which determines the minimum price increment. The discrete input corresponds to the discrete input of the accumulator block and the value extract block.

Figure 3P:
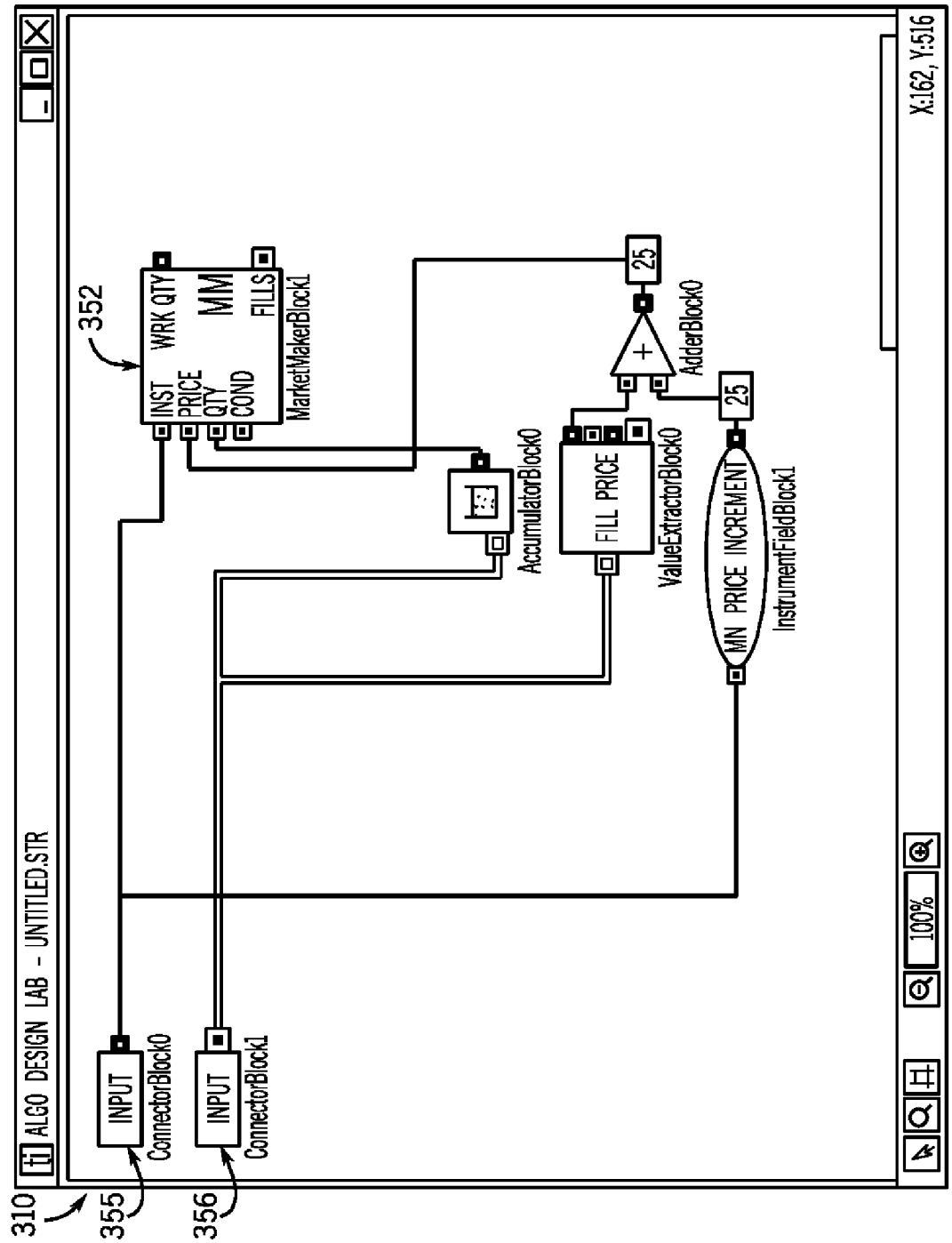

The group block 353 may be selected and then using an action, such as selecting a menu item or a double-click, the blocks included in the group block 353 may be edited. As illustrated in FIG. 3P, a new window with a design canvas area similar to the design canvas area 311 may be displayed and manipulated in the same manner. The group block 353 includes two new input blocks 355 and 356, which correspond to the inputs of the group block 353. Input block 355 corresponds to the continuous instrument input of the group block 353 and input block 356 corresponds to the discrete input of the group block 353. Each input block 355 and 356 has a single output providing the value that is provided to the respective input of the group block 353.

Although not shown in FIG. 3P because none of the blocks in the group block 353 have an output connected to a block outside of the group block 353, a group block may also include output blocks. Similar to the input blocks discussed above, output blocks correspond to outputs of the group block. Blocks within the group block that have outputs connected to an output block will provide values to blocks outside of the group block that are connected to the corresponding output of the group block.

When designing a group block, input blocks and output blocks may be placed to create an input or output for the group block. When placed, the user may be prompted to specify the type of the input or output. Alternatively, the input or output block may default to a predefined type such as continuous numeric. The type of the input or output block may be changed by the user during the design of the algorithm by, for example, selecting the input or output block and using an action such as a menu item or double-click to be prompted to enter a type. Similarly, the user may also specify a name for the input or output block (and thus the corresponding input or output of the group block).

A group block may contain another group block. This nesting of group blocks allows for less clutter and potentially greater reusability of various portions of algorithms.

When generating program code, a group block is generated as a subclass of the Algorithm class which is nested within the main CustomAlgorithm0 class for the algorithm being designed. When group blocks are nested within other group blocks, the generated programming code similarly nests each generated subclass. Additionally, any non-primitive blocks are declared and defined in their nearest group-block parent. So, for example, if a group block is nested three group blocks deep and it has a market maker block (an example of a non-primitive block) within it, the subclass of the market maker block will reside in the three-deep derived algorithm class.

Returning to the scalping algorithm discussed above, as illustrated in FIG. 3M, this algorithm has a flaw. Recall that the scalping algorithm aims to buy a the best bid price and then sell at one trading increment above the fill price, making a profit of one trading increment per unit bought and sold. If the buy market maker block 351 receives a single fill for the entire quantity of 10 for the buy order it places, then the algorithm will operate as intended. However, if more than one fill confirmation is received at more than one price level, then the algorithm will not function as desired. For example, assume that the buy market maker block 351 works an order to buy a quantity of 10 at the best bid price of 114125. Then, a first fill confirmation is received for a quantity of 3 (thus, the first fill was for a quantity of 3 at a fill price of 114125). In response to this fill, the sell market maker block 352 will work an order to sell a quantity of 3 at a price of 114150 (114125 (fill price)+25 (minimum price increment)). Now assume that the best bid price decreases to 114100. The buy market maker block 351 will then re-quote its working order to the new (and now lower) best bid price for a quantity of 7. Then, a second fill confirmation is received for a quantity of 7 (thus, the second fill was for a quantity of 7 at a fill price of 114100). Therefore, the desired behavior of the scalping algorithm is that a first sell order for a quantity of 3 (to cover the first fill) should be placed at a price of 11450 (114125+25) and a second sell order for a quantity of 7 (to cover the second fill) should be placed at a price of 114125 (114100+25).

However, the algorithm illustrated in FIG. 3M will not properly work orders to achieve the desired behavior. When the first fill is received, the sell market maker block 352 will place a first cover order to sell a quantity of 3 at a price of 114125+25. However, if the second fill is received before the first cover order is filled, the sell market maker block 352, receiving a new quantity to quote from the accumulator block (which is updated to reflect that a quantity of 10 has now been filled), will work its cover order for a quantity of 10 at a price of 114100+25 (the price of the most recent fill (the second fill) plus the minimum price increment). Consequently, the first fill will not get covered at the desired price (which is unintended and/or undesirable behavior). Here, if the cover order is filled completely, the entire quantity of 10 for the cover order will be filled at the same price, even though the desired behavior of the algorithm would be for the cover orders to be worked at a price and quantity particular to each fill received.

Figure 3Q:
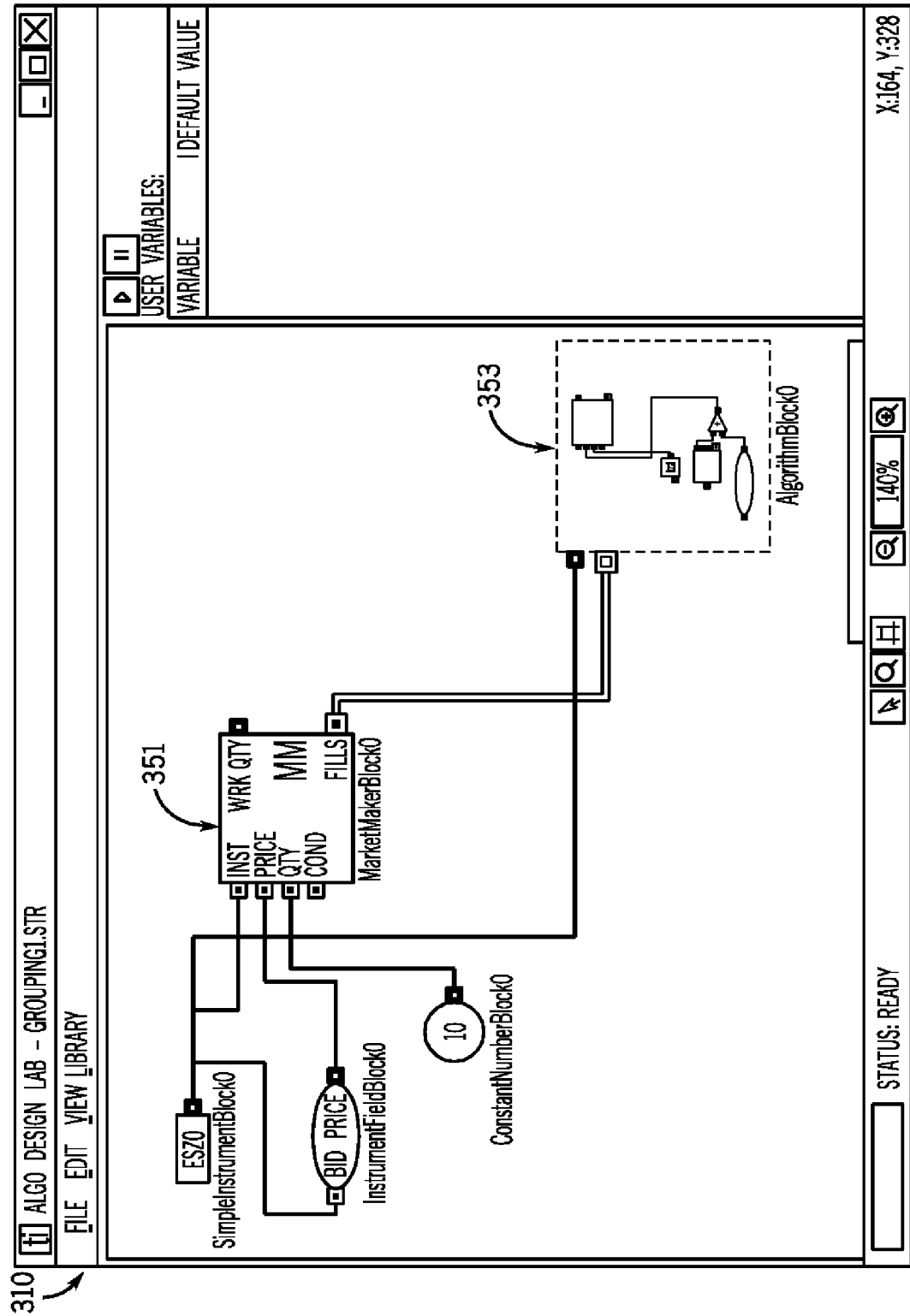

The virtualizing feature of the trading application 300 addresses problems of this nature. A group block may be selected and then using an action, such as selecting a menu item, the group block may be specified to be virtualized. As illustrated in FIG. 3Q, group block 353 has been virtualized and this is indicated by changing the border of the group block 353 from a solid line to a dashed line. In certain embodiments, a group block may be designated as virtualized in other ways, such as appending text to the name of the block, changing the border color, background color, or background pattern, for example.

An instance of a virtualized group block is created for each discrete event that is provided to the virtualized group block. That is, each time a discrete event is received at a virtualized group block, a new instance of the virtualized group block is created to handle the discrete event. This addresses the desired behavior discussed above: that each discrete event be handled by the logic of the group bock based on the information particular to that discrete event. Continuing the example above, but specifying the group block 353 to be virtualized, each discrete event generated by the buy market maker block 351 for a fill will result in a new instance of the virtualized group block 353 being created to handle that particular discrete event.

Figure 3R:
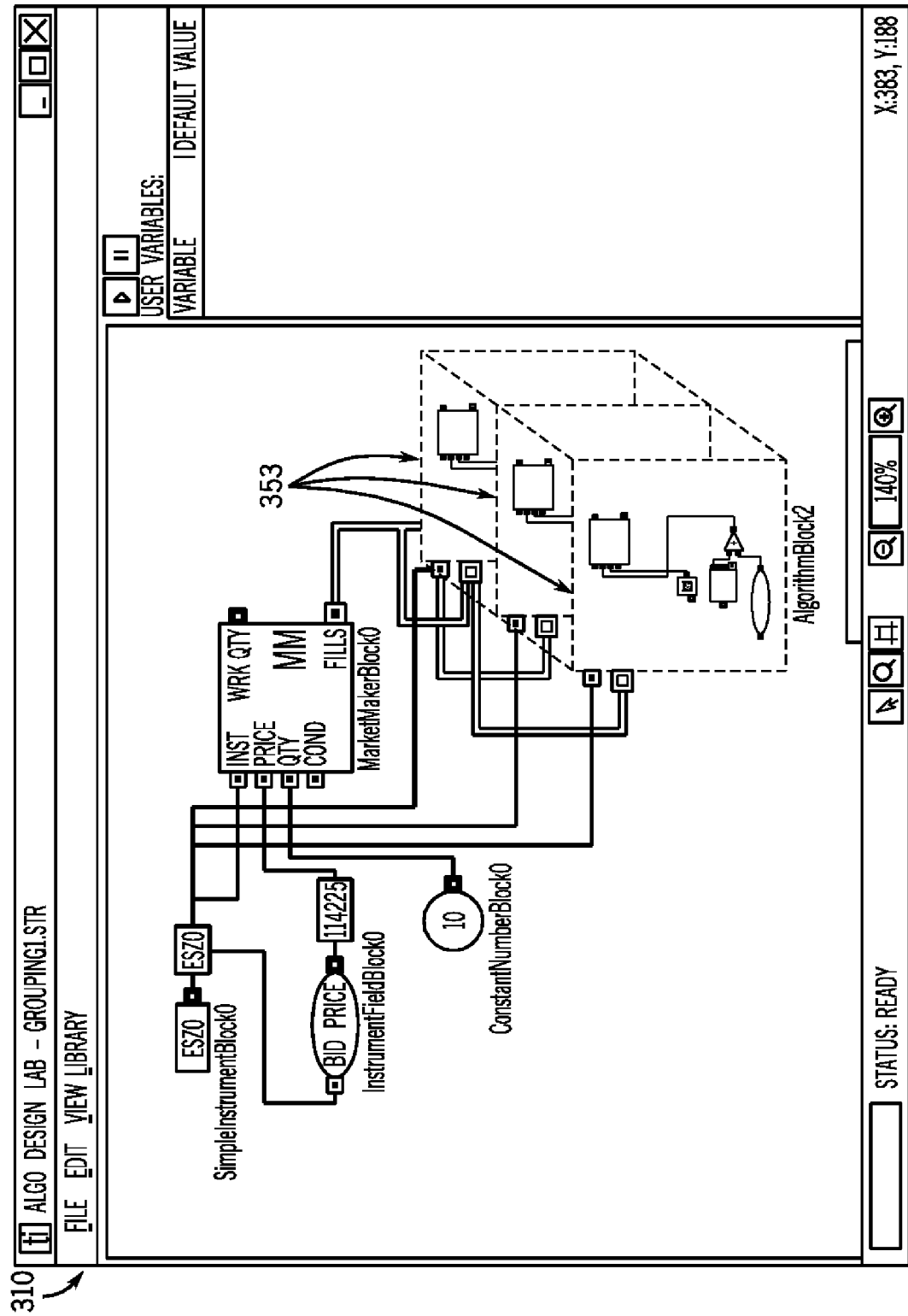
Figure 5:
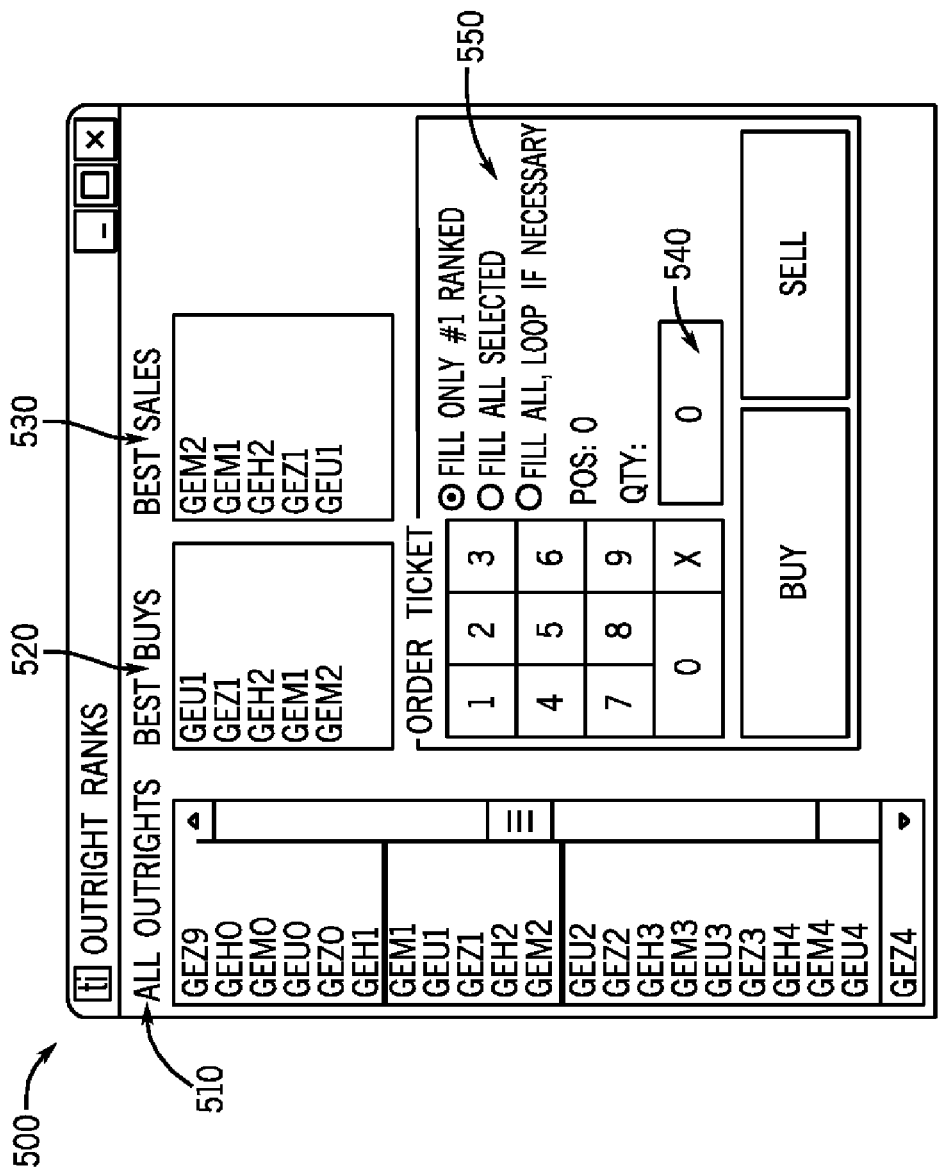

Therefore, every group block to be virtualized must have a discrete event input because it is the notification of the discrete event to the virtualized group block which causes a new instance to be created. Once a virtualized group block has been instantiated, that particular instance no longer receives discrete events from outside of its scope (that is, from blocks not within the virtualized group block). Rather, any subsequent discrete events from outside of the virtualized group block's scope would result in the creation of a new instance of the virtualized group block. However, discrete events may still be generated and processed by blocks within the virtualized group block and a discrete event generated inside the virtualized group block may be provided to a discrete input of the virtualized group block. FIG. 3R illustrates conceptually how the logic of the algorithm would work when three discrete events have been generated by the buy market maker block 351. Three instances of the group block 353 were instantiated in response to each of the three discrete events from the buy market maker block 351. Note that the displayed algorithm would actually only show the single virtualized group block 353 as illustrated in FIG. 3Q and that the three instances shown in FIG. 3R are shown only to indicate the concept of virtualizing a group block. In certain embodiments, the number of instances of a group block may be indicated. For example, the number of instances may be indicated graphically in a similar manner to that shown in FIG. 3R by showing a stack of the virtualized group block, where the size of the stack represents the number of instances of the virtualized group block that have been instantiated. As another example, the number of instances may be indicated by a number displayed in the group block (such as in a corner) that represents as count of the number of instances of the virtualized group block that have been instantiated.

In addition, a virtualized group block cannot have a continuous output (however, it can have discrete outputs) because the value of such an output would be semantically undefined. This is because there may be more than one instance of the virtualized group block (or, potentially no instances if a discrete event has not yet been received for it) and thus such a continuous output could have may have different values simultaneously (or no value at all). Additionally, a virtualized group block may not contain a block specified to be variable because the variable would not "exist" until the virtualized group block was instantiated.

A virtualized group block may contain another group block or another virtualized group block, just as group blocks may be nested as discussed above.

When generating program code, a virtualized group block is generated as a subclass of the Algorithm class, like a non-virtualized group block as discussed above. However, rather than being instantiated when the main CustomAlgorithm0 class, an initially-empty list of subclasses for the virtualized group bock is maintained and when a discrete event is to be provided to the subclass corresponding to the virtualized group block, a new instance of the virtualized group block subclass is created.

The network connection between a client device and an algorithm server may be severed unexpectedly. For example, the Internet service provider ("ISP") used by the client device to connect to the algorithm server may have a router failure or physically severed communications link which may break communication between the client device and the algorithm server. As another example, an intermediate node in the network may fail, also breaking communication between the client device and the algorithm server. As another example, the client device may crash, breaking the connection to the algorithm server. In current systems, when such a connection is broken, the algorithm is either halted or continues to run without knowledge that the connection has been broken. In the former case, a trader may be left with open positions that he cannot get out of easily (or potentially at all, since his connection is down). In the latter case, a trader may be unable to modify parameters for, shut down, or stop an algorithm that is not longer operating correctly or which may inappropriate for changes in conditions in the market. Often traders run algorithms that may be very risky, and they may desire to be able to turn them off or change the parameters at a moment's notice.

In certain embodiments, one or more blocks can be specified to be aware of the connection state between a client device and an algorithm server. For example, when placed, the user may be presented with an option to specify that the block should continue to run even if the connection between the client device and the algorithm server running the algorithm is disconnected. The option may also be specified by selecting the block and using an action such as a menu item or keyboard command. By default, an algorithm may pause or halt when the connection between the client device and the algorithm server is broken. In certain embodiments, the entire algorithm is specified to continue to run even if the connection between the client device and the algorithm server running the algorithm is disconnected.

For example, a market maker block may have an option to keeps orders generated by the market maker block in the market even if the connection between the client device and the algorithm server is broken. A market maker block being used in a hedging or cover order portion of the algorithm may be configured in this manner so that any position taken by another part of the algorithm is will be hedged or covered as desired, even if the portion of the algorithm placing those orders is no longer running because the connection is broken.

In certain embodiments, an input block may be added to the algorithm being designed which provides a continuous Boolean output representing the state of the connection between the client device and the algorithm server. Blocks may then take the value from this connection state input block as an input to control their behavior. For example, the connection state input block may be connected to the conditional input of a market maker block so that the market maker block only works an order when the connection state is TRUE (representing connected).

Once an algorithm has been defined in the trading interface 310, it may be saved. An algorithm may also be given a name (for example, while the algorithm is being built and/or when the algorithm is saved). The saved algorithm may then be recalled or referenced at future time with the trading interface 310 or with another trading interface. For example, the saved algorithm may be loaded with the trading interface 310 so that it may be edited or re-used on another order. As another example, the saved algorithm may be referenced as an order type from another trading interface as discussed below.

The components, elements, and/or functionality of the trading interface 310 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, EPROM, and/or file server, for execution on a general purpose computer or other processing device.

IV. Launching and Managing Algorithms

Certain embodiments provide for initiating placement of an order to be managed by an algorithm selected as an order type. Certain embodiments provide for initiating placement of an order to be managed by a selected user-defined trading algorithm from a value axis. Certain embodiments provide for changing a variable for an algorithm while the algorithm is managing an order. Certain embodiments provide for manually modifying an order being managed by an algorithm. Certain embodiments provide for assigning to an unmanaged order an algorithm to manage the order. Certain embodiments provide for displaying working orders being managed by different user-defined trading algorithms on a value axis.

Figure 4A:
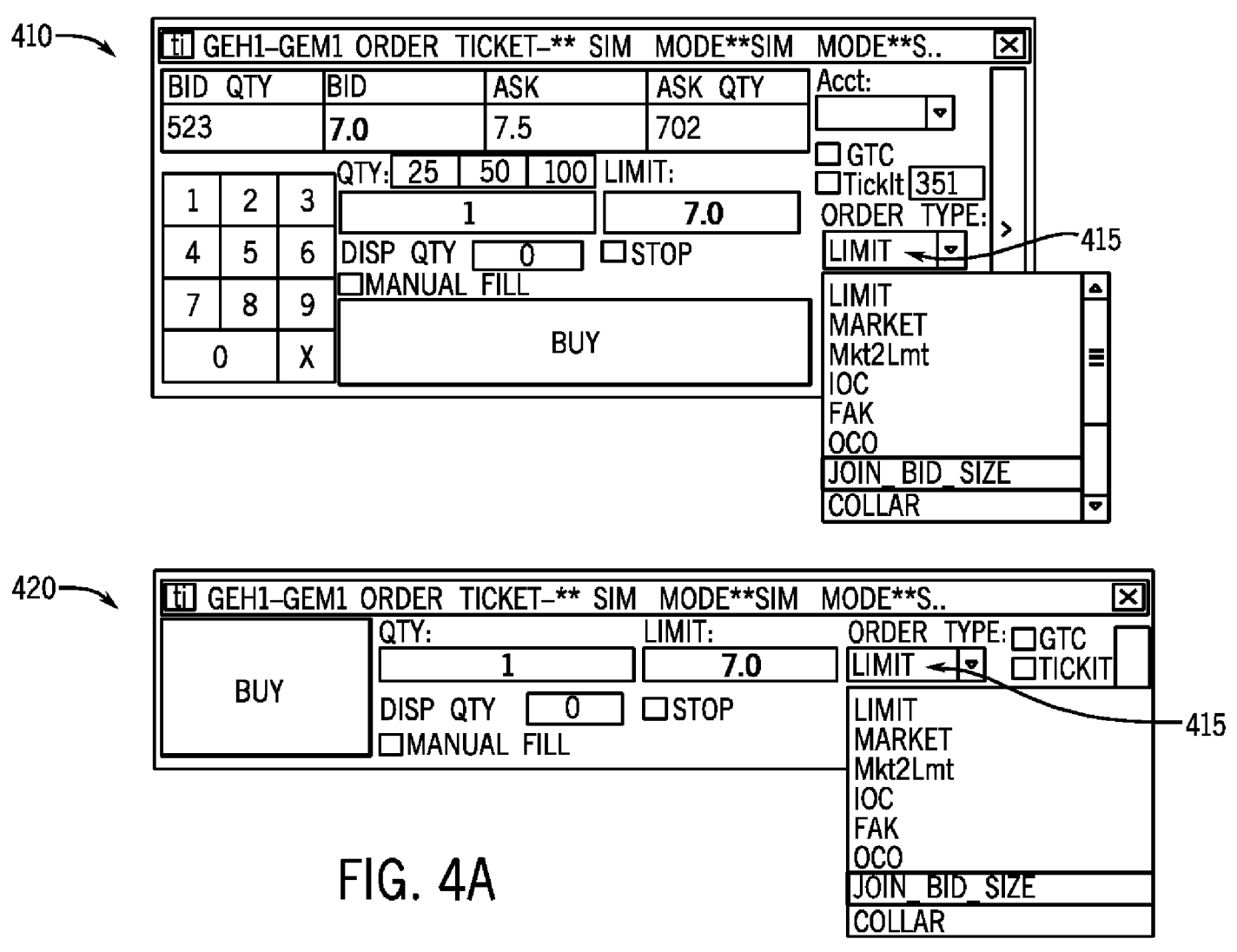

FIGS. 4A-4F illustrate trading interfaces according to certain embodiments. As illustrated in FIG. 4A, trading interface 410 is an order ticket that allows a saved algorithm to be selected as an order type. The saved algorithms may have been saved using a trading interface similar to trading interfaces 200 and 310 discussed above, for example.

The saved algorithm may be selected using the selection interface 415, which, as illustrated, provides a drop-down list that includes both standard order types (such as limit and market) as well as saved algorithms. In certain embodiments, the selection interface 415 includes other elements for selecting from available saved algorithms. For example, the selection interface 415 may open a file navigator to browse for a particular algorithm. As another example, the selection interface 415 may include a tree view of saved algorithms which have been categorized in a hierarchy based on algorithm type.

Trading interface 420 is a simplified order ticket that also allows a saved algorithm to be selected as an order type with a selection interface 415.

When an order is initiated from trading interface 410 or 420 and a saved algorithm has been selected as the order type, the order is managed according to the selected algorithm. If the selected algorithm has been configured to take parameters from the trading interface (such as an order ticket price or quantity), the values specified in the trading interface 410 or 420 will be provided to the algorithm when it is run.

Figure 4B:
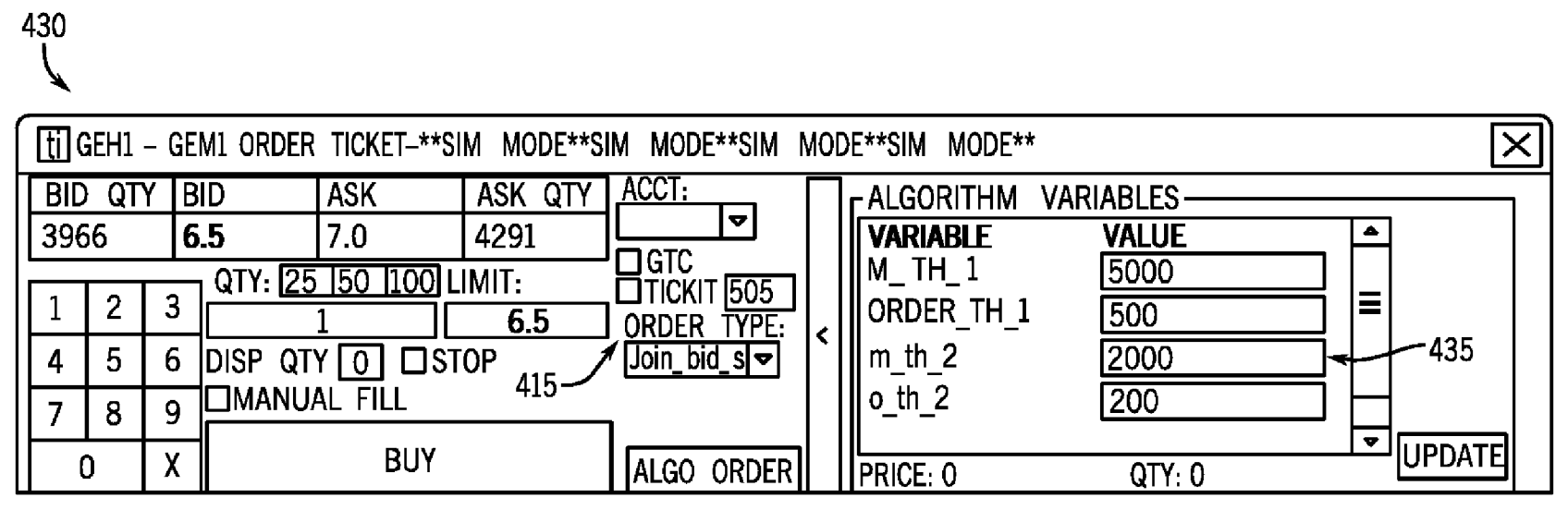
Figure 4C:
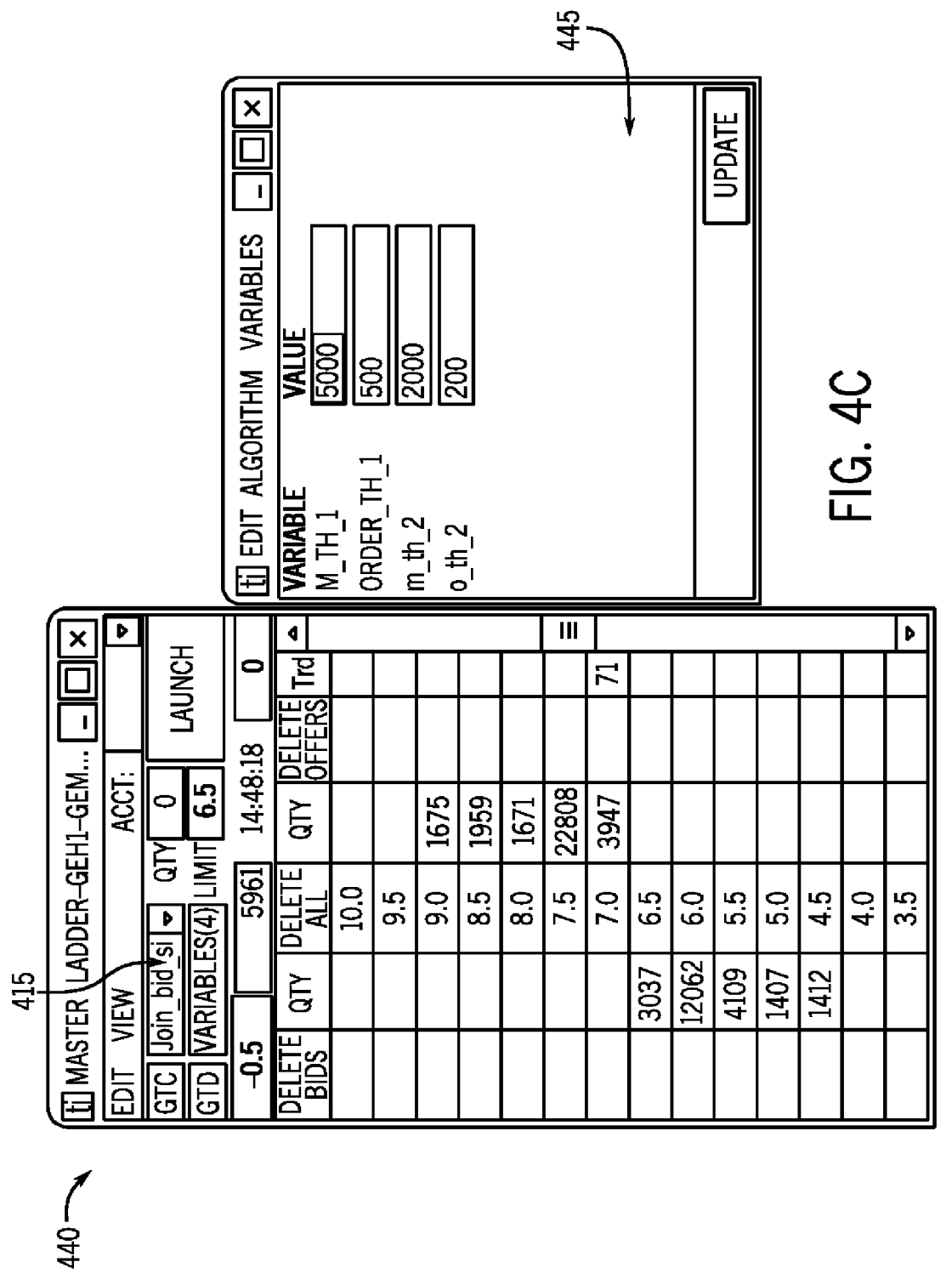

As illustrated in FIGS. 4B-4C, trading interface 430 (an order ticket style trading interface similar to trading interface 410 discussed above) and trading interface 440 (a market depth ladder or axis style trading interface) are shown after an algorithm order type has been selected using a selection interface 415. Here, the selected algorithm is similar to the one illustrated in FIG. 2I. The trading interface 440 may include a value axis which includes values corresponding to or based on price levels for a tradeable object. The values may be prices for the tradeable object (such as in a price axis), for example. Information related to the tradeable object, such as quantity available at the price levels corresponding to the values in the value axis, may also be displayed along the value axis. The variables of the algorithm are shown in variable areas 435 and 445, respectively, and may be changed before initiating an order. Variable area 435 is incorporated into trading interface 430 as part of the same window. Variable area 445 is incorporated into trading interface 440 as a separate window. The variables in variable area 435 and 445 default to the values specified in the default value column 272 of the variable area 206, as illustrated in FIG. 2I. When changed, an initiated order will be worked according to the selected algorithm with the changed variable values.

As illustrated in FIG. 4D, trading interface 450 is an order book showing orders working in the market. Here, an order 451 being worked according to an algorithm (also similar to the one illustrated in FIG. 2I) is selected. The variables of the algorithm are shown in variable area 455 (similar to variable areas 435 and 445) and may be changed. When changed (and the change is applied), the algorithm will continue to run according to the changed variable values. The change to the variables becomes effective without pausing or stopping the algorithm.

In certain embodiments, the trading interface 450 allows a user to manually modify an order being managed by an algorithm. For example, a user may change the price or quantity of the order or delete the order. In response, the algorithm managing the order may change the order price, it may change the order quantity, it may do nothing, or it may perform no new action but merely have new information or thresholds based on the manual modification to use according to the algorithm definition, for example.

In certain embodiments, the trading interface 450 may include an order that is not being managed by an algorithm (for example, a manually entered order). This unmanaged order may be selected and an algorithm may be applied to it. For example, a user may select the unmanaged order and, using an action such as a menu item or keyboard command, be presented with a list of available algorithms to apply to the selected unmanaged order. The list of available algorithms may include saved algorithms which include an order block, for example. When applied to the selected unmanaged order, the selected algorithm may then manage the order according to the algorithm. As another example, a user may select an unmanaged good-til-cancelled ("GTC") order and apply a selected algorithm to it so that the algorithm may manage the order across future trading sessions.

As illustrated in FIG. 4E, trading interface 460 is a market depth ladder or axis style trading interface similar to trading interface 440 discussed above. Several orders have been initiated and are illustrated working at different price levels. Orders 461 were initiated to be managed with a first algorithm and orders 462 were initiated to be managed with a second algorithm. Thus, the trading interface 460 provides for a single interface displaying multiple working orders being managed according to the same algorithm. Additionally, the trading interface 460 provides for a single interface displaying working orders being managed according to multiple algorithms.

In certain embodiments, working orders being managed according to a particular algorithm are commonly identified. For example, each working order associated with a first algorithm may be identified graphically, for example, with a particular background color, foreground color, background pattern, border color, border style, shape, symbol, number, text, and/or font. Working orders associated with a second algorithm may then be identified using a different color, pattern, border, shape, symbol, number, text, and/or font, for example.

In certain embodiments, working orders being managed according to a particular algorithm are individually identified. For example, each working order associated with a different instance of the same algorithm may be distinguished from other working orders associated with different instances of that algorithm with an identifier such as a color, pattern, border, shape, symbol, number, text, and/or font. Orders being managed according to a first instance of an algorithm may have a number "1" in the corner of their working order indicators whereas order being managed according to a second instance of the algorithm may have a number "2" in the corner of their working order indicators. The indication of working orders being managed by different instances of a particular algorithm may be applied in combination with the indication of working orders being managed by different algorithms discussed above.

Figure 4F:
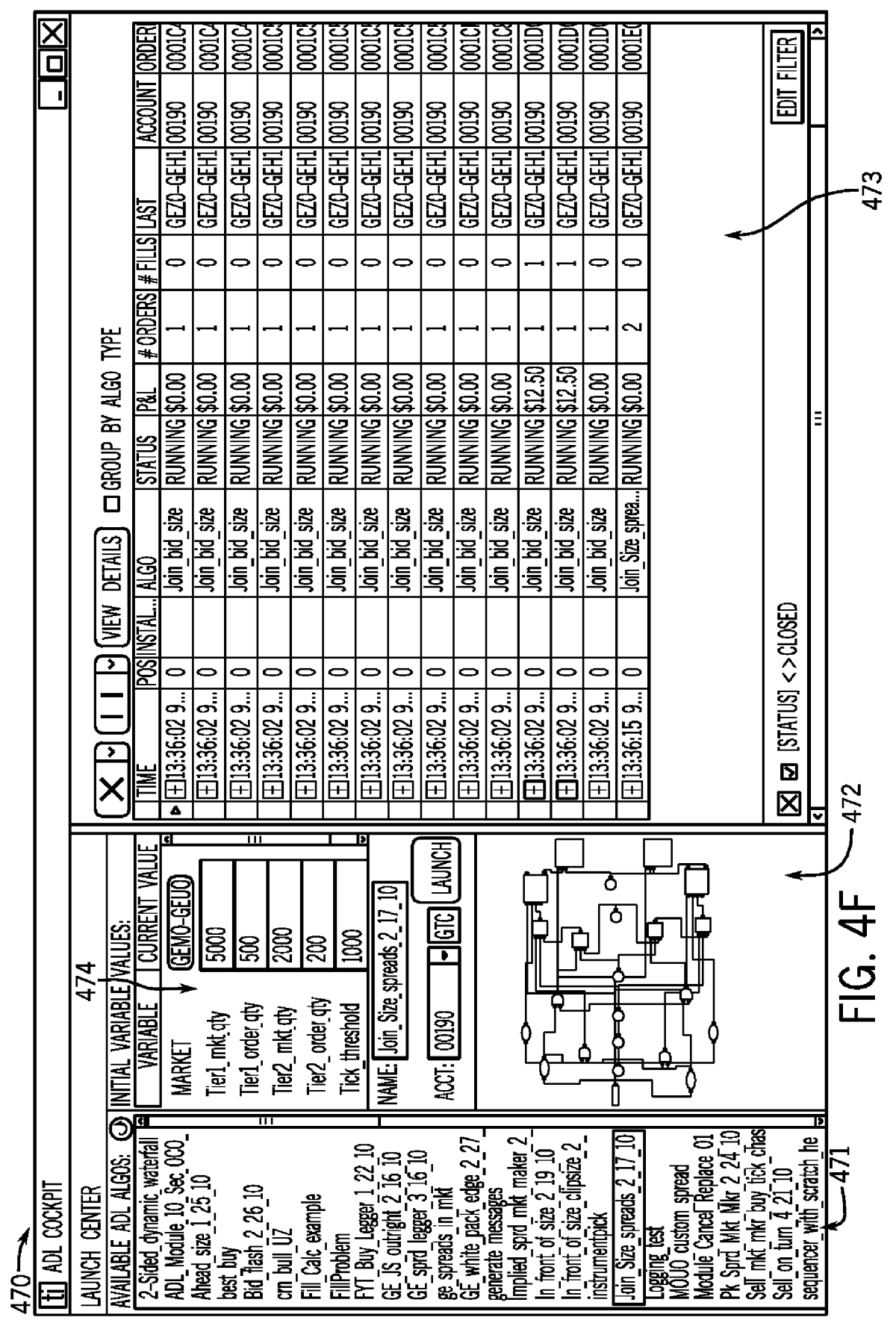

As illustrated in FIG. 4F, trading interface 470 is an algorithm manager. The trading interface 470 may also be referred to as a cockpit or dashboard. The trading interface 470 includes a list 471 of available algorithms. A particular algorithm may be selected from the list 471. When an algorithm is selected, a view of a selected algorithm is displayed in the view area 472 and a list 473 of running instances of the selected algorithm is also displayed. As illustrated, the view area 472 may show an algorithm definition made using a trading interface similar to trading interface 310 discussed above. However, the view area 472 may also display a view of an algorithm defined using a trading interface similar to trading interface 200 discussed above. The list 473 of running instances of the selected algorithm may include information about the running instance such as the time it was initiated, its position, status, profit and loss, number of working orders, number of filled orders, instrument the most recent order was placed for and/or a fill was received for, and/or order account information, for example.

In addition, variable area 474 displays the variables of the selected algorithm and the values of those variables for a selected instance of the selected algorithm. The variable area 474 is similar to the variable areas 435, 445, and 455 discussed above. The variables for the selected instance of the selected algorithm may be changed. When changed (and the change is applied), the algorithm will continue to run according to the changed variable values. The change to the variables becomes effective without pausing or stopping the algorithm.

In certain embodiments, a trading interface, such as trading interfaces 200, 290, 310, 410, 420, 430, 440, 450, 460, and/or 470, is adapted to allow a user to specify the behavior when an order being managed by an algorithm is unfilled at the close of a trading session. For example, a trading interface may allow the user to specify that an unfilled order being managed by an algorithm should be cancelled and the algorithm stopped. As another example, a trading interface may allow the user to specify that an unfilled order being managed by an algorithm should continue to be managed at the start of the next trading session. As another example, a trading interface may allow the user to specify that an unfilled order being managed by an algorithm should be paused at the start of the next trading session and to resume being managed by the algorithm when un-paused by the user.

The components, elements, and/or functionality of the trading interfaces 410, 420, 430, 440, 450, 460, and 470 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, EPROM, and/or file server, for execution on a general purpose computer or other processing device.

V. Ranking Tool

FIG. 5 illustrates a ranking tool 500 according to certain embodiments. The ranking tool 500 may be used for ranking hedge options, for example. In futures trading, one of the most common strategies is to "spread trade," which is a method by which a trader with market directional risk exposure in one instrument is willing to hedge his risk by placing a trade in one or more like instruments to offset, minimize, or decrease the variance of the trader's risk. The two prices at which the two positions are initiated create a combination or spread price. The trader may then eventually attempt to perform trades that unwind the open position, preferably at a spread price differential that yields a profit from the prices at which he initiated the position.

For some automated trading programs a hedge technique can be implemented that automatically hedges the risk for the trader. This hedge technique might be automated to hedge in one particular instrument, or may be programmed to choose between a plurality of instrument choices according to a pre-programmed method. However, current systems do not provide for hedging trades that are not tied to pre-determined instrument choices.

The difficulty in initiating a non-automated spread trade position, particularly for a market maker, is that, due to the speed gains in technology, opportunities to hedge one's trades most efficiently have become very difficult. Due to the nature of their liquidity providing role in the markets, a market maker is frequently notified with no notice or preparation that they are providing liquidity (i.e. are receiving a trade execution) for a counter-party. For the market maker or any trader who may suddenly acquire an open trading position, the time gap between when a first leg of a spread is initiated and when a trader can hedge this trade has become a serious detriment to efficient hedging and risk management. A trader who is unable to quickly hedge a trade may lose hundreds, thousands, or even millions of dollars. The trader must not only expend the time to decide what instrument is their best instrument with which to hedge but they must also execute the hedge trade.

Certain embodiments provide a ranking tool 500 that provides two distinct speed advantages in manually hedging a trade to optimally create (but not limited to creating) a spread position. The first aspect lets a user pre-select a group of instruments which are constantly analyzed by a pre-programmed method of parameters to determine, in preferential order, which contract(s) is the most advantageous instrument to buy or sell at any particular moment. In one embodiment, this technique can be implemented to analyze various bid/ask levels in existing spread markets in an instrument that the program is considering. In another embodiment, it may look at the trader's trading position inventory to decide which hedge trade will assist the trader in best lowering his overall risk. In reality, the methods behind the system's execution process are limitless. This information can be used by the trader to eliminate the time required to decide what instrument with which to hedge their risk.

Another aspect of the ranking tool 500, in addition to the ability to automatically analyze what instrument provides the optimal hedge, is that it can be used to actually automatically enter a buy or sell order or group of orders to execute the "best" hedge or group of hedges available in the market according to the aforementioned pre-programmed hedging method. A trader's only potential actions required are to pre-select the instruments under consideration, enter the desired quantity (which can be pre-set), and to click a buy or sell execution heading on the trading interface. This automated hedger leaves the trader with various hedged trade inventory that should be accumulated at advantageous spread prices that align with the trader's desired ranking method. The ranking tool 500 is useful for any trader who runs the risk of executing a trade that could become difficult to hedge under a large variety of market circumstances.

The ranking tool 500 includes a selection area 510 with a listing of tradeable objects that a user can identify or select for analysis. In this example, the listed tradeable objects are Eurodollar futures for various months. The "Best" columns (best buys 520 and best sells 530) display a ranking of the selected instruments in order, with buys 520 in this example being ranked based on the current ask price and sells being ranked based on the current bid price.

The Order Ticket portion 540 of the ranking tool 500 allows the user to enter a quantity to buy or sell according to the rank system. The Buy and Sell buttons allow auto execution of a desired instrument. In this system, a user has various choices 550, including the choice to only buy/sell the number one ranked instrument, to fill all selected instruments, or to loop if necessary. For example, in the event that a trader's desired quantity is not satisfied by the quantity available with the instrument at the number one position, the ranking tool 500 can work a limit order in that instrument at the initial price. A more aggressive approach is to execute whatever quantity is available for the instrument at the number one position, and if necessary move on to auto-hedge to the next contracts. The auto-execute will only work through to the bottom of the list (the number 5 rank in this example), and work a limit order if the quantity associated with it still has not been satisfied by trading through higher all the listed months. The ranking tool 500 can loop if necessary, such as where a pure market order exists and the application will continue on to the next available price while re-starting at the top of the list.

The components, elements, and/or functionality of the ranking tool 500 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, EPROM, and/or file server, for execution on a general purpose computer or other processing device.

VI. Example Computing Device

FIG. 6 illustrates a block diagram of a computing device 600 according to certain embodiments. The client device 110 may include one or more computing devices 600, for example. The client device 301 may include one or more computing devices 600, for example. The algorithm server 302 may include one or more computing devices 600, for example. The gateway 120 may include one or more computing devices 600, for example. The exchange 130 may include one or more computing devices 600, for example. The exchange 303 may include one or more computing devices 600, for example.

The computing device 600 includes a bus 610, a processor 620, a memory 630, a network interface 640, a display device 650, an input device 660, and an output device 670. The computing device 600 may include additional, different, or fewer components. For example, multiple buses, multiple processors, multiple memory devices, multiple network interfaces, multiple display devices, multiple input devices, multiple output devices, or any combination thereof, may be provided. As another example, the computing device 600 may not include an output device 670 separate from the display device 650. As another example, the computing device 600 may not include a display device 650. As another example, the computing device 600 may not include an input device 660. Instead, for example, the computing device 600 may be controlled by an external or remote input device via the network interface 640.

The bus 610 may include a communication bus, channel, network, circuit, switch, fabric, or other mechanism for communicating data between components in the computing device 600. The bus 610 may be communicatively coupled with and transfer data between any of the components of the computing device 600. For example, during an installation process of a trading application, one or more computer-readable instructions that are to be executed by the processor 620 may be transferred from an input device 660 and/or the network interface 640 to the memory 630. When the computing device 600 is running or preparing to run the trading application stored in the memory 630, the processor 620 may retrieve the instructions from the memory 630 via the bus 610.

The processor 620 may include a general processor, digital signal processor, application specific integrated circuit, field programmable gate array, analog circuit, digital circuit, programmed processor, combinations thereof, or other now known or later developed processing device. The processor 620 may be a single device or a combination of devices, such as associated with a network or distributed processing. Any processing strategy may be used, such as multi-processing, multi-tasking, parallel processing, and/or remote processing, for example. Processing may be local or remote and may be moved from one processor to another processor.

The processor 620 may be operable to execute logic encoded in one or more tangible media, such as memory 630 and/or via network device 640. As used herein, logic encoded in one or more tangible media includes instructions that are executable by the processor 620 or a different processor. The logic may be stored as part of software, hardware, integrated circuits, firmware, and/or micro-code, for example. The logic may be received from an external communication device via a communication network, for example, connected to the Internet. The processor 620 may execute the logic to perform the functions, acts, or tasks illustrated in the figures or described herein.

The memory 630 may be tangible media, such as computer readable storage media, for example. Computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media, any combination thereof, or any other now known or later developed tangible data storage device. The memory 630 may include a single device or multiple devices. For example, the memory 630 may include random access memory and hard drive storage. The memory 630 may be adjacent to, part of, programmed with, networked with, and/or remote from processor 620, such that data stored in the memory 630 may be retrieved and processed by the processor 620, for example.

The memory 630 may store instructions that are executable by the processor 620. The instructions may be executed to perform one or more of the acts or functions described herein or shown in the figures.

The network interface 640 may be a one-way or two-way communication coupling. Accordingly, the network interface 640 may communicatively connect one, two, or more communication networks or devices. For example, the bus 610 may be coupled with a gateway similar to gateway 120 discussed above via the network interface 640, such that one, some, or all of the components of the computing device 600 are accessible or can communicate with the gateway. As another example, the network interface 640 may couple the bus 610 with other communication networks. The network interface 640 may be, for example, an integrated services digital network (ISDN) card or a modem to provide a data communication connection. As another example, network interface 640 may be a local area network (LAN) card to provide a data communication connection to a compatible LAN, for example, connected to the Internet. Wireless links may also be implemented. The network interface 640 may send and receive electrical, electromagnetic, or optical signals that carry analog or digital data streams representing various type of information, for example.

The display device 650 may include a visual output device, cathode ray tube (CRT) display, electronic display, electronic paper, flat panel display, light-emitting diode (LED) displays, electroluminescent display (ELD), plasma display panels (PDP), liquid crystal display (LCD), thin-film transistor displays (TFT), organic light-emitting diode displays (OLED), surface-conduction electron-emitter display (SED), laser television, carbon nanotubes, nanocrystal displays, head-mounted display, projector, three-dimensional display, transparent display device, and/or other now known or later developed display, for example.

The display device 650 is adapted to display a trading screen. The trading screen may be similar to the trading screens discussed above, for example. The trading screen may be interactive. An interactive trading screen may allow, for example, one or more trading actions to be performed using the trading screen. For example, an interactive trading screen may allow one or more order entry parameters to be set and/or sent using one or more order entry actions. The display device 650 and/or input device 660 may be used to interact with the trading screen, for example.

The input device 660 may include a keyboard, mouse, microphone, touch-screen, trackball, keypad, joystick, and/or other device for providing input, for example. The input device 660 may be used, for example, to provide command selections to processor 620. For example, the input device 660 may be a mouse that is used to control a cursor displayed on a trading screen. The mouse may include one or more buttons for selection and control, for example.

The output device 670 may include a keyboard, mouse, speakers, touch-screen, trackball, keypad, haptic device or system, joystick, and/or other device for providing output, for example. For example, the output device 670 may be used to output one or more signals, such as a haptic signal or an audio signal, to a user.

While the present inventions have been described with reference to certain embodiments, it will be understood by those skilled in the art that various changes may be made and equivalents may be substituted without departing from the scope of the inventions. In addition, many modifications may be made to adapt a particular situation or material to the teachings of the inventions without departing from their scope. Therefore, it is intended that the inventions not be limited to the particular embodiments disclosed, but that the inventions will include all embodiments falling within the scope of the claims.

The invention claimed is:

1. A system including:
a client device, wherein the client device is adapted to:
   display a visual programming design canvas area for a visual programming language;
   receive commands from a user through the visual programming design canvas area to design an algorithm according to the visual programming language;
   modify, in response to receiving the commands from the user, an arrangement of a plurality of placed blocks specifying a definition for the algorithm, wherein the arrangement of the plurality of placed blocks includes at least one connection, wherein each connection of the at least one connection is between an output of one block in the plurality of placed blocks and an input of another block in the plurality of placed blocks, wherein each connection of the at least one connection indicates a value for the output should be provided to the corresponding input, wherein the plurality of placed blocks includes a first placed block and a second placed block, wherein the at least one connection includes a first connection between the first placed block and the second placed block;
   determine, while receiving the commands from the user, a first live feedback value for the first connection between the first placed block and the second placed block, wherein the first live feedback value is determined based on external data and the definition for the algorithm as modified in response to receiving the commands from the user, wherein the first live feedback value is an intermediate value provided for the first connection between the first placed block and the second placed block;
   display the determined first live feedback value in relation to the first placed block;
   receive, while receiving the commands from the user, updated external data;
   determine, while receiving the commands from the user, an updated first live feedback value for the first connection between the first placed block and the second placed block, wherein the updated first live feedback value is determined based on the updated external data and the definition for the algorithm as modified in response to receiving the commands from the user; and
   update the display of the determined first live feedback value based on the updated first live feedback value.

2. The system of claim 1, wherein the plurality of placed blocks are selected by the user from a plurality of available blocks.

3. The system of claim 1, wherein the first live feedback value is determined for an input of the first placed block.

4. The system of claim 1, wherein the first live feedback value is determined for an output of the first placed block.

5. The system of claim 1, wherein the external data is received from an electronic exchange.

6. The system of claim 1, wherein the external data is received from a simulation environment.

7. The system of claim 1, wherein first live feedback value is further based on a functionality corresponding to the first placed block.

8. The system of claim 1, wherein the client device is further adapted to:
   detect the generation of a discrete event; and
   display an indicator representing the occurrence of the discrete event.

9. The system of claim 8, wherein the indicator includes flashing a connection on which the generated discrete event is provided.

10. The system of claim 8, wherein the indicator includes an animation of an output on which the generated discrete event is provided.

11. The system of claim 8, wherein the indicator includes an animation on a connection on which the generated discrete event is provided.

* * * * *